US008949361B2

(12) United States Patent
Nicolaou et al.

(10) Patent No.: US 8,949,361 B2
(45) Date of Patent: *Feb. 3, 2015

(54) METHODS FOR TRUNCATING ATTACHMENTS FOR MOBILE DEVICES

(71) Applicant: Google Inc., Mountain View, CA (US)

(72) Inventors: Alex Nicolaou, Mountain View, CA (US); Joanne Mckinley, Mountain View, CA (US); Jimmy Shih, Mountain View, CA (US); Derek Phillips, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,862

(22) Filed: Mar. 17, 2014

(65) Prior Publication Data
US 2014/0214988 A1 Jul. 31, 2014

Related U.S. Application Data

(63) Continuation of application No. 11/934,065, filed on Nov. 1, 2007, now Pat. No. 8,676,901.

(51) Int. Cl.
G06F 15/16 (2006.01)
H04L 12/58 (2006.01)

(52) U.S. Cl.
CPC .............. H04L 51/08 (2013.01); G06F 15/16 (2013.01)
USPC .......................................... 709/206; 709/219

(58) Field of Classification Search
USPC .......................................................... 709/206
See application file for complete search history.

(56) References Cited

U.S. PATENT DOCUMENTS

| 5,568,540 | A | 10/1996 | Greco et al. |
| 5,805,064 | A | 9/1998 | Yorkey |
| 6,404,445 | B1 | 6/2002 | Galea et al. |
| 6,529,910 | B1 | 3/2003 | Fleskes |
| 6,701,346 | B1 | 3/2004 | Klein |
| 6,944,441 | B1 | 9/2005 | Nakajima |
| 7,127,685 | B2 | 10/2006 | Canfield et al. |
| 7,136,897 | B1 * | 11/2006 | Raghunandan ............... 709/206 |

(Continued)

FOREIGN PATENT DOCUMENTS

EP 1195697 A2 * 10/2002 ............. G06F 17/30
EP 1327940 A1 7/2003

OTHER PUBLICATIONS

230+ Keyboard Shortcuts for Top Web Services, Jun. 29, 2007, 18 pgs.

Primary Examiner — Ian N Moore
Assistant Examiner — Jenee Williams
(74) Attorney, Agent, or Firm — Morgan, Lewis & Bockius LLP

(57) ABSTRACT

Methods for transcoding attachments for mobile devices are described. In some embodiments, attachments associated with any communication are stored on a server. When a communication is sent from a server to a client device, a representation of the attachment that includes an indication of a native file type of the attachment is also sent along with the communication to the client device. In responding to a user's request to view the attachment, the server transcodes the attachment from the attachment's native file type to a viewable file type configured to display in the client device and then transmits at least a portion of the attachment in the viewable file type to the client device for display. Other embodiments are also described.

21 Claims, 63 Drawing Sheets

(56) References Cited

U.S. PATENT DOCUMENTS

| | | |
|---|---|---|
| 7,146,418 B2 | 12/2006 | Bahl |
| 7,243,125 B2 | 7/2007 | Newman et al. |
| 7,263,663 B2 | 8/2007 | Ballard et al. |
| 7,299,033 B2 | 11/2007 | Kjellberg et al. |
| 7,313,760 B2 | 12/2007 | Grossman et al. |
| 7,353,512 B2 | 4/2008 | Katz et al. |
| 7,360,172 B2 | 4/2008 | Grossman et al. |
| 7,360,174 B2 | 4/2008 | Grossman et al. |
| 7,366,795 B2 | 4/2008 | O'Neil et al. |
| 7,366,974 B2 | 4/2008 | Kalajian et al. |
| 7,418,663 B2 | 8/2008 | Pettinati et al. |
| 7,430,719 B2 | 9/2008 | Pettinati et al. |
| 7,457,980 B2 | 11/2008 | Yang et al. |
| 7,467,162 B2 | 12/2008 | Rosenbloom et al. |
| 7,487,216 B2 | 2/2009 | Miller et al. |
| 7,519,689 B2 | 4/2009 | Mohan et al. |
| 7,519,912 B2 | 4/2009 | Moody et al. |
| 7,549,125 B2 | 6/2009 | Dunn et al. |
| 7,565,347 B2 | 7/2009 | Broder et al. |
| 7,583,205 B2 | 9/2009 | Fux et al. |
| 7,603,382 B2 | 10/2009 | Halt, Jr. |
| 7,627,658 B2 | 12/2009 | Levett et al. |
| 7,627,782 B2 | 12/2009 | Kitajima |
| 7,702,367 B2 | 4/2010 | Seok |
| 7,747,782 B2 | 6/2010 | Hunt et al. |
| 7,756,970 B2 | 7/2010 | Ebert et al. |
| 7,761,606 B2 | 7/2010 | Sunder et al. |
| 7,774,366 B2 | 8/2010 | Fisher et al. |
| 7,788,195 B1 | 8/2010 | Subramanian et al. |
| 7,822,410 B2 | 10/2010 | Coppinger et al. |
| 7,823,124 B2 | 10/2010 | Sattler et al. |
| 7,895,530 B2 | 2/2011 | Leavitt et al. |
| 7,911,626 B2 | 3/2011 | Ferlitsch |
| 7,917,391 B2 | 3/2011 | Smith et al. |
| 7,949,684 B2 | 5/2011 | Brooks et al. |
| 7,970,648 B2 | 6/2011 | Gailey et al. |
| 7,978,828 B1 | 7/2011 | Edamadaka et al. |
| 7,979,624 B2 * | 7/2011 | Gera et al. .................. 711/103 |
| 7,996,850 B2 | 8/2011 | Massman et al. |
| 8,005,816 B2 | 8/2011 | Krishnaprasad et al. |
| 8,131,883 B1 | 3/2012 | Reisman |
| 8,214,746 B2 | 7/2012 | Hamilton et al. |
| 2001/0042103 A1 | 11/2001 | Tomari et al. |
| 2002/0013854 A1 | 1/2002 | Eggleston et al. |
| 2002/0016818 A1 | 2/2002 | Kirami et al. |
| 2002/0059333 A1* | 5/2002 | Tribbeck ...................... 707/500 |
| 2002/0059367 A1* | 5/2002 | Romero et al. ............... 709/203 |
| 2002/0062397 A1* | 5/2002 | Chang et al. ................. 709/246 |
| 2002/0062398 A1* | 5/2002 | Chang et al. ................. 709/246 |
| 2002/0069296 A1* | 6/2002 | Aua et al. ..................... 709/246 |
| 2002/0073157 A1 | 6/2002 | Newman et al. |
| 2002/0078149 A1* | 6/2002 | Chang et al. ................. 709/203 |
| 2002/0078174 A1 | 6/2002 | Sim et al. |
| 2002/0087883 A1 | 7/2002 | Wohlgemuth et al. |
| 2002/0091763 A1 | 7/2002 | Shah et al. |
| 2002/0115476 A1 | 8/2002 | Padawer et al. |
| 2002/0165988 A1 | 11/2002 | Khan et al. |
| 2002/0184317 A1 | 12/2002 | Thankachan |
| 2003/0022657 A1 | 1/2003 | Herschberg et al. |
| 2003/0028647 A1 | 2/2003 | Grosu |
| 2003/0050933 A1 | 3/2003 | DeSalvo |
| 2003/0093565 A1 | 5/2003 | Berger et al. |
| 2003/0097484 A1 | 5/2003 | Bahl |
| 2004/0006638 A1* | 1/2004 | Oberlander et al. .......... 709/232 |
| 2004/0039778 A1 | 2/2004 | Read et al. |
| 2004/0044781 A1* | 3/2004 | Hymel et al. ................. 709/229 |
| 2004/0119740 A1 | 6/2004 | Chang et al. |
| 2004/0133577 A1* | 7/2004 | Miloushev et al. ............. 707/10 |
| 2004/0220943 A1 | 11/2004 | Ross et al. |
| 2004/0243719 A1* | 12/2004 | Roselinsky ................... 709/245 |
| 2004/0243844 A1* | 12/2004 | Adkins .......................... 713/201 |
| 2005/0004990 A1 | 1/2005 | Durazo et al. |
| 2005/0050474 A1 | 3/2005 | Bells et al. |
| 2005/0055458 A1 | 3/2005 | Mohan et al. |
| 2005/0066005 A1* | 3/2005 | Paul ............................... 709/206 |
| 2005/0071448 A1 | 3/2005 | Katz et al. |
| 2005/0076085 A1 | 4/2005 | Budd et al. |
| 2005/0086314 A1 | 4/2005 | Zdepski |
| 2005/0108359 A1 | 5/2005 | Hyder et al. |
| 2005/0120082 A1* | 6/2005 | Hesselink et al. ............. 709/203 |
| 2005/0131888 A1 | 6/2005 | Tafoya et al. |
| 2005/0144251 A1 | 6/2005 | Slate |
| 2005/0188320 A1 | 8/2005 | Bocking |
| 2005/0193345 A1 | 9/2005 | Klassen et al. |
| 2005/0223066 A1 | 10/2005 | Buchheit et al. |
| 2006/0005133 A1 | 1/2006 | Lyle et al. |
| 2006/0015649 A1 | 1/2006 | Zutaut et al. |
| 2006/0031336 A1 | 2/2006 | Friedman et al. |
| 2006/0036901 A1 | 2/2006 | Yang et al. |
| 2006/0047756 A1* | 3/2006 | Piispanen et al. ............. 709/206 |
| 2006/0075027 A1 | 4/2006 | Zager et al. |
| 2006/0206590 A1 | 9/2006 | Wakasa et al. |
| 2006/0288107 A1 | 12/2006 | Klassen et al. |
| 2007/0016636 A1 | 1/2007 | Boerries et al. |
| 2007/0016690 A1 | 1/2007 | Fishman et al. |
| 2007/0050522 A1 | 3/2007 | Grove et al. |
| 2007/0055735 A1* | 3/2007 | Raghunandan ............... 709/206 |
| 2007/0055742 A1 | 3/2007 | Hebert et al. |
| 2007/0061486 A1 | 3/2007 | Trinh et al. |
| 2007/0115991 A1 | 5/2007 | Ramani et al. |
| 2007/0150617 A1 | 6/2007 | Hariki |
| 2007/0162568 A1* | 7/2007 | Gupta et al. .................. 709/219 |
| 2007/0174490 A1 | 7/2007 | Choi et al. |
| 2007/0180407 A1 | 8/2007 | Vahtola |
| 2007/0198474 A1 | 8/2007 | Davidson et al. |
| 2007/0204026 A1 | 8/2007 | Berger |
| 2007/0235294 A1 | 10/2007 | Kang |
| 2007/0265007 A1 | 11/2007 | Omar et al. |
| 2008/0005668 A1 | 1/2008 | Mavinkurve et al. |
| 2008/0016246 A1 | 1/2008 | Singh |
| 2008/0020737 A1 | 1/2008 | Neil et al. |
| 2008/0027916 A1 | 1/2008 | Asai et al. |
| 2008/0039051 A1 | 2/2008 | Stalin et al. |
| 2008/0071865 A1 | 3/2008 | Dutta |
| 2008/0098078 A1 | 4/2008 | Daniell |
| 2008/0126930 A1 | 5/2008 | Scott |
| 2008/0215428 A1 | 9/2008 | Ramer et al. |
| 2008/0222256 A1 | 9/2008 | Rosenberg et al. |
| 2008/0235205 A1 | 9/2008 | Fein et al. |
| 2008/0281927 A1 | 11/2008 | Vanderwende et al. |
| 2008/0294730 A1 | 11/2008 | Oral et al. |
| 2009/0006531 A1 | 1/2009 | Gillum et al. |
| 2009/0029674 A1 | 1/2009 | Brezina et al. |
| 2009/0036161 A1 | 2/2009 | Lo |
| 2009/0046843 A1 | 2/2009 | Baciu et al. |
| 2009/0119678 A1* | 5/2009 | Shih et al. ..................... 719/313 |
| 2009/0172079 A1 | 7/2009 | Eggleston et al. |
| 2009/0327918 A1 | 12/2009 | Aaron et al. |
| 2010/0198927 A1 | 8/2010 | Tonnison et al. |
| 2010/0306249 A1 | 12/2010 | Hill et al. |
| 2011/0060994 A1 | 3/2011 | Maxwell et al. |
| 2011/0078309 A1 | 3/2011 | Bloch et al. |
| 2011/0179362 A1 | 7/2011 | Craddock et al. |

* cited by examiner

```
                        Gmail.jad
        MIDlet-1: Gmail, GmailIcon.png, com.google.gm.MiniGMail
        MIDlet-Jar-URL: http://gmail.com/app/v1.5.0/L1/gmail-g.jar
        MIDlet-Jar-Size: 158961
        MIDlet-Name: Gmail
        MIDlet-Permissions: javax.microedition.io.Connector.http,
        javax.microedition.io.Connector.https
        MIDlet-Icon: GmailIcon.png
        MIDlet-Version: 1.5.0
471A    MIDlet-Vendor: Google
 461    MicroEdition-Profile: MIDP-2.0
471B    ReverseSoftkeys: false
        PlatformID: Samsung-SPH-A920
        BackKey: -8
471C    MaxFlashSize: 200000
471D    SelectKey: -9994
        TalkKey: -10
        UseNativeCommands: false
471E    UseNativeMenus: false
471F    LeftSoftKey: -6
        ClearKey: -9997
        DistributionChannel: Web
471G    MicroEdition-Configuration: CLDC-1.0
471H    RightSoftKey: -7
481A    MenuKey: -9995
481B    Background color: red
481C    Animations: false
        Logo: Google
```

2201 — GMail – Inbox (2)

2202 — Arthur ... Doug, Gary (8)    Aug 28
Hiking at Mt. Tam Labor Day Weekend ☆

2203 — Elizabeth ... Rachel, Michelle (4)    Aug 27
Dinner at Rudi's

2204 — Liz ... Jess, Chris (7)    Aug 27
Plane tickets for Xmas

2205 — John ... Chris, Lothar (4)    Aug 26
Basketball

2211 — Message 7 of 7

2212 — Plane tickets for Xmas

2218 — 6 read messages — 2213

2216 — Liz    Aug 27
to me

So let's try to get the tickets on the same flight to fly home then.

Let me know what flight you want to take.

2217 — Liz

| Label | Element |
|---|---|
| 2221 | Message 1-6 of 7 |
| 2222 | Plane tickets for Xmas |
| 2223 | 6 read messages |
| 2214 | Liz / to me / So let's try to get the tickets on the same flight then. / Let me know what flight you want to take. / Liz |

Menu:
- 2225-A Inbox
- 2225-B Starred
- 2225-C More ...
- 2225-D Search Mail
- 2225-E Compose Mail
- 2225-F Expand
- 2225-G Archive
- 2225-H Mark as unread
- 2225-I Report Spam
- 2225-J Delete
- 2225K Exit Gmail

| Label | Content | Date |
|---|---|---|
| 2231 | Message 1 of 7 | |
|  | Plane tickets for Xmas | |
| 2232-A | Chris | Aug 26 |
| 2232-B | Jess | Aug 26 |
| 2232-C | Liz | Aug 26 |
| 2232-D | Me | Aug 27 |
| 2232-E | Chris | Aug 27 |
| 2232-F | Jess | Aug 27 |
| 2214 | Liz | Aug 27 |
| 2235 | to Chris, Jess, me / So let's try to get the tickets on the same flight to fly home | |

METHODS FOR TRUNCATING ATTACHMENTS FOR MOBILE DEVICES

RELATED APPLICATIONS

This application is a continuation of and claims priority to U.S. patent application Ser. No. 11/934,065 filed Nov. 1, 2007, the entire contents and substance of which are hereby incorporated by reference.

TECHNICAL FIELD

The disclosed embodiments generally related to the field of mobile devices, in particular, to allow mobile devices to retrieve information from a server using a client application such as electronic email.

SUMMARY OF EMBODIMENTS

In some embodiments, attachments associated with any communication are stored on a server. When a communication is sent from a server to a client device, a representation of the attachment that includes an indication of a native file type of the attachment is also sent along with the communication to the client device. In responding to a user's request to view the attachment, the server transcodes the attachment from the attachment's native file type to a viewable file type configured to display in the client device and then transmits at least a portion of the attachment in the viewable file type to the client device for display.

In some embodiments communication between the server and the client device is wireless. Thus, the communication, the representation of the attachment, and the attachment in a viewable file type are all transmitted to the client device wirelessly. In other embodiments, the server determines the viewable file type in which to transcode the attachment from its native file type. In still some embodiments, the server determines the viewable file type in which to transcode the attachment, using the received information that is associated with the user request that has metadata containing information about a type of the client device associated with the request, from the client device.

In some embodiments, the attachment in the viewable file type is truncated when transmitted to the client device in accordance with a predetermined criteria but an option is provided to the user to fetch for more or the entire text. In some embodiments, the predetermined criteria may include at least one of client device type, data transmission cost, the native file type, or a combination of the above.

BRIEF DESCRIPTION OF THE DRAWINGS

For a better understand of the nature and embodiments of the invention, reference should be made to the Description of Embodiments below, in conjunction with the following drawings in which like reference numbers refer to corresponding parts throughout the figures.

FIG. 4C illustrates an example of a descriptor file in accordance with some embodiments of the present invention.

FIG. 22A is a screen shot of an exemplary conversation listing view in a client device in accordance to some embodiments of the present invention.

FIG. 22B is a screen shot of an exemplary view of a modified conversation in a client device received from a server in accordance to some embodiments of the present invention.

FIG. 22C is a screen shot of an exemplary pull down menu in a client device with an "expand" command for expanding the unified header in the modified conversation in accordance with the present invention.

FIG. 22D is a screen shot of an exemplary view of an expanded modified conversation in a client device received from a server in accordance with some embodiments of the present invention.

FIG. 22E is a screen shot of an exemplary view of a pull down menu with an "expand" command for expanding a message in an expanded modified conversation, in a client device, in accordance with some embodiments of the present invention.

FIG. 22F is a screen shot of an exemplary view of an earlier message expanded in the modified conversation in accordance with some of the embodiments of the present invention.

DESCRIPTION OF EMBODIMENTS

Figure 1:
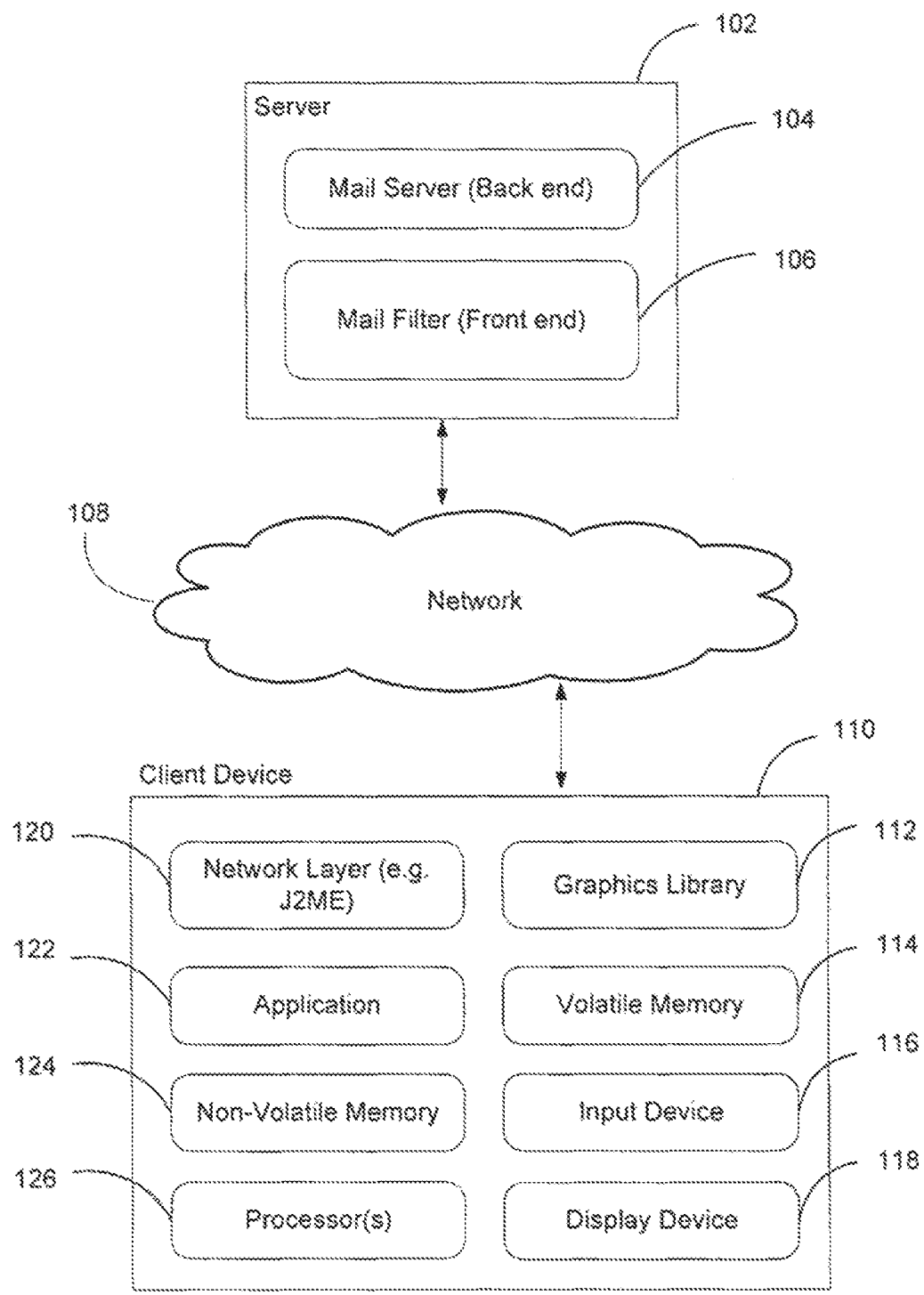
FIG. 1 schematically illustrates a client-server based network system in accordance with some embodiments of the present invention.

The present invention is directed to a client-server system and corresponding method of organizing and displaying messages sent to and by a user of a mobile communication device.

Mobile devices, specifically, mobile communication devices such as cellular telephones, personal digital assistant (PDA), and smart phones that incorporate many PDA features into a cellular telephone are becoming extremely popular. Mobile communication devices have evolved from being an accessory to an indispensable part of everyday life for many users. This is particularly true for professionals, but is growing increasingly common for students and non-professionals. Electronic mail (email) has been a primary mode of communication utilized by all types of people, not just students and professionals, but anyone with basic knowledge of using a computer. While many people operate email applications on their mobile devices, there are several limitations that prevent email applications from running efficiently on mobile devices.

First, mobile devices lack memory storage capacity when compared to a computer. For example, when an email application is activated, if there are a large number of messages in an inbox, a mobile device may not be able to download all the messages to its local memory. Second, mobile devices have limited processing capability comparing to computers. Email applications or any application that has a complex set of executable instructions and involves a large amount of data transfer runs slowly on a mobile device because of its limited processing power and storage space. Third, data transmission cost is expensive. Service providers for mobile devices generally charge a premium for all data other than voice data transferred to and from mobile devices. Thus a user without an unlimited data plan could face significant fees related to frequent usage of a mobile device for Internet browsing or sending/receiving emails. Lastly, all mobile devices have a small display and a small input device. A typical screen for a mobile communication device ranges from about 2" to about 3" wide. A cellular phone typically has a numeric pad for phone dialing and a few soft keys for other functions while a Blackberry™, TREO™, or other smart phones, has an alpha-numeric entry pad. The small screen size precludes display of a large amount of information compared to, for instance, a typical electric display for a computer. The small keys and buttons on mobile devices make manual operation cumbersome and slow compared to, for example, a full-size keyboard.

In view of the aforementioned issues, it would be desirable to have an email application that is streamlined and adapted for use in mobile devices, ranging from simple mobile devices with lesser memory and computation power to the advanced mobile devices with more memory and computation power. This email application should contain features and functionalities that address at least some of the limitations, described above, that are associated with operating an email application on a mobile device. For example, this email application should minimize data transmission costs while providing relevant and desired information to a user, and have user interface features that account for the small screen and small keys and buttons on the mobile device.

FIG. 1 schematically illustrates a client-server based network system in accordance with some embodiments of the present invention. The client-server based network system includes a server 102, a network 108 for communication, and a client device 110. It should be understood that a common implementation of this system is to have at least one server, at least one communication network, and a plurality of client devices. In a different configuration, the system may include a plurality of servers, a plurality of networks and a plurality of client devices.

In some embodiments, the server 102 includes a mail server 104 coupled to a mail server filter 106. The mail server 104 acts as the backend of an email system and is coupled to the mail server filter 106, which acts as the front end of the email system. The mail filter 106 generally interfaces with the network 108. The mail filter 106 also responds to and interacts with the client device 110. In some embodiments, the mail server 104 is an email server system and the email is in a form of a conversation, such a system is disclosed in U.S. patent application Ser. No. 10/816,428, titled "Email System with conversation-Centric User Interface", filed on Mar. 31, 2004. This application is hereby incorporated by reference in its entirety. A conversation includes one or more relevant messages covering a conversation topic. Other criteria beyond the conversation topic may be used to determine which messages are parts of each distinct conversation. The senders and recipients of the messages are participants in the conversation. All messages directed to a user of the mail system are grouped into a plurality of conversations and presented to the user in a conversation-based format, individually or jointly. More detailed discussion about the implementation of the server is provided below.

The mail server 104 that forms the back end of the server 102 performs operations related to management, storing, organization and execution of the electronic mail that includes conversations and messages that collectively form each conversation. The mail filter 106 serves as an intermediary between the mail server 104 and the client device 110, which sends requests to the mail server 104. In some embodiments, the client device 110 includes an application 122, such as a client based email application, operating on the client device 110. The client based email application 122 provides instructions or requests to drive the operations on the server 102. Specifically in some embodiments, the mail filter 106 receives the requests from the client based email application 122, translates them for the mail server 104, and instructs the mail server 104 to carry out the appropriate operations in accordance with the requests from the client device 110. In other embodiments, the mail filter 106 also performs services for the application 122 operating on the client device 110 such as a mobile communication device like a cell phone or a wireless personal digital assistant device. These services are configured to respond to the capabilities of the applications operating on the client device 110. For example, the mail filter 106 performs actions that may include, but are not limited to, authenticating mobile devices, compressing response data and stripping out data which a mobile client device does not require, client based applications or a server based application.

The client device 110 includes an input device 116 and a display device 118. The display device 118 may be an active or passive, colored or monochrome, display capable of displaying graphics and/or text. The client device 110 also includes one or more processors 126 coupled to a volatile memory 114 for short term storage, a graphics library 112 to store graphical information, non-volatile memory 124 for long term storage, a network layer 120, for example a Java2 Micro Edition (J2ME) layer for interaction with a communication network 108 and applications 122. In general, the client device 110 can have components configured to support applications 122 that are client based applications or a server based applications. In some embodiments, the client device 110 is a mobile wireless communication device communicating with the server 102 via a wireless network, such as a local cellular network. The mobile wireless communication device can also have WiFi, WiMAX, Bluetooth or other means of wireless communication. Common mobile wireless communication devices that are mobile include cellular telephones like those made by Samsung, Nokia, Sony-Ericsson, Motorola, LG etc., smart phones like the Treo™, Blackberry™, iPhone™ etc., other kinds of mobile devices that communicate wirelessly.

For instance, in some embodiments, the client device 110 can be a mobile telephone device, such as, a Nokia 6300, a Motorola RAZR™, and a Sony Ericsson K610i etc. In other embodiments, the client device 110 may be a more complex mobile communication device like a smart phone, such as a Blackberry™ Pearl, a TREO™, or an Apple iPhone™ etc. Still in other embodiments, the client device may also be a device for mobile text communication such as a Sidekick™. In other embodiments, the client device 100 can be any portable electronic device, such as a GPS receiver or a portable computer, or a personal computer that is not portable.

The network 108 is generally a cellular network, but can be any network that allows communication between the client device 110 and the server 102. Other forms of a network 108 for communication include, but are not limited to, a LAN, a WiFi network, and a WiMAX network. Typically, network 108 is also referred to any form of wireless network, as the present invention generally concerns an e-mail application based on a conversation system for wireless mobile communication devices.

Figure 2:
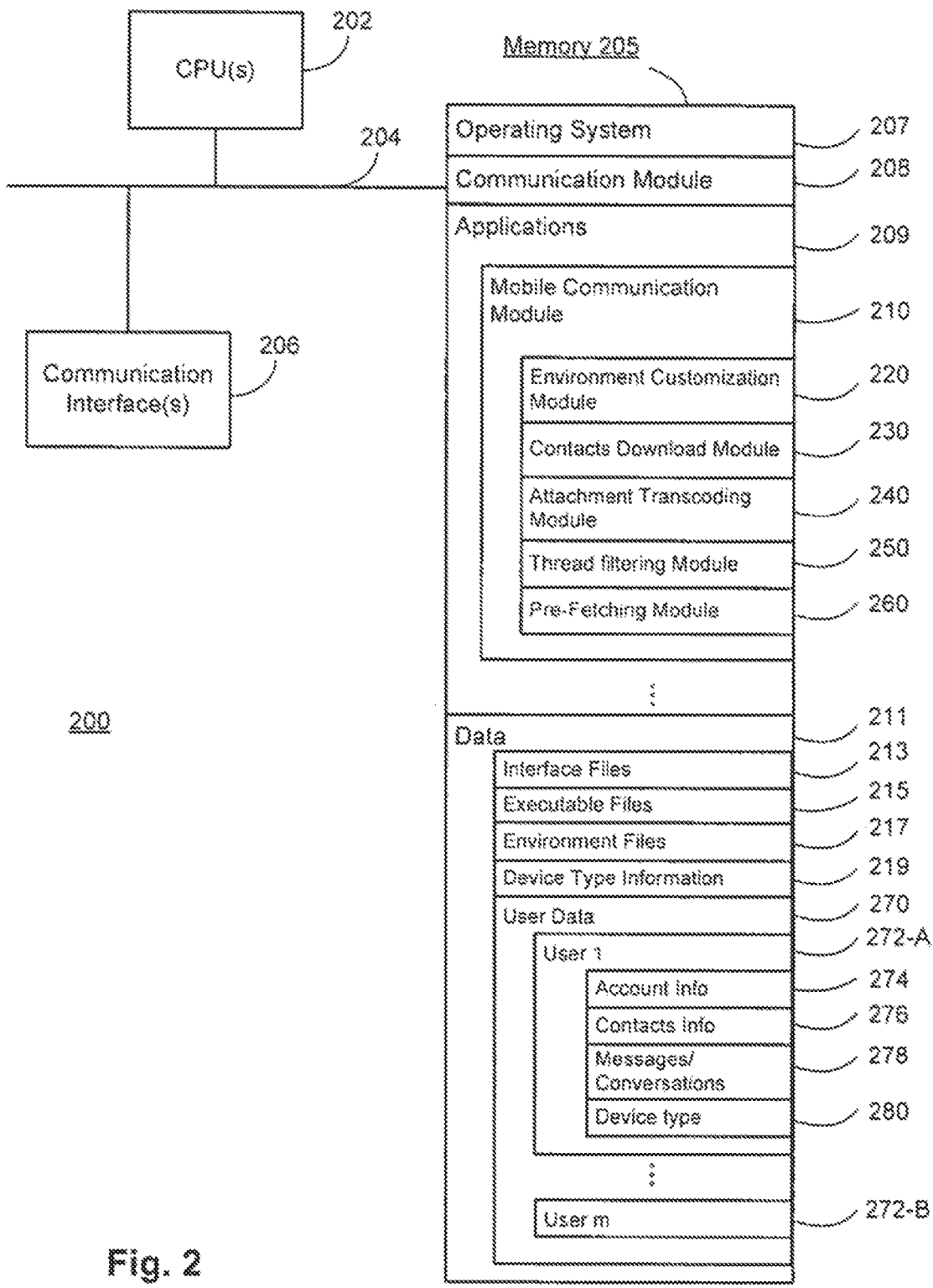
FIG. 2 is a block diagram of an exemplary conversation server in accordance with some embodiments of the present invention.

FIG. 2 is a block diagram of an exemplary conversation server 200 in accordance with some embodiments of the present invention. The server 200 typically includes one or more processing units (CPU's) 202, one or more network or other communication interfaces 206, memory 205, and one or more communication buses 204 for interconnecting these components. Memory 205 includes high-speed random access memory, such as DRAM, SRAM, DDR RAM or other random access solid state memory device; and may include non-volatile memory, such as one or more magnetic disk storage devices, optical disk storage devices, flash memory devices, or other non-volatile solid state storage devices. Memory 205 may optionally include one or more storage devices remotely located from the CPU(s) 202. In some embodiments, memory 205 stores the following programs, modules and data structures, or a subset thereof that includes an Operating System 207, a Communication Module 108, and an Applications Module 209. Note that the organization of the software components described with reference to the server memory 205, including system software components, server applications and components thereof, program modules and stored data, are exemplary and do not preclude any alternative arrangement or organization of the functionality attributed herein to these components. Other embodiments may combine the functions attributed to these components in any combination, including a subset or superset of these components. This is true of any and all software components described herein with reference to any server or client device.

The operating system 207 includes procedures for handling various basic system services and for performing hardware dependent tasks.

The communication module 108 is used for interfacing applications 209 to other mobile communication devices. Interfacing using the communication Module 108 is accomplished via the one or more communication network interfaces 206 (wired or wireless) and one or more communication networks, such as the Internet, other wide area networks, local area networks, metropolitan area networks, and so on.

Applications 209 include different client driven or server driven applications. If an application is a client driven application, when the application is active on the server, the application itself is driven by commands originating from a corresponding application in the client device. If an application is a server driven application, when the application is active on the server, the application on the server drives a corresponding application on the client device. In some embodiments, applications 209 are client driven applications configured and adapted for operation in mobile communication devices, and may include a mobile communication module 210.

The mobile communication module 210 may be a client or server driven application configured to interface with a mobile communication device and perform functions unique to mobile communication devices with respect to a mail application. In some embodiments, the mobile communication module 210 is a software running on the server 200 that includes code that is configured to operate with mobile communication devices. In preferred embodiments, the mobile communication module 210 is compatible for operation with generic mobile devices. In other embodiments, the mobile communication module 210 is configured to operate with specific mobile devices. The mobile communication module may further include at least one of an environment customization module 220, a contacts download module 230, an attachment transcoding module 240, a thread filtering module 250, a pre-fetching module 260, and a data module 211.

As will be described in greater detail below, the environment customization module 220 customizes a client application for a particular device and, sometimes, user domain, and sends the customized applications and any associated or related files to a client device for operation.

The contacts download module 230 sorts and selects a number of contacts from the server for transmission to a client device upon request.

The attachment transcoding module 240 transcodes, translates or re-writes an attachment on a server 200 before sending the attachment to a client device for display. Transcoding is a process of converting an attachment in its native file format into a file format which can be rendered on a mobile device. Generally the original file format of attachments are associated with a native application creating the file, the native application is usually too complex and include formatting information that is not supported by mobile devices. Therefore, for attachments to be displayed on mobile devices, the formatting information is removed, and the file format is converted into a simpler format that can be rendered in mobile devices.

The thread filtering module 250 selects specific text and information, related to messages in a conversation chosen for transmission to a client device, for transmitting to the client device. Each message may contain old text from earlier messages. Sending a message including the old text takes up unnecessary memory. The thread filtering module 250 strips away old text in messages and leaving only the new text written by the sender of the message for sending to the client device.

The pre-fetching module 260 selects relevant messages and message headers, and relevant conversations and conversation headers, for transmitting to a client device. In an email inbox, there are more messages and conversations than is practical to send to a client device having limited memory. The pre-fetching module 260 selects relevant messages, conversations and the associated header information for sending to a client device so that not all the information is transmitted.

The data modules 211 include data files that are used by the Applications 209 and/or are intended for use on client devices 110. In some embodiments the data modules 211 include at least one of interface files 213, executable files 215, environment files 217, device type information 219, and a user data module 270.

The interface files 213 include interface information for different types of client devices. In some embodiments, the interface files 213 may be files or data that can be employed by the environment customization module 220 to enable a target client application to function properly on a particular type of client device.

The executable files 215 include files that can be downloaded to and executed on a client device 110. In some embodiments, the executable files 215 can be executed directly on a particular type of client device 110. In other embodiments, the executable files are customized by respective ones of the server applications 209 to run on a particular type of client device 110 and, in some cases, to reflect preferences of users and/or domains associated with users. For instance, an executable file 215 that provides email services for a mobile client device may be customized by the environment customization module 220 to reflect the application appearance (e.g., font and color palette, to name but a few characteristics) and behavior desired by a particular user and/or user's domain, and then transmitted to a target client device associated with that user and/or domain.

The environment files 217 include data that can be used to customize an applications' environment in conjunction with the environment customization module for customizing an application's environment in accordance with a characteristic the client device identifies itself and wants to be associated with.

The device type information 219 identifies different types of client devices that can interact with the server. This information enables proper configuration parameters and information to be applied by the server when interacting with a particular client device.

The user data module 270 includes personal information of users of different client devices that interact with the server via a mail application. User data 270 includes information for every individual user, ranging from User 1 (272-A) to User m (272-B). The information associated with each user includes at least one of account information 274, contacts information 276, message/conversations 278, and device type 280.

The account information 274 indicates registration and personal information about each user.

The contacts information 276 stores contacts information of each user, including at least name and email address, and may include phone numbers, addresses, nicknames and other relevant contact information.

The massages/conversations module 278 stores messages and conversations that are sent to and received by each user.

The device type 280 stores the type of device of a particular user, which enables quick retrieval of configuration parameters for the client device. This enables the server to avoid going through an identification process each time the client device interacts with the server.

Figure 3:
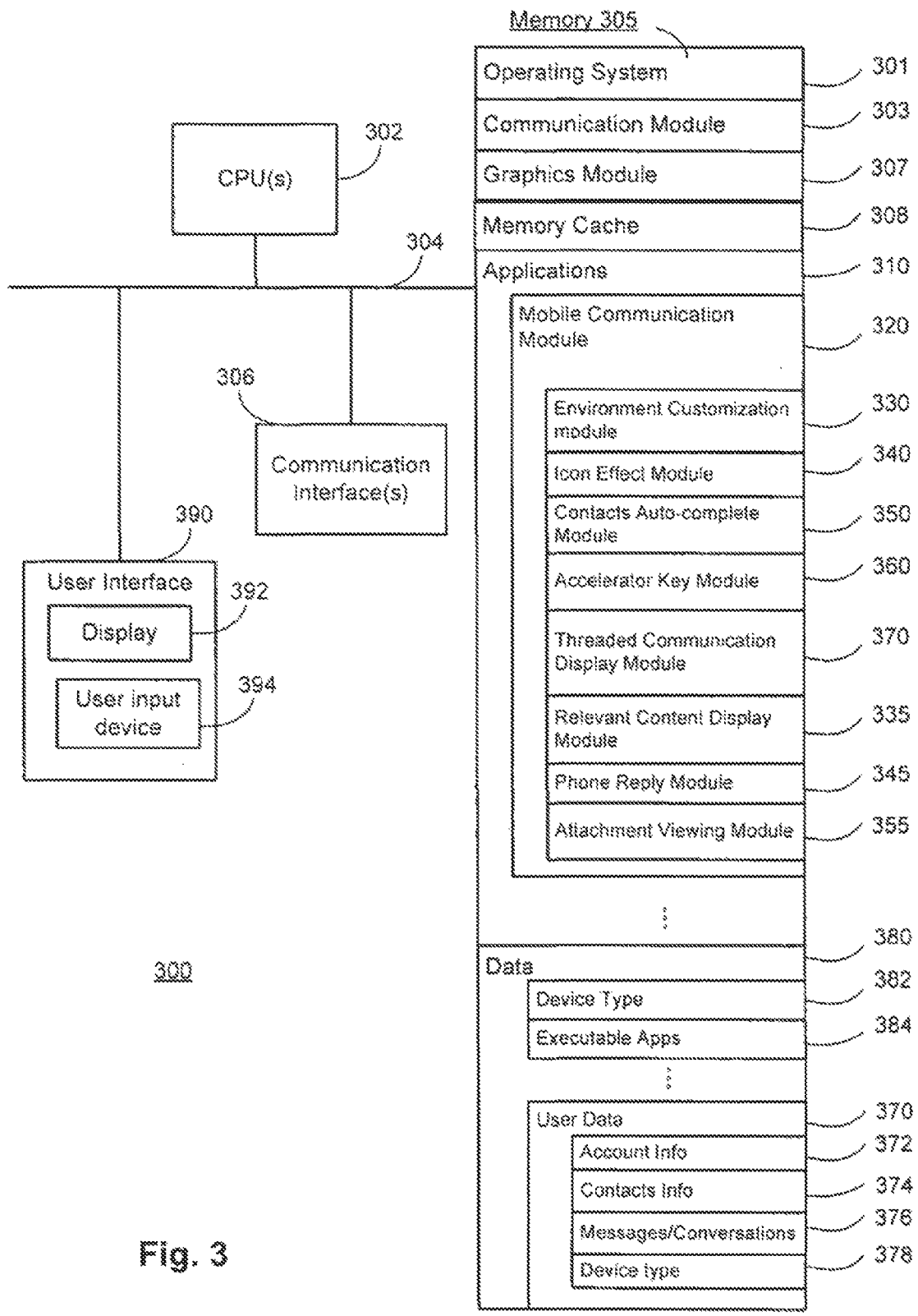
FIG. 3 is a block diagram of an exemplary client device that interacts with a conversation server in accordance with some embodiments of the present invention.

FIG. 3 is a block diagram of an exemplary client device 300 that interacts with a conversation server in accordance with some embodiments of the present invention. The client device 300 generally includes one or more processing units (CPU's) 302, one or more network or other communications interfaces 306, memory 305, and one or more communication buses 304 for interconnecting these components. The communication buses 304 may include circuitry (sometimes called a chipset) that interconnects and controls communications between system components.

The client device 300 also includes a user interface 390 having a display 392 and a user input device 394. The display 392 may include an active matrix display and a touch screen display etc. and the user input device 394 may include a numeric entry key pad, soft keys, touch pad, alphanumeric entry key pad and a touch screen etc. Memory 712 may include high speed random access memory and may also include non-volatile memory, such as one or more magnetic disk storage devices.

Memory 712 may include portable storage devices such as flash memory that can be remotely located from the central processing unit(s) 302. In some embodiments, memory 305 stores the following programs, modules and data structures, or a subset thereof that includes an operating system 301, a communication module 303, a graphics module 307, a memory cache 308, and an application module 310.

The operating system 301 includes procedures for handling various basic system services and for performing hardware dependent tasks.

The communication module 303 connects the applications 209 to servers via the one or more communication network interfaces 306 (wired or wireless) and one or more communication networks, such as the Internet, other wide area networks, local area networks, metropolitan area networks, and so on.

The graphics module 307 renders graphics during operation of a user interface in the operating system 301 or any applications presented on a display of the client device.

The memory cache 308 temporarily stores information for quick access and is temporarily used by an active application. In some embodiments, information stored may include messages, conversations, and contacts. In some embodiments, there is certain information downloaded from the server, which are stored temporarily in the memory cache 308, when the application is active. The downloaded information that is stored temporarily can include, but is not limited to, contacts, messages, conversations, and header information of messages and conversations.

The application module 310 includes one or more applications that can be executed on the client device 300. Some of these applications 310 are configured to interact with the server 200 to perform tasks related to communications, user interface management, application customization, and management of phone and email applications. An application may be driven by the client device or driven by a server when in operation. In some embodiments, one of many applications may be a client or server driven mobile communication module, such as a mobile communications module 210.

The mobile communication module 320 interfaces with a server and performs functions with respect to an application such as a mail application. In some embodiments, the mobile communication module 320 is a server based application where the application on the server initiates and prompts a user for response through a corresponding application residing on the client device. In other embodiments, the mobile communication is a client based application where the application on the client device initiates and drives the software operation that resides on the server. The mobile communication module may further include at least one of: an environment customization module 330, an icon effect module 340, a contacts auto-complete module 360, a threaded communication display module 370, a relevant content display module 335, a phone reply module 345, an attachment transcoding module 355 and a data module 380.

The environment customization module 330 requests and downloads an application customized in accordance to user characteristics that are associated with a user of the client device from a server.

The icon effect module 340 varies one or more property(s) of an icon to reflect a change in status or state of an item.

The contacts auto-complete module 350 performs a contacts auto-complete function when a user is composing a message or in certain contexts of a mail application.

The accelerator key module 360 associates a predetermined key or button on the input device with a predetermined action so that activation of the key can directly activate the predetermined action.

The threaded communication display module 370 displays particular text in messages and conversations and particular header information of an individual or a collection of messages. The particular text is unique to the message and conversations. In a message, for example, the particular text displayed does not include old text from earlier messages in the conversation.

The relevant content display module 335 displays the relevant messages and relevant header information of one or more conversation(s) and the relevant conversations from all the conversations in an inbox. A limited number of relevant conversations and messages are downloaded onto the client device and displayed. Other less relevant conversations and messages have to be additionally requested by the client device from the server.

The phone reply module 345 enables a user to place a phone call to a sender of the message. The phone reply module 345 uses a phone number found in metadata of the message for making the phone call.

The attachment viewing module 355, in response to a user request to view an attachment to a mail message, issues the server 200 a request for the attachment and manages display of the attachment on the client device 300. In some embodiments, the attachment is transcoded on the server before being transmitted to display on a particular client device.

The data module 380 stores data files used by the applications 209. In some embodiments, the data module 380 may include at least ne of: device type 382, executable applications 384, user data 370, account information 372, contacts information 374, a messages/conversation module 376 and device type 378.

The device type 382 is data about the client device itself. The device type 382 is provided to the server to enable the server to recognize the client device. The client device can therefore properly configure data transmitted from the server for operations and/or display on the client device.

The executable applications module 384 includes other applications that operate in conjunction with the mobile communication module 320. For example, these applications 384 may include applications that carry out specific functions for a mobile communication module 320 or other applications that supplement operation of a mobile communication module 320 on the client device.

The user data module 370 includes personal information for a user of the client device 300 and/or an associated mobile communication application 320. The User Data 370 can include one or more of: account information 372, contacts information 374, messages/conversations 376 and device type information 378.

The account information 372 is used to support server verification of the user's registration and personal information about the user.

The contacts information 374 contains a range of information for contacts of a user of the client device 300;

The messages/conversations module 376 includes downloaded versions of at least some messages and conversations that are sent to and received by a user of the client device 300.

The device type 378 includes information about the type of the device 300, which can be transmitted to the server to enable the server to quickly retrieve parameters about the client device 300 without having to go through the identification process each time the client device interacts with the server.

A Mechanism for Serving Up Customized Applications From a Download Server

Many business entities, universities, associations, or other organizations (collectively, "Organizations") distribute customized software applications for mobile electronic devices via download from servers. The servers can be external to the Organization, such as when an Organization secures hosted Gmail™ (electronic mail services) for their own domain (e.g., "AAACorp.com," "XYXUniv.edu," or "Mygroup.org"). The application downloads can also be provided from the Organization's own internal servers. For software applications that are associated with users who have a common domain or Organization, there is often a desire to customize such applications to include features, appearance and/or user interface characteristics that are common to and/or associated with that individual domain or Organization. For example, certain applications benefit greatly from customized branding opportunities, in the form of targeted images, text, and/or color. As another example, an Organization that provides its employees with applications for mobile devices might desire those applications to provide standard user interfaces, features and links to specific online resources and web pages.

Customization of an environment for an application can be accomplished with little difficulty in situations where client device on which the application is to be executed do not have significant limitations or do not vary significantly (e.g. laptop computers or desktop computers running one or two standard operation systems and having comparable memory/storage, processing power, and display capabilities. This is not the case with mobile devices, which can have significant variation in all of these areas.

Technical specifications of mobile devices vary a great deal across different manufacturers. Inherently, mobile devices are constrained in storage and limited in processing capability, therefore, customizing an application for different users associated with different domains on different mobile device is a complicated task. Furthermore, for a customized application to function properly on a mobile device, the customized application should be configured according to the technical parameter(s) of the device. Conventionally, one approach is to transmit a generic client application and domain-specific images separately to a client device, which would execute the generic application with the domain specific images. This approach is costly from the perspective of data transmission (due to downloading of images in addition to the application). It also takes up valuable storage on the client device due to a need to store more information than is strictly necessary for the application and client. Furthermore, conventional approaches require a network connection before showing any images or domain-specific info to the user. Most importantly, conventional methods do not allow domain-specific customization of application names or any other static application data.

Another approach is to build specific customization files for each domain and device type. Although this gives the best user experience since every aspect of the application can be customized for the domain, this process is not scaleable as it requires executable application files to be build for all possible combinations of domain and device types. For example, if there were 'm' domains supported by a particular server of client applications, each with their own application customizations, and 'n' client device types that could use applications downloaded from that server, there would be a need for that server to store for possible transmission to a client device 'm×n' executable, customized application files. A solution, as presented herein, is to generate, in real-time, the customized application and any related files for a specific device type and specific domain upon receiving a client request. This approach dramatically reduces server storage requirements. This approach also ensures that an executable application delivered to a target device is both appropriate for the device's configuration and provides the user experience and/or branding associated with the user's domain.

Figure 4A:
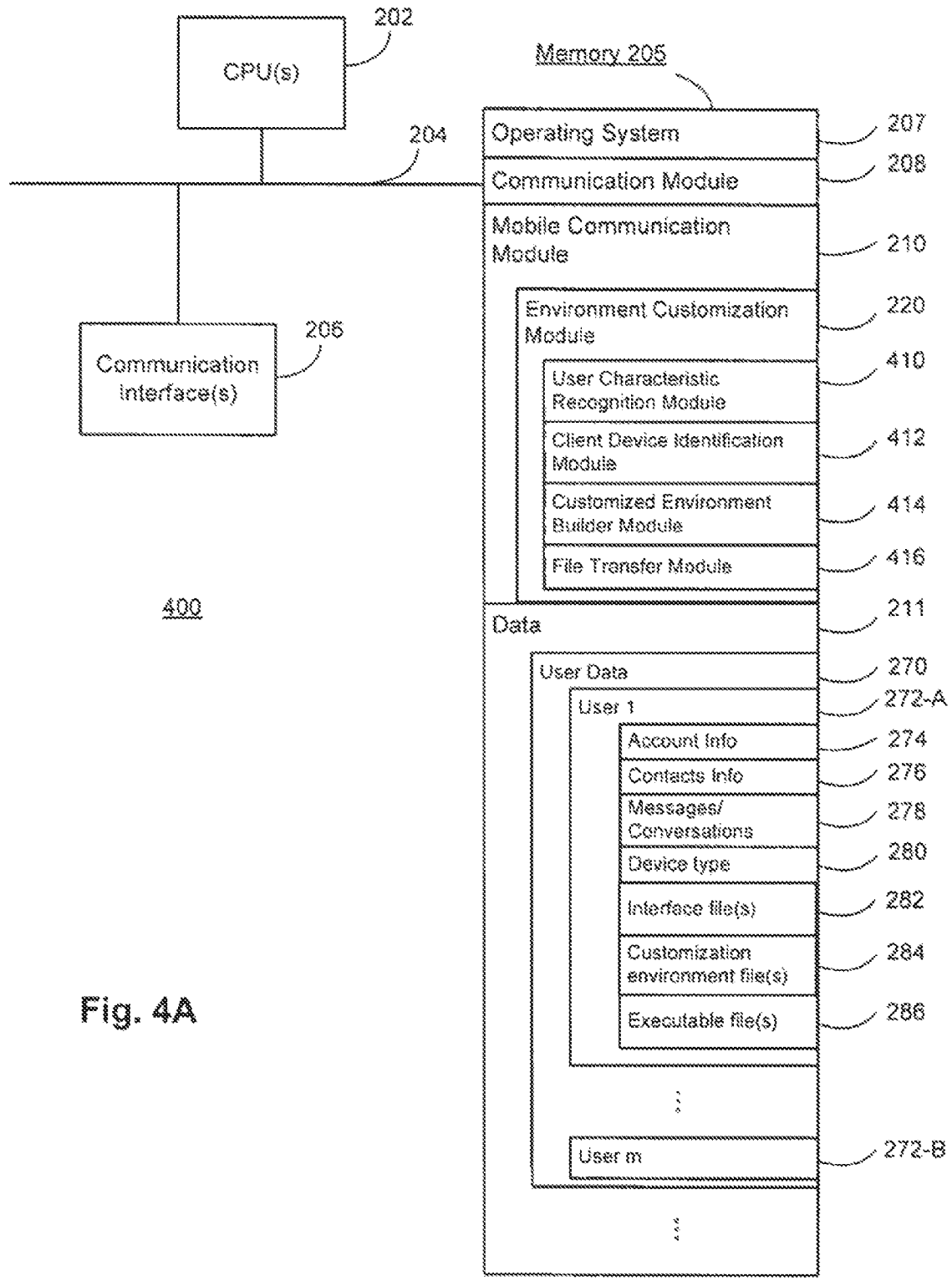
FIG. 4A is a block diagram of an exemplary server having components for carrying out functions of an environmental customization module in accordance with some embodiments of the present invention.

FIG. 4A is a block diagram of an exemplary server having components for carrying out functions of an environmental customization module for an application in accordance with some embodiments of the present invention. In some embodiments, the application to be customized is an email application that is a client based application operating in a client device such as a mobile communication device. In other embodiments, the application may be a client-server application that may be browser based and operate on a personal computer or a wireless mobile device such as a cellular telephone.

The server structure 400 in FIG. 4A, similar to the server 200 described in FIG. 2, includes one or more processing units (CPU's) 202, one or more network or other communication interfaces 206, memory 205, and one or more communication buses 204 for interconnecting these components. Memory 205, similar to the server 200 described in FIG. 2, also stores programs, modules and data structures, or a subset thereof, includes an operating system 207, a communication module 108, a data module 211 containing similar user data 270 for individual users that may range from user 1 272-A to user m as previously described in FIG. 2, and a mobile communication module 210.

The mobile communication module 210, as shown in some embodiments, includes an environment customization module 210 that can customize an environment of an application based on a user characteristic in real time upon receiving a request from a client device. This customization environment module 210 further includes at least one of a user characteristics recognition module 410, a client device identification module 412, and a file transfer module 416.

The user characteristics recognition module 410 identifies one or more user characteristic(s) and associates the user characteristic(s) with a particular application customization for the user's operating environment. FIG. 4E shows a chart of possible user characteristics 430. User characteristics 430 are associated with a particular domain to which a user is connected. The different user characteristics 430 can include, but are not limited to different kinds of icons, background or skins, menus, text effects, fonts, colors, graphics, animations and sounds etc. that can appear in an application. In some embodiments, a user identifies his/her associated user characteristic(s) and submits a request for an application to be customized according to the identified user characteristic(s). In some embodiments, the domain to which user characteristics is connected can be identified from one or more of the following, including without limitation: an IP address from which the request is made, header in the request, and the domain or website from which the request is sent. In other embodiments, the characteristics recognition module 410 may have a way of identifying the user characteristics itself. The user characteristics recognition module 410 recognizes the user characteristic(s) and associates the user characteristic(s) with a particular type of customization that may include a change in the appearance of the application such as particular colors, fonts, text effects and graphics etc. The customization may include hyperlinks or other information to be included in the customized application that is relevant to the user characteristic(s) which may otherwise not be present in the default application.

The client device identification module 412 identifies the type of client device to which the application is to be transmitted. This module takes into account the client type information in the customization of an application to ensure that the application operates in accordance with the parameters defined by the type of the client device and can take advantage of certain features, if any, which may be unique to the type of client device. Examples of client type information determined by the client device identification module 412 include, but are not limited to memory of the device, processing capability of the device, screen size, hardware for communication interfacing, and any device specific features that the application can be customized to take advantage etc. The client device identification module 412 makes this determination based on client device information found, for example, in the user agent string. The user agent string is commonly known in the art and may include unique device type, operating system, carrier, and firmware etc. In some embodiments, the user agent string can be found in the request sent from the user's device. FIG. 4E also shows a chart of possible device type 431 that include, but are not limited to, alpha numeric input device, reverse soft keys, operating system, firmware, carrier, screen size, and memory size etc.

The customized environment builder module 414 builds and assembles into a single package the executable file(s) 286 for the application and the customized environment information that reflects the user's domain and device specific customizations. In some embodiments, the customized environment information includes data from a customized environment file 284, which includes data about application and domain customizations (such as links, colors, fonts, etc.) and an interface file 282, which includes information as to appropriate customizations for particular devices (such as assignments of functions to the keys that are available on specific devices). Examples of information contained in the interface files and customization files are illustrated in FIG. 4F. For instance, interface files contain information to enable compatibility of the application with the client device. The interface files may contain data about the device type 431 and associated characteristics of the device type including without limitation, type of input device, screen size, memorize size and type of operating system etc. of the client device. Customization files include user characteristics 430 associated with a particular domain 430 that includes but is not limited to, icons, background (skins), menus, text effects, fonts, colors and graphics etc.

In some embodiments, executable file(s) 286 for the application, customized environment files 284 specific to user characteristics and interface files 282 specific to client device types, are generated real-time in response to a request received from a client device. In some embodiments, the interface file(s) 282 and the customized environment file(s) 284 are separate files. In other embodiments, the information typically contained in an interface file 282 and a customized environment file 284 are combined into one file. In some embodiments, information contained in an interface file 282 and information contained in a customize environment file 284 are stored in two separate databases. Information from these separate databases may be retrieved by a server upon learning about a domain with which the user is associated and the type of client device. The server either transmits two files separately, or combines the two files into one single file for transmission to the client device. In some embodiments the executable file 286 contains at least the executable application and may include other widgets and files which the executable application uses to form a customized application. In some embodiments, the executable file 286 is a JAR file that contains, but is not limited to, icons, graphics, sounds etc. files that are used to customize the application. In these embodiments, the information from an interface file 282 and information from an environment customization file 284 are combined into one text file, e.g. a JAD file. During implementation of the application, the JAD file directs the application executable in the JAR file with the proper files and information such as the software properties for implementation. Thus, in some embodiments, a descriptor text file acting as a map to an executable file and the executable file can be used to implement a customized application on a client device.

The file transfer module 416 transfers the executable file(s) including, for example, at least a JAR file and/or a JAD file, of the application with the customized environment to the client device that is requesting the customized environment files.

Figure 4B:
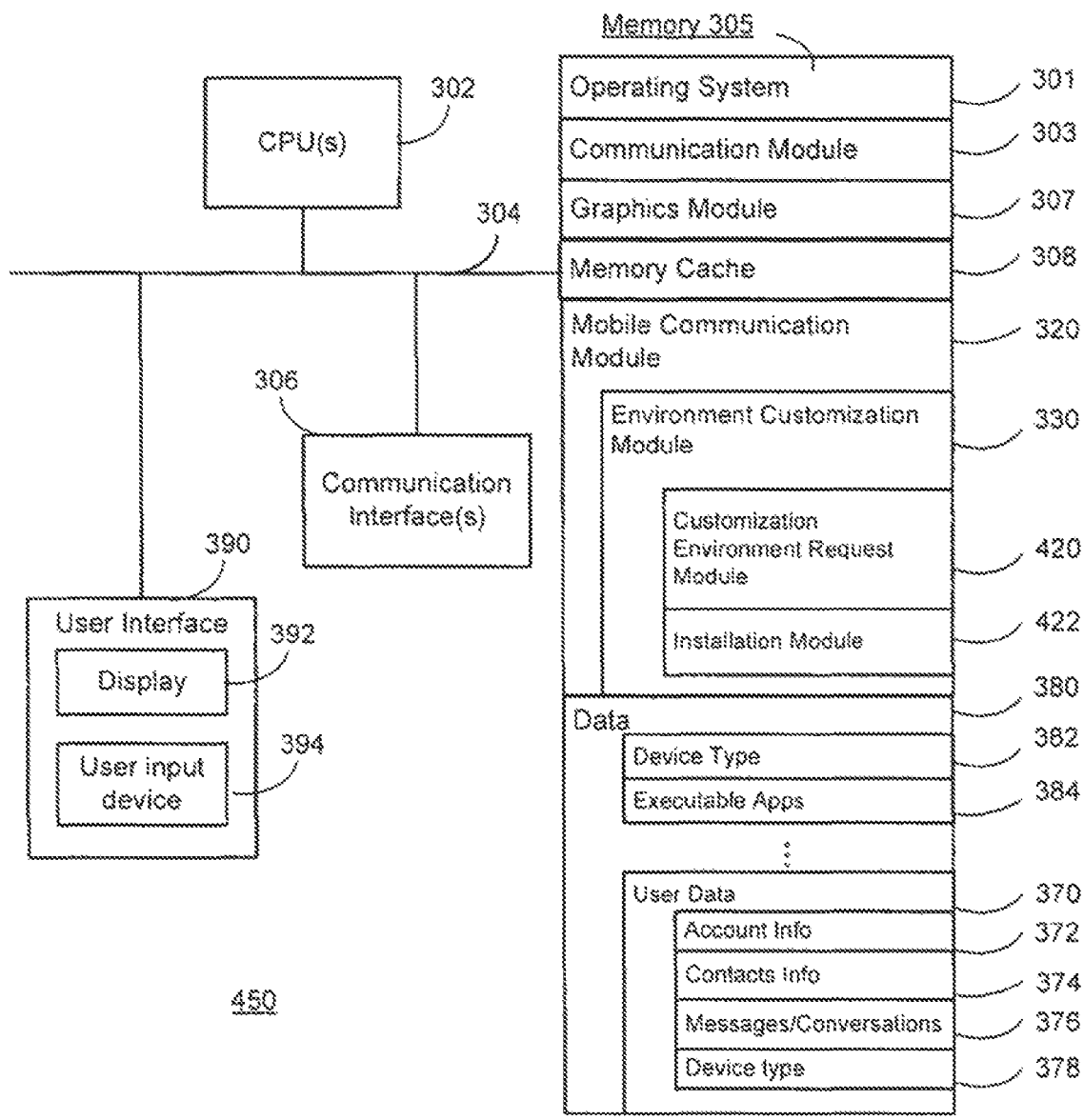
FIG. 4B is a block diagram of an exemplary client device with components to carry out functions of an environmental customization module in accordance with some embodiments of the present invention.
Figure 4D:
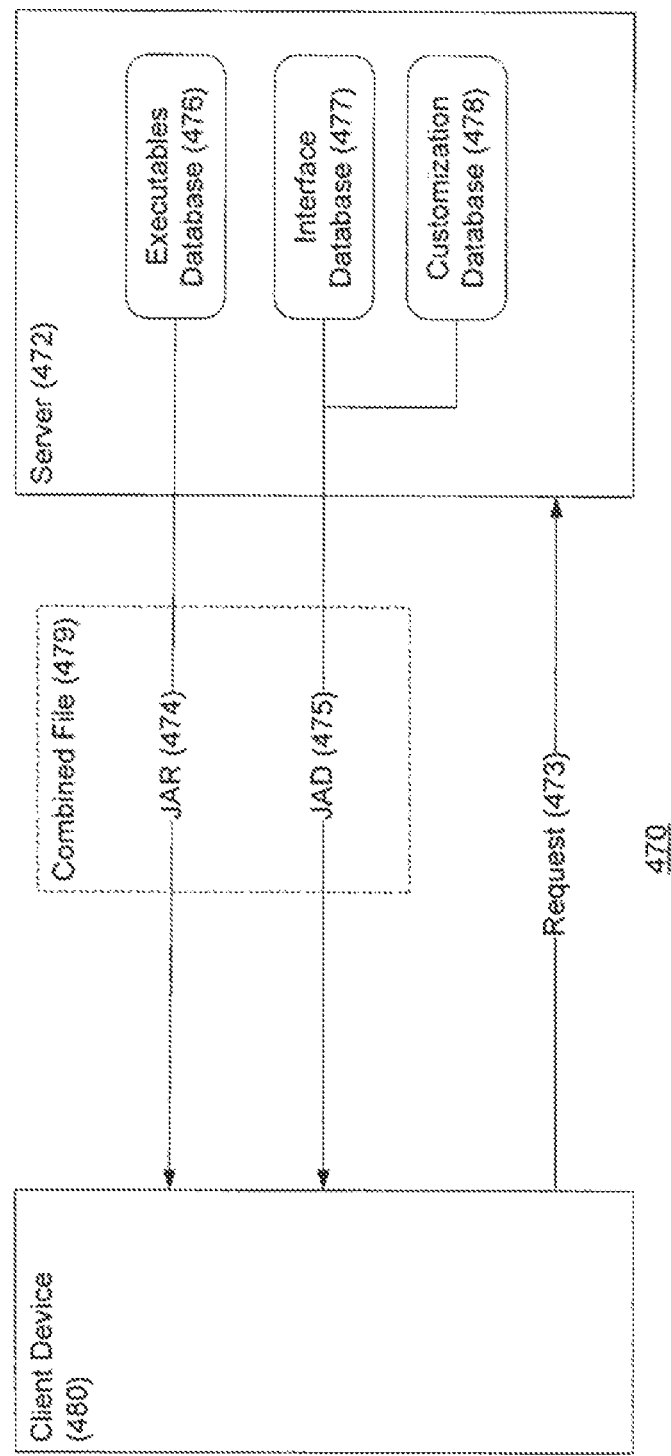
FIG. 4D illustrates a brief overview of the information flow between a client device and a server in accordance with some embodiments of the present invention.
Figure 4E:
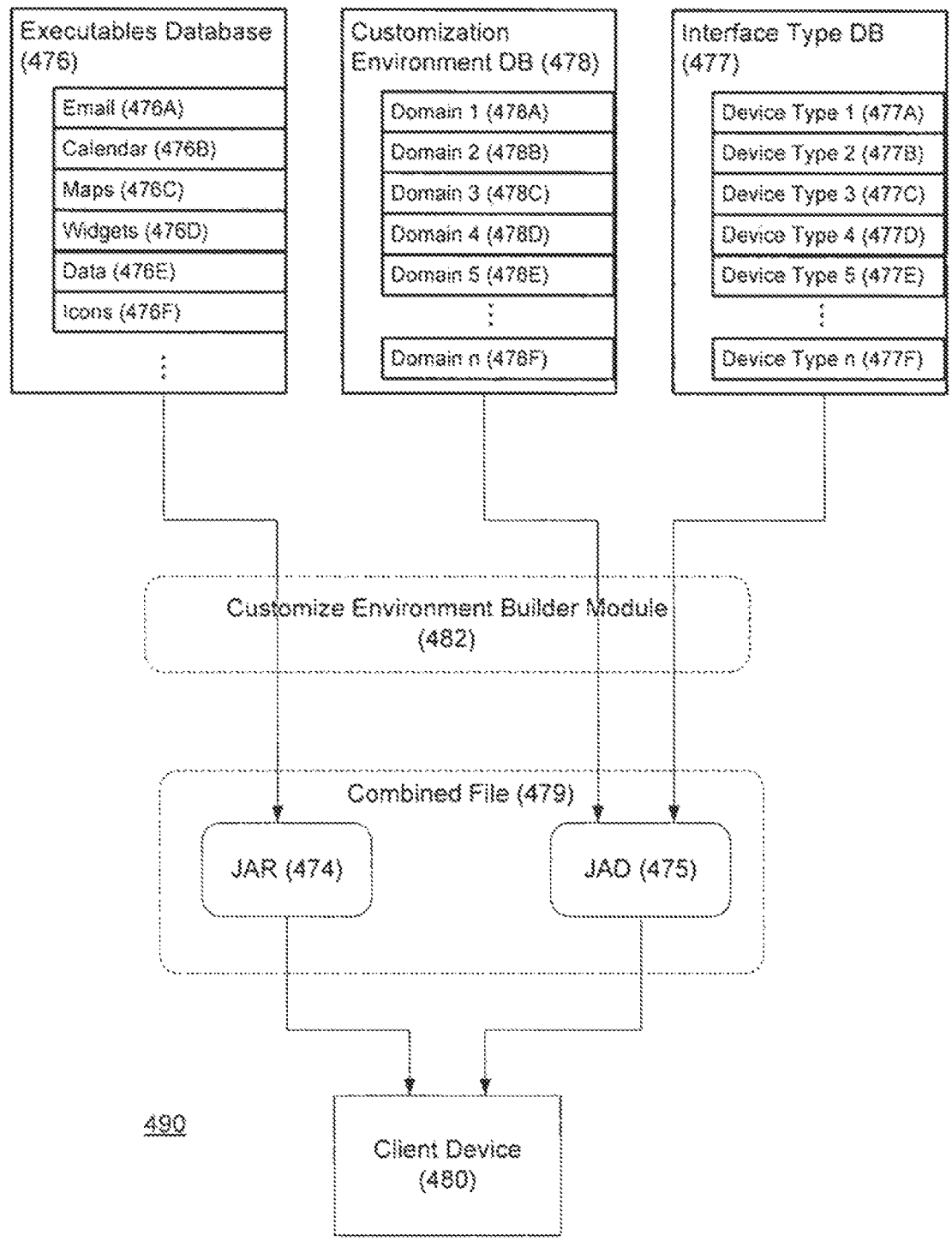
FIG. 4E illustrates a detailed overview of the information flow between a client device and a server in accordance with some embodiments of the present invention.
Figure 4F:
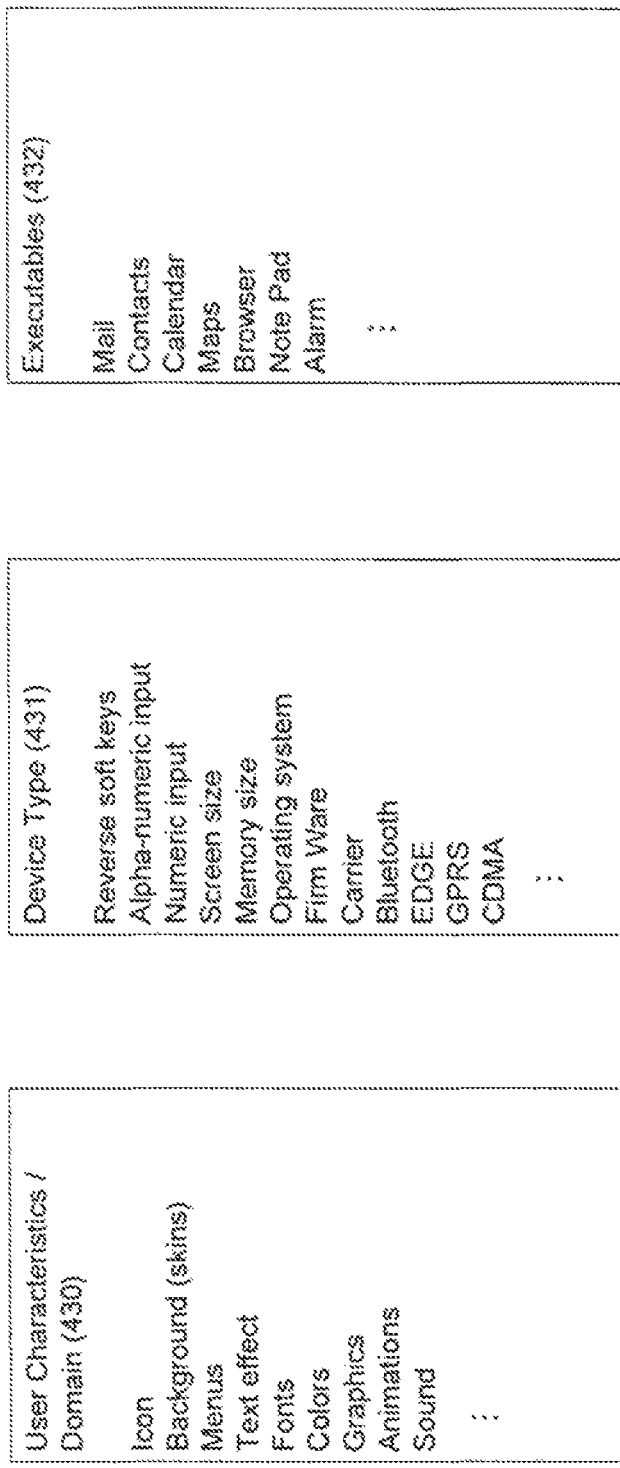
FIG. 4F illustrates examples of user characteristics, device types, and executables in a server for customizing an application in accordance with some embodiments of the present invention.

FIG. 4B is a block diagram of an exemplary client device with components to carry out functions of an environmental customization module in accordance with some embodiments of the present invention. The client device 450 in FIG. 4B, similar to the client device 300 described in FIG. 3, includes one or more processing units (CPU's) 302, one or more network or other communications interfaces 306, memory 305, and one or more communication buses 304 for interconnecting these components. The client device 450 also includes a user interface 390 having a 392 and a user input device 394. Memory 205 similarly includes an operating system 301, a communication module 303, a graphics module 307, memory cache 308, data module 380 containing information about device type 382, executable applications 384, and user data 370, and a mobile communication module 320.

The mobile communication module 320 may include at least one of: an environment customization module 320, which further includes at least one of a customization environment request module 420, and an installation module 422.

The customization environment request module 420 sends a request to a server to customize a particular application according to one or more specified user characteristics. In one embodiment, the user characteristics are those associated with the specific appearance of the environment, or user interface, of the application, such as the colors, text effect, font, and/or graphics treatment of one or more elements of the application's user interface. In response to the request, the client device may receive a descriptor file and an executable file, or one executable with the two files (descriptor and executable file) combined, from the server.

The installation module 422 installs the customized application using files received from a server. Possible customized applications include, without limitation, email, calendar, contacts, to do, expense report, and Internet browser applications. In some embodiments, after receiving the executable file(s) from the server, the module 422 may prompt the user for installation and then prompt the user for activation of the customized application. In other embodiments, the module may prompt the user for installation of the application and then automatically activate the customized application. In some embodiments, the module may automatically perform installation of the application and then prompt the user for activation of the customized application. In other embodiments, the module may automatically perform installation of the application and then automatically activate the customized application.

Figure 5A:
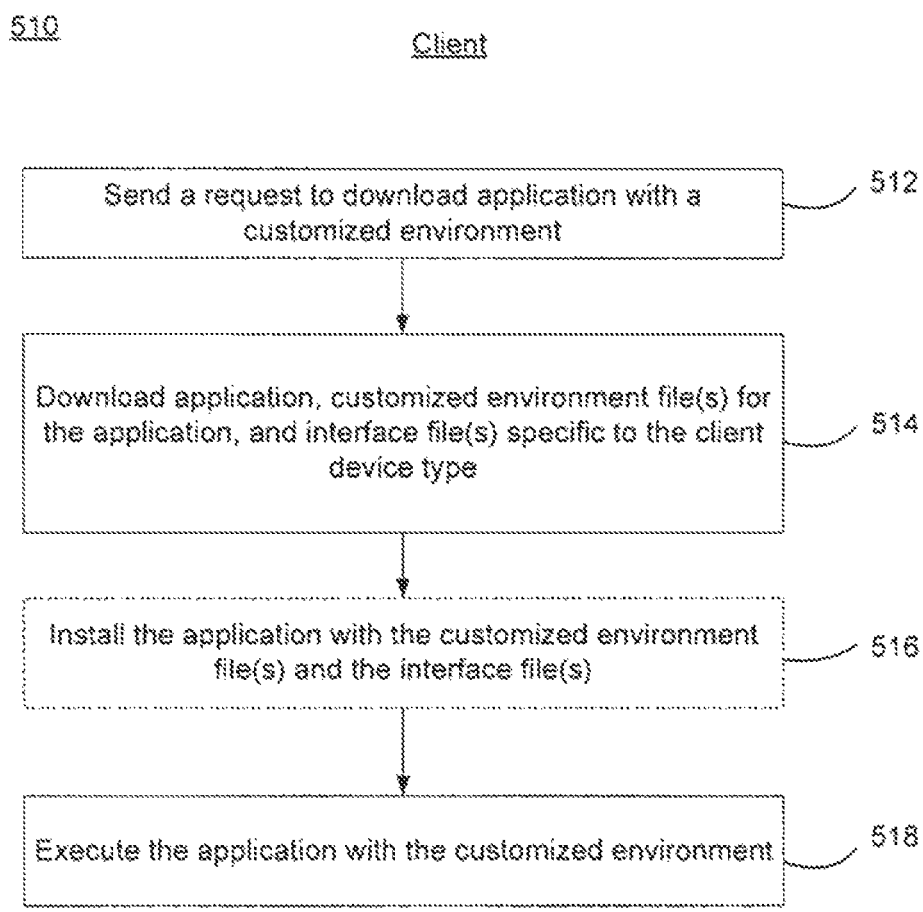
FIG. 5A is a flow diagram illustrating how a client device obtains a customized application from a server in accordance with some embodiments of the present invention.

FIG. 5A is a flow diagram illustrating how a client device obtains a customized application from a server in accordance with some embodiments of the present invention. In some embodiments, as shown in FIG. 5A, a client device sends a request to server to download an application with a customized environment as shown in block 512. The application, when operating on the client device, is to have a customized environment that is associated with a user characteristic.

In block 514, the client device downloads the application or executable file(s) from the server, and if any is necessary, the customized environment file(s) for the application, and the interface file(s) specific to the client device type. In some embodiments, the customized environment file(s) and/or the interface file(s) specific to the client device type may be integrated into the application or executable file(s) before being downloaded onto the client device. In other embodiments, the application or executable file(s) and the customized environment file(s) and/or the interface file(s) may be downloaded as one file. In some embodiments, the application, the customized environment file(s) and/or the interface file(s) can also be downloaded as two or more files. Regardless of whether the application, the customized environment file(s) and the interface file(s) are downloaded as one or two or more files, the application will operate on the client device with a customized environment. That is, it will have an appearance and functionality associated with the user characteristic.

In some embodiments, after being downloaded onto the client device, the interface file(s) provides configuration information for the application that enables the the application to become compatible with the client device and, in some embodiments, to take advantage of special features of the client device type during operation of the application on the client device. For instance, if the client device is a mobile phone with a touch screen rather than buttons for user inputs, the interface file would provide information to support modification of the menus or items for use with a stylus instead of buttons (e.g., for activation of certain items or menus.) Furthermore, configuration of certain buttons of a client device may be customized. For example, certain soft keys can be re-configured to perform designated actions, such as a left soft key corresponding to "cancel" and a right soft key corresponding to "ok". In some embodiments, according to the type of client device, the server may have information about how much space is available on the client device, or a client device or a user may prompt by the server about how much memory space is available on the client device for caching of the application. For example, if the client device is a mobile communication device with a large memory, all contacts and entire threads of conversations may be downloaded onto the client device. On the other hand, if the client device is a typical mobile phone that has limited memory, only a limited number of contacts and parts of threads of conversations may be downloaded onto the client device.

In block 516, optionally, the customized application is installed. As described above, a client device may automatically install the application with the customize environment file(s) and the interface file(s), or the client device may prompt a user before installing the application with the customized environment file(s) and the interface file(s).

In block 518, the application with the customized environment file is executed on the client device. The application will display a customized environment corresponding to the user characteristic and the application will operate within parameters defined by the type of the client device.

In some embodiments, the client device and the server interact through a wireless interface where the request and the downloading of file(s) are accomplished wirelessly. For example, the client device may be a mobile phone or a smart mobile device such as a Blackberry™ or a Treo™.

In some embodiments, the user characteristic is defined by a domain associated with the user of the client device. For example, the user may be an employee of a bank (domain) and therefore the user characteristics, such as logo, colors, graphics, and, optionally, functions etc. are defined by corresponding characteristics that are representative of the bank. Besides physical appearances, the environment customized may include other characteristics defining the domain such as particular functions and features otherwise not present in the default application. In other embodiments, other domain-specific media such as animations, audio clips, themes, skins etc. may also be incorporated as part of the customization of the application.

In some embodiments, the application may be a client based application that executes on a mobile device, such as a mobile device having a wireless communication interface. An example of a client-based application is an email application designed specifically for a wireless mobile communication device. One example of such a client based email application is a mobile version of GMail™ developed by Google Inc. In some embodiments, a mobile version of a client based application is different from a version that is browser based. One such difference is that the mobile version of the application is designed to operate on a mobile device platform. Mobile communication devices have different technical characteristics compared to those of a personal computer. For example, mobile communication devices generally have a smaller screen, limited processing and memory capacities and a less user friendly user input device(s). A mobile version of an application is different from a browser based version in that the former is configured to the technical specifications of the mobile device, taking advantage of some features while avoiding the limitations of a mobile device, to provide a friendly user experience on the mobile device. For example, in some embodiments, not all contacts are downloaded onto a client device. Instead, a subset of the complete list of contacts on the server is sorted according to one or more predetermined factors. In other embodiments, an automatic call back feature is available to the user as an option to reply to a message. Still, other embodiments with different configuration adapted to operation on a mobile device are available and described in detail later in this disclosure.

Figure 5B:
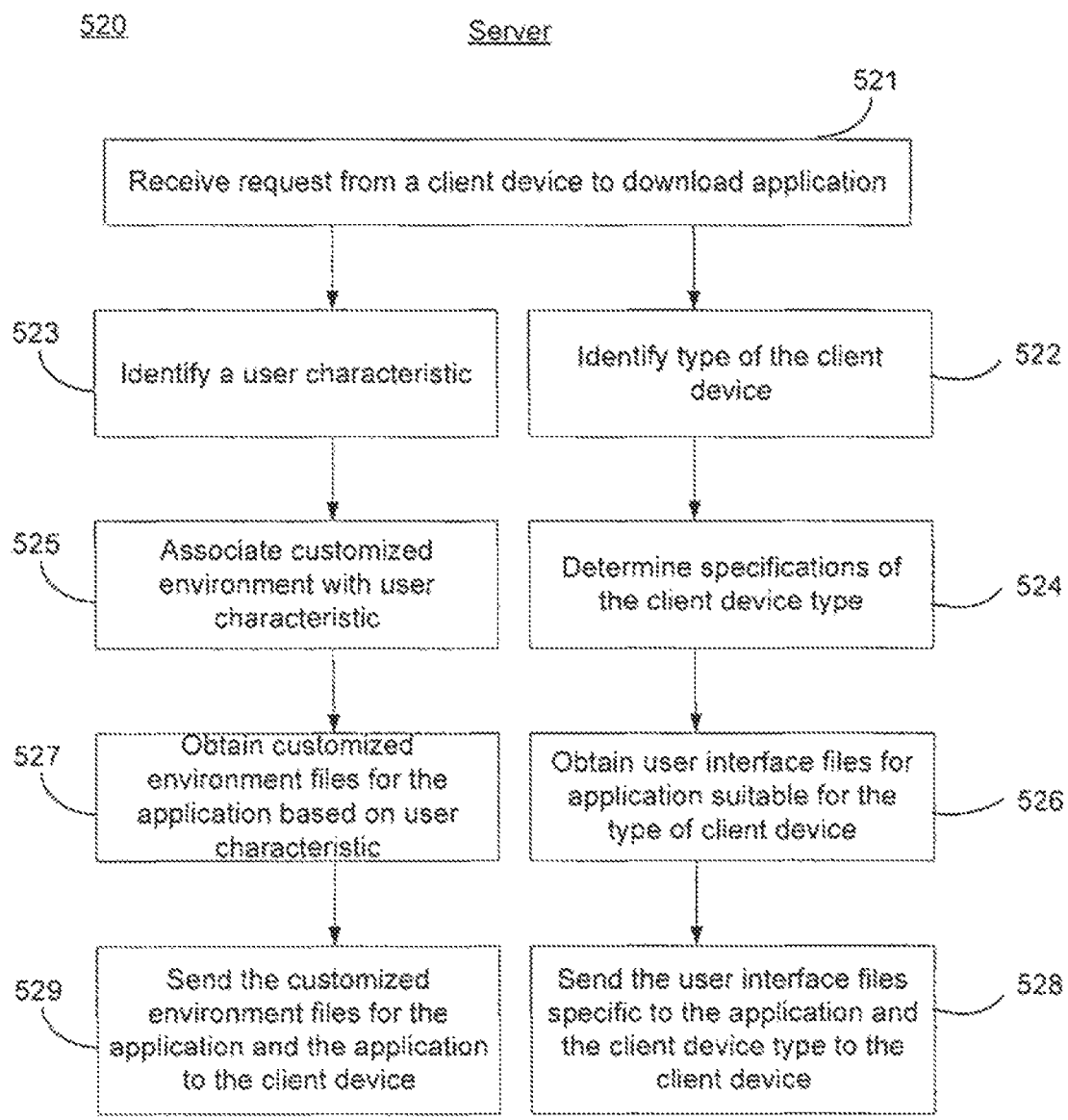
FIG. 5B is a flow diagram illustrating how a server responds to a client device requesting a customized application in accordance with some embodiments of the present invention.

FIG. 5B is a flow diagram illustrating how a server responds to a client device requesting a customized application in accordance with some embodiments of the present invention. In some embodiments, as shown in block 521, a server receives a request from a client device to download an application. The server identifies a user characteristic and identifies the type of client device, as shown in blocks 523 and 522 respectively. Preferably, the server recognizes the user characteristics and type of client device by a user agent string via the metadata in the request transmitted. However, in other embodiments, a server may request such information from the client device or from the user.

In response to a request from the client device, the server associates a customized environment with the user characteristic(s) and also determines the specifications of the client device type, as shown in blocks 525 and 524 respectively. The server further obtains, in response to the request, the customized environment file(s) associated with the user characteristic(s) for the application and also the user interface file(s) for the application suitable for the type of client device, as shown in blocks 527 and 526 respectively. In some embodiments, the customized environment file(s) define the interface appearance of the application. In other embodiments, a customized application may include functional features associated with a user characteristic. Also, in some embodiments, the interface file(s) include data that enables an application to operate properly on a target client device in accordance with the type of the client device. The interface file(s) determine if an application can function appropriately with the type of client device.

In some embodiments, the interface file(s) and the customized environment file(s) are generated or assembled on-the-fly, after receiving the request from the client device. This is different from retrieving interface or customized environment file(s) that are predetermined and readily available on the server and then matching it to the information received in the request. In some embodiments, no customization file for the application environment or interface is stored on the server. For example, customization is performed in real-time and the customized files are generated in response to a user request to download an application. In some embodiments, applications such as those based on Java or Java Micro Edition (J2ME) are client-based application where a corresponding application in the server is driven by commands originating from the application on the client device. In some embodiments, such as Java based applications, the application (executable) or binary file, is sent to the client device as a JAR file or binary file (described in details below). On the other hand, the customized environment file(s) and the interface file(s) (skin information) that are generated in real time, are combined together in the form of a JAD (Java Archive) file. The JAR file, is sent to the client device along with a JAD (Joint Application Development) file. The JAD file, acting as a descriptor file (described in details below) for the application, thus contains information about the client device type and the customization parameters. When the JAR file or the binary file is executed to create the application, it accesses the specification in the JAD file, or the descriptor files, to obtain the appropriate values for each parameter to ensure that the application has the proper customized environment and operates properly in accordance with the type of client device.

In some embodiments that employ Java-based client applications, a server can utilize a database of supported JSRs for particular client device types to determine which version of a requested application to download to a requesting client. As is well known, a specific JSR (Java Specification Request), which is identified by its JSR number(s), corresponds to a particular Java specification and its associated set of required device capabilities and APIs. For example, for Java ME applications, the basic mobile device specification, Connected Limited Device Configuration version 1.0 or 1.1, is defined in JSRs 30 and 139. Similarly, the Mobile Information Device Profile version 2.0 specification is defined in JSR 118, the Wireless Messaging API version 1.1 specification in JSR 120, and the Mobile Media API version 1.1 specification in JSR 135. A device (such as a mobile device) that is said to support one or more particular specifications/JSRs has the ability to execute applications that comply with those specifications. Note that, while a server automatically sends two files, such as a JAR file and a JAD file for Java based applications, with other applications not based on Java, one file may be sufficient, or more than two files may be download to the client.

Various embodiments of the present invention recognize that it would be wasteful of bandwidth and client memory size to download to a client a version of a client application that includes features (identified by the JSRs) that the client does not support. Consequently, in some embodiments, a server generates in advance a number of executables for one or more client applications, each of which uses features associated with different JSRs; and a table of JSRs supported by particular device types. For example, the server might generate in advance five different versions of the same client email application, each requiring client devices with different combinations of supported JSRs. Then, when the client requests a particular application, using the device type information conveyed in the client request, the server would consult its database of device type characteristics to identify the JSRs supported by that type of client device, and subsequently download to the client the version of the application that works with the set of JSRs that are supported by that client. This technique is also applicable to other required device capabilities that may be exercised by the client applications, including support for different graphics APIs or networking and external interface specifications.

These techniques are to allow the client device to inform a server about unique features on the client device (using no more the client device type, in some instances) so the server can provide the client device with an application with an appropriate set of features, corresponding to the unique features of the device. In some embodiments, the information about the client device may sometimes be automatically detected by the request; in other embodiments, the information may be provided by the client. Also, as described above, the information about a particular type of client device can be looked up in a database that maps devices to their capabilities (the client device information can be supplied, for example, in the standard user agent request).

In blocks 529 and 528 respectively, the server sends the customized environment file(s), the user interface file(s), and the application to the client device. As described earlier, the application, the user interface file(s) and the customized environment file(s) may be sent separately or as one combined file with the application. For example, the customized environment file and the program application executable file are sent to the client device in a single download transaction.

In some embodiments, a server has databases containing different information necessary for generating these files. One database would have information about parameters of different device types; another database would contain different customizations associated with different characteristics; still another database would contain different executable files or binary files and data used by the different executable files for creating the corresponding ones of different applications on the client device. FIG. 4E illustrates a brief overview of the information flow between a client device and a server in accordance with some embodiments of the present invention. Upon receiving a request 473 from a client device 480 to obtain a customized application, the server 472 retrieves the information associated with the user device type from the interface database 477 and the information associated with the domain from the customization database 478 and combined them into a JAD file 475. The JAD file 475, in some embodiments, is simply a text file or a descriptor file which the executable reference as a map to locate values and information for forming the customized application. The executable corresponding to the application and the requisite data files for the application are combined into a JAR file 474. The JAD file 475 and the JAR file 474 are either sent separately or as one combined file 479 to the client device. In some embodiments, the combined file 479 is executed to form the customized application on the client device.

FIG. 4E illustrates a detailed overview of the information flow between a client device and a server in accordance with some embodiments of the present invention. In one embodiment, upon receiving a request from the client device, the server obtains information about the client device type from an interface type database 477 and the information about user characteristics and domain customizations from a customization environment database 478 on the server. The server then generates or assembles in real time a descriptor file, e.g. JAD file 475, using the Environment customization module 482. The JAD file 475 is a text file that contains the parameters of the type of client device and the information concerning specific customizations associated with the user and domain characteristics for an application. The server generates the descriptor file (similar to the file shown in FIG. 4C) using information retrieved from the databases corresponding to the information about the user and domain characteristics and the type of client device, which information can be obtained by the server from the client's download request. The parameters associated with the type of target client device are used by the application so it can take advantage of those parameters when operating on the client device. The specific customizations associated with the user and domain characteristics are employed by the application to create the domain/user-specific customized environment for the application as executed on the client device.

In some embodiments as illustrated in FIG. 4E, the customization environment database 478 and the interface type database 477 contains information about different types of domains and different device types. For instance each domain (e.g. domain 1-n, 478A-478F) contains information about a particular domain. Information for each domain may include but is not limited to characteristics in the user characteristics chart 430 as shown in FIG. 4F. Similarly, each device type (e.g. device type 1-n, 477A-477F) contains information about a particular type of device. Information for each device type may include but is not limited to characteristics of the particular device type as shown in the device type chart 431 as shown in FIG. 4F. In some embodiments the information are values, parameters existing in form of text that are referred to by the executables.

In some embodiments, all the application files are built in advance on the server, before receiving any user request, where all the classes used by the applications are pre-verified. The corresponding JAD files for all devices are generated in response to a user request. The JAR files are unpacked before download. A download server is set up to obtain information about the domain to be targeted from the request. For example, the URLs can be in the form of "http://mydomain.com/download/doman_name" where "domain_name" is the relevant domain name. When a download request arrives, the server determines the desired domain and obtains all the relevant images, color information, text etc. for that domain. The midlet names in the manifest and the JAD files are replaced with a simple search and replace consistent with the associated information correlated to the domain identified. The server then repackages the manifest, class files, image files, string resource files, etc. as a JAR in a subdirectory on the download server. The server then copies the JAD file to the same subdirectory and update the JAD with the new JAR file and other information. This JAD file is then served to the user along with the JAR file. In this manner, an appropriate version of the executable application (in the JAD file) and device and domain customizations (in the JAR file) are quickly provided to the client in an efficient manner that does not unduly tax server memory resources.

FIG. 4E also illustrates the generation of a JAR file 474 from the executable database 476 on the server in some other embodiments. In response to the client device request, the Environment customization module 482 retrieves the executables corresponding to the customized application requested by a user. In some embodiments, each of the JAR 474 files contains executable files 476 that may include, but are not limited to, an email application 476A, calendar application 476B, map application 476C and other supporting data for the application, including, but not limited to, widgets 476D, data 476E, and icons 476F. In some embodiments, the JAR file 747 is a single file containing at least one executable file and other data used by the executable file for creating a customized environment for the application. As described above in some embodiments, the JAR file 474 and the JAD file 475 may be sent to the client device 480 as a single combined file 479 or be sent as separate files. Once the file(s) arrive at the client device, the JAR file 474, once executed, will call upon the JAD file 475 for information about the device type and user characteristics and customizations (such as color. The executable in the JAR file will implement the values and parameters contained in the JAD file and also use the appropriate information in the data 476E, widgets 476D, and icons 476F etc. to properly customize the environment.

In some embodiments, a range of different data 476E, different widgets 476D, and different icons 476F capable of creating a range of different customizations are sent with each JAR file 474 associated with a particular application such as email 476A. However, in other embodiments, upon identifying a user characteristic associating with a particular domain and the device type from a user agent string and/or request from the client device, the server is capable of selecting only the particular supporting files (e.g. data, widgets, icons etc.) necessary for the executable application to form the particular customized application in the JAR file.

FIG. 4C illustrates an example of a descriptor file in accordance with some embodiments of the present invention. As described above, an example of a descriptor file is a JAD file, an example of which is shown in illustration 430 in FIG. 4C. Illustration 430 shows a JAD file for the following environment: a client device 461 that is a "Samsung-SPH-A920" mobile phone, a downloaded application that is Gmail, and application customizations for an Organization that is "Google." As shown, the JAD file provides customization for a specific user input device configuration, in this case the user interface of the "Samsung-SPH-A920" mobile phone. (Note that different target client devices could have different configurations, based on their different arrangements of user interface elements). For example, there are entries to reverse the soft keys 471A, and to change values for operations of other keys including the left soft key 471E, right soft key 471G, select key 471C, and menu key 471H etc. Generally, there can be any number of customizations that are inserted into the descriptor file. For example, there is an entry for background color 481A which is red. Along with animations 481B, and Logos 481C for Google, the physical appearance can be customized. Other different customizations are also possible, including, but not limited to, the features and functions of the application, and features of the client device (such as keys and functions of keys as described above). In different embodiments, a descriptor file, such as the JAD file, would reflect appropriate customization entries for the application being downloaded, the target device and the Organization or domain with which the user is associated.

In some other embodiments, the server can also assemble a single compressed file for downloading. For example, this is possible with a device operating on a Windows Mobile Platform. In these embodiments, all executable file(s), icon(s), graphics library and any other reference file(s) necessary for the executable file(s) may be compiled into a CAB file. This CAB file is essentially a zipped file or compressed file containing multiple files. The icon(s), graphics library and reference file(s) contains the specific customization parameters for implementation in the application. Once the executable file is being executed on the client device to create the application, the executable file(s) will point to the different files to grab information in those reference file(s) to define and create the environment.

It should be known that while physical appearance and some functional aspects of the application can be changed, operations of the application with its customized environment on a client device still needs to match parameters of the client device type such as screen size and memory in order for the application to function properly. For example, different types of client devices, such as PDA (personal digital assistants), and, different brands and models of cell phones have different screen sizes (e.g. large screen v. small screen) and different processing and storage capacities. Therefore, both the user characteristics and proper device type need to be identified for the server to properly generate applications with customized environments for operation on a particular client device. It is also the case that, in an alternative embodiment, the server stores application characteristic files for a particular domain and device characteristic files for particular device types, and integrate them into an executable to generate the application. Alternately, these files may be sent as one or more separate files to the client device along with the executable file to enable the executable file to generate a customized environment for the application.

In some embodiments, the request for a customized application may also be obtained through a SMS (Short Message Service) based download scheme. In an SMS based download scheme, the server sends an SMS link to the user for the user to download the desired application. For example, the server can build the required binary in parallel with sending the SMS message so the customized application or the binary will be ready when the user visits the link. This way, the downloading of the customized application or binary files will be ready to proceed immediately. Furthermore, in other embodiments, binaries or customized applications may be cached or stored for the most common device and domain combinations so the server does not need to construct the combination multiple times. One way of determining which are the common combinations is to determine at the server which combination of domains and applications are most frequently downloaded and types of devices most frequently requesting this combination of domain(s) and application(s). Furthermore, in other embodiments, one approach for caching or storing popular combinations is to use a fixed size memory with an LRU (least frequently used) eviction scheme where the least recently used items are discarded first.

Figure 5C:
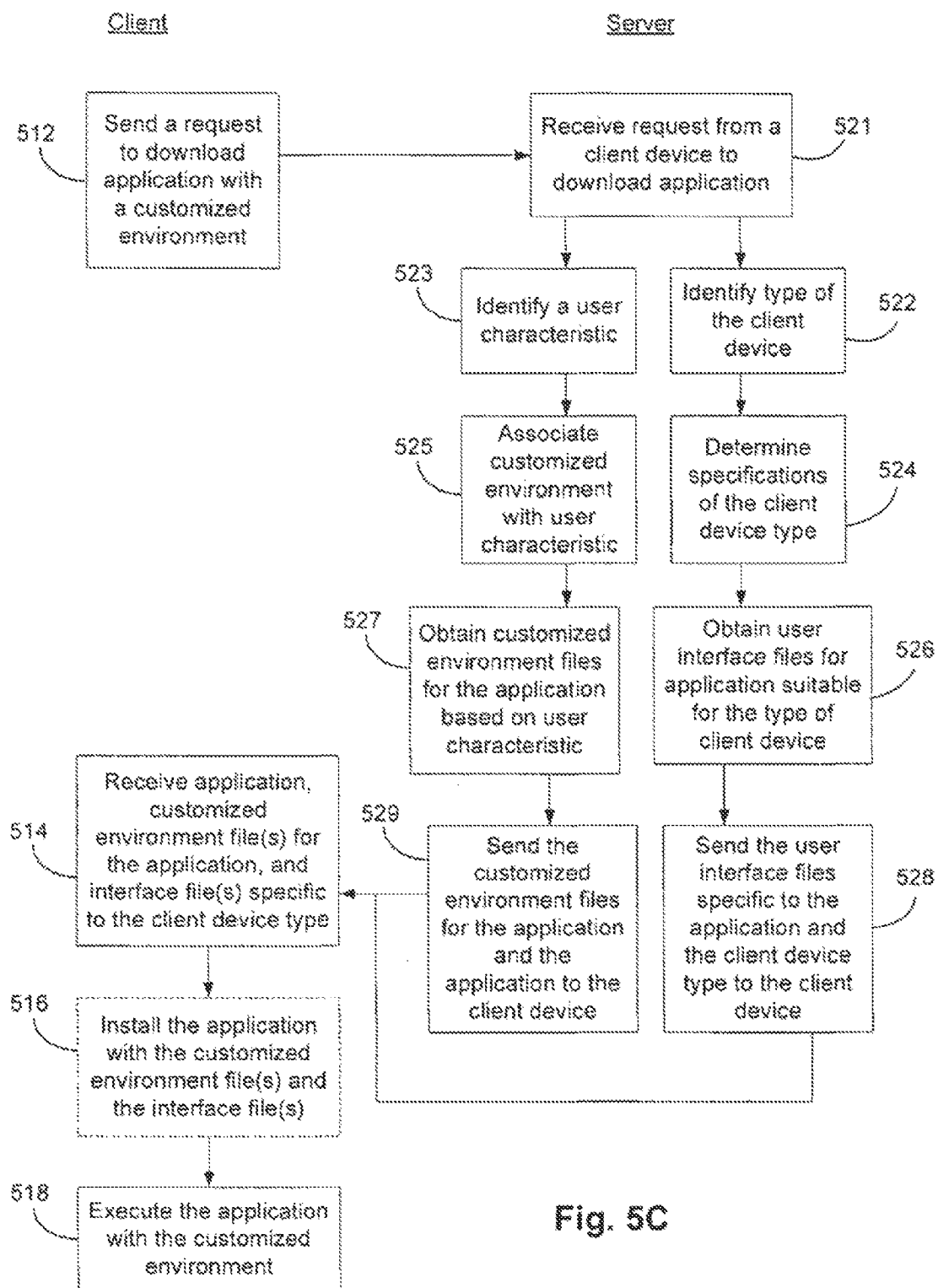
FIG. 5C is a flow diagram illustrating an exemplary interaction between a client device requesting for a customized application and a server sending the customized application in accordance with some embodiments of the present invention.

FIG. 5C is a flow diagram illustrating an exemplary interaction between a client device requesting for a customized application and a server sending the customized application in accordance with some embodiments of the present invention. FIG. 5C contains similar details as described in FIGS. 5A and 5B and is intended to illustrate the interaction between the client device and the sever at different blocks in FIGS. 5A and 5B.

Figure 6A:
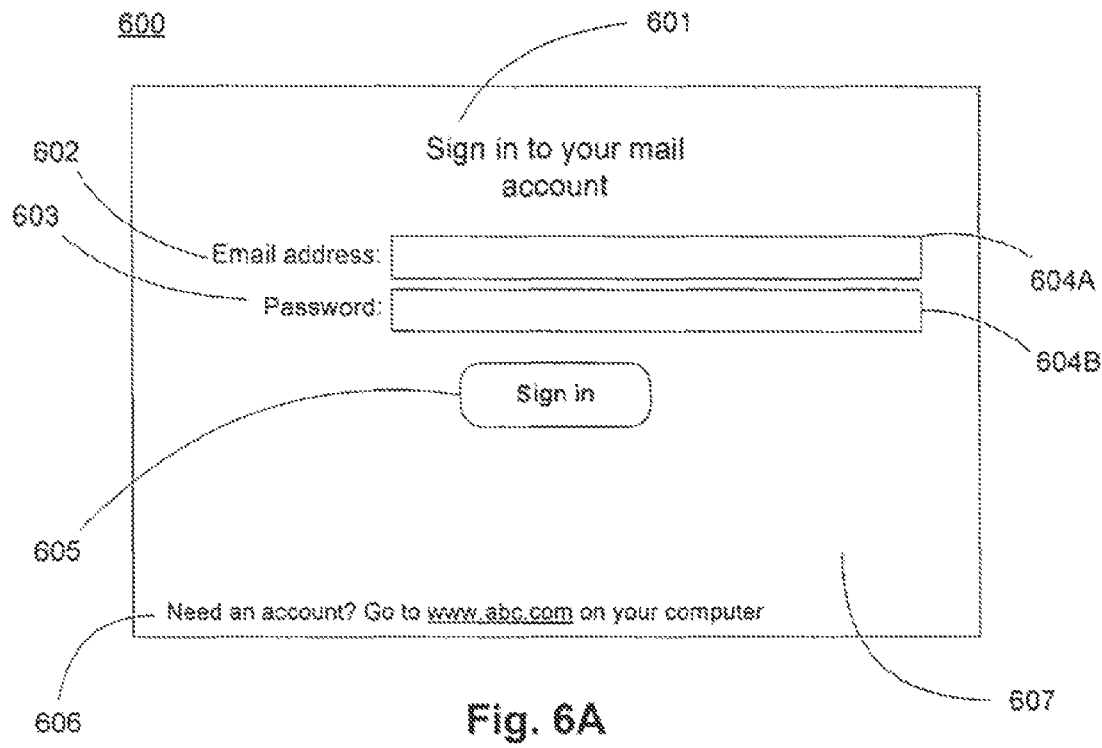
FIGS. 6A and 6B illustrate screen shots of a "log-in" page with a non-customized environment and a customized environment, respectively, of an exemplary application on a client device in accordance with some embodiments of the present invention.
Figure 6B:
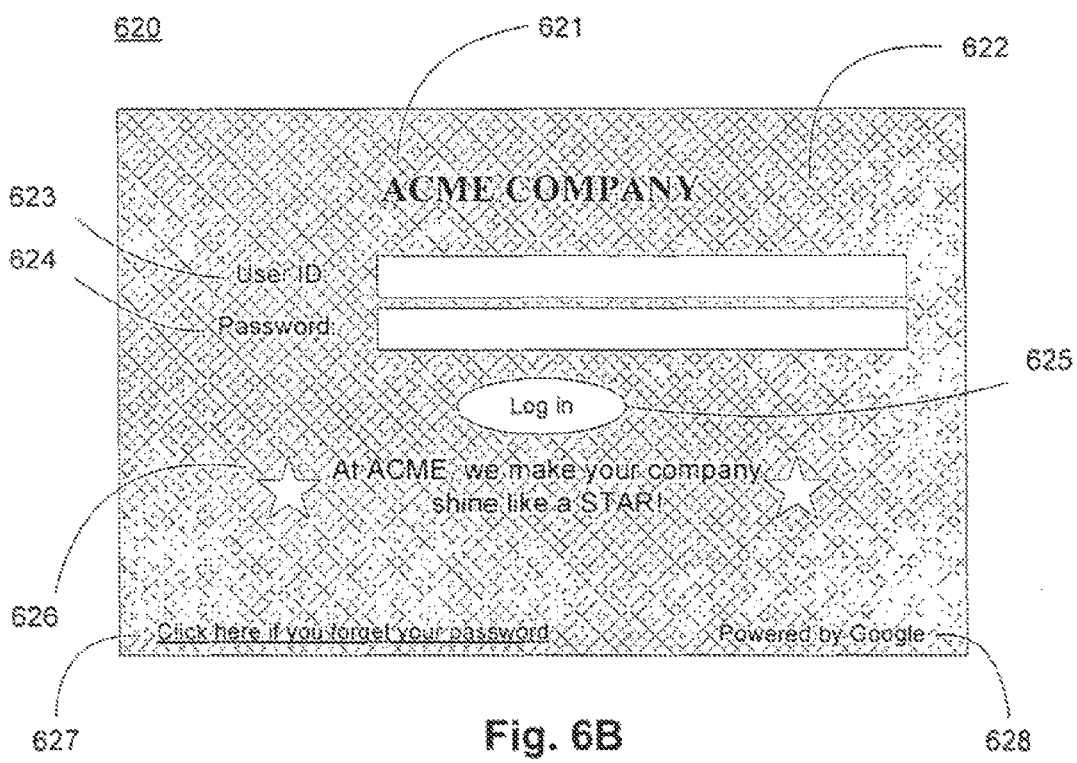

FIGS. 6A and 6B illustrate screen shots of a "log-in" page with a non-customized environment and a customized environment, respectively, of an exemplary application on a client device in accordance with some embodiments of the present invention. FIG. 6A illustrates a non-customized "log-in" page of an exemplary email application program. There is a default greeting 601 to inform a user the purpose of the page, along with an email address field 602 and password field 603 corresponding to data entry boxes 604A and 604B respectively to receive user inputs. A user interface button 605 is displayed in a rectangular configuration with rounded corners for a user to activate after data entries in boxes 604A and 604B. The background 607 of the default "log-in" screen is blank and does not contain any graphics. At the bottom of the "log-in" page, there is a note 606 informing the user how to obtain an account.

On the contrary, FIG. 6B illustrates a customized "log-in" page having an environment customized according to user characteristics defined by a domain in which the user belongs, in this case, ACME Company. As illustrated, the customized background 622 is not blank but instead is patterned. The background may also be of different colors and/or contain different graphics. Replacing the default greeting is the company name 621 which may also be in a form of a company logo or other graphical display. The email address is now replaced by a User ID field 623. In other words, the data that is interpreted by the application will now change from an email address to a user identification number or something similar for user identification purposes. Therefore, the customization need not be limited to physical appearance, but may also incorporate other substantive changes involving a functional feature of the application.

Other physical appearance changes may include using an oval user interface button 625 instead of the previously rectangular one with rounded corners. Further, text of the company logo 626 is also inserted into the background of the "log-in" page. At the bottom right edge of the page may be a promotion 628 by a company creating the application, while on the bottom left edge of the page is a link 627 for a user to retrieve a lost password. Again, this link involves some functional changes comparing to the default "log-in" page beyond the typical change in physical appearance of the page. Nevertheless, a customized environment involving a change in physical appearance of the user interface of the application may contain all relevant physical appearance characteristics of the particular domain in the user interface of the application. This may include different images, text, names, graphics, colors and other physical attributes.

Figure 6C:
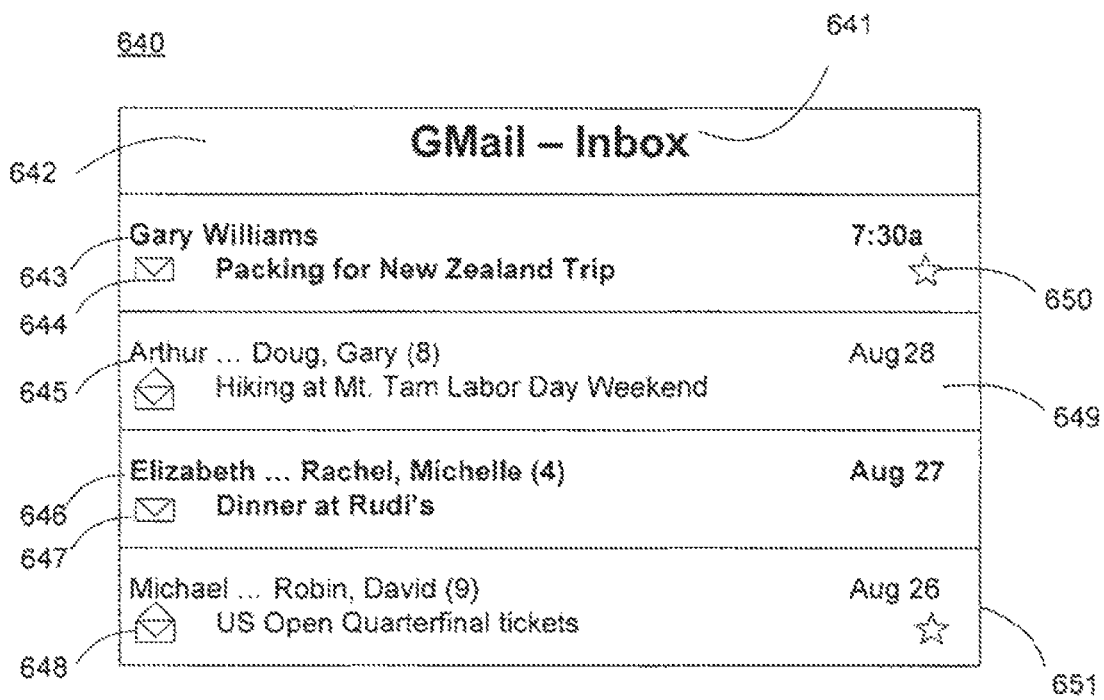
FIGS. 6C and 6D illustrate screen shots of a "conversation" page with a non-customized environment and a customized environment, respectively, of an exemplary application in a client device in accordance with some embodiments of the present invention.
Figure 6D:
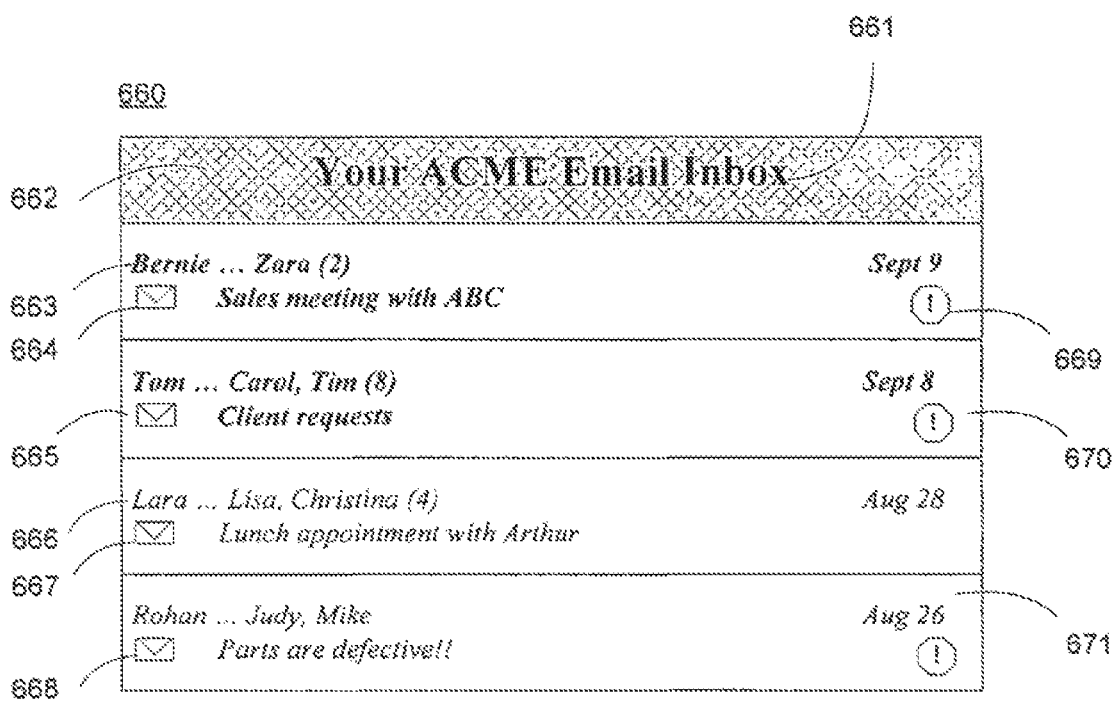

FIGS. 6C and 6D illustrate screen shots of a "conversation" page with a non-customized environment and a customized environment, respectively, of an exemplary application on a client device in accordance with some embodiments of the present invention. FIG. 6C is a screen shot of a default mail application showing a mail box containing a list of conversations. The default inbox is shown with a header having default text 641 indicating this is an inbox with a plain colored background 642 in the header. Each of the conversations 643 and 646 containing an unread message has text that is bolded and with an icon of an envelope 644 and 647 that is closed and unopened. The conversations with read messages 649 and 651 contain text that are not bolded and has opened envelopes 645 and 648 to indicate that the messages have been read. In some embodiments, a star 650 is marked for each of the message to indicate or represent that the conversations are of some significance or importance to the user.

On the contrary, FIG. 6D is a screen shot of a same mail application with a customized environment. The header now contains customized text 661 in a different font comparing to the default text over a textured background 662 that is not present in the default version. While conversations 663 and 670 each contains an unread message still have text that are bolded, the font of the text has changed. Moreover, the icons of all read and unread messages look the same and are closed envelopes. However, the conversations with all read messages, 666 and 671, have icons of closed envelopes that are colored, 667 and 668, while those conversations with unread message(s), 663 and 670, have icons of closed envelopes that are not colored, 664 and 665. Lastly, rather than using a star to denote conversations of interest, a hexagon with an exclamation mark 669 is used in place of the default star.

Simulating Icon Popout

A visual cue is often used to alert users to important information and changes in states. For example, with desktop applications, this is often done through the use of pop-out images, using two images to give the impression of an item rising out of the screen or to reflect a change visually by switching from one image to another. In memory constrained devices such as some mobile devices, this would require at least twice as many images in every case where an effect is desired. Ideally a visual effect should be accomplished for any image using one image file in each case. The following describes systems and methods of achieving a similar visual effect to reflect a change that has occurred by using a single image, thus, using about half the number of images as compared to the other conventional manner.

Figure 7:
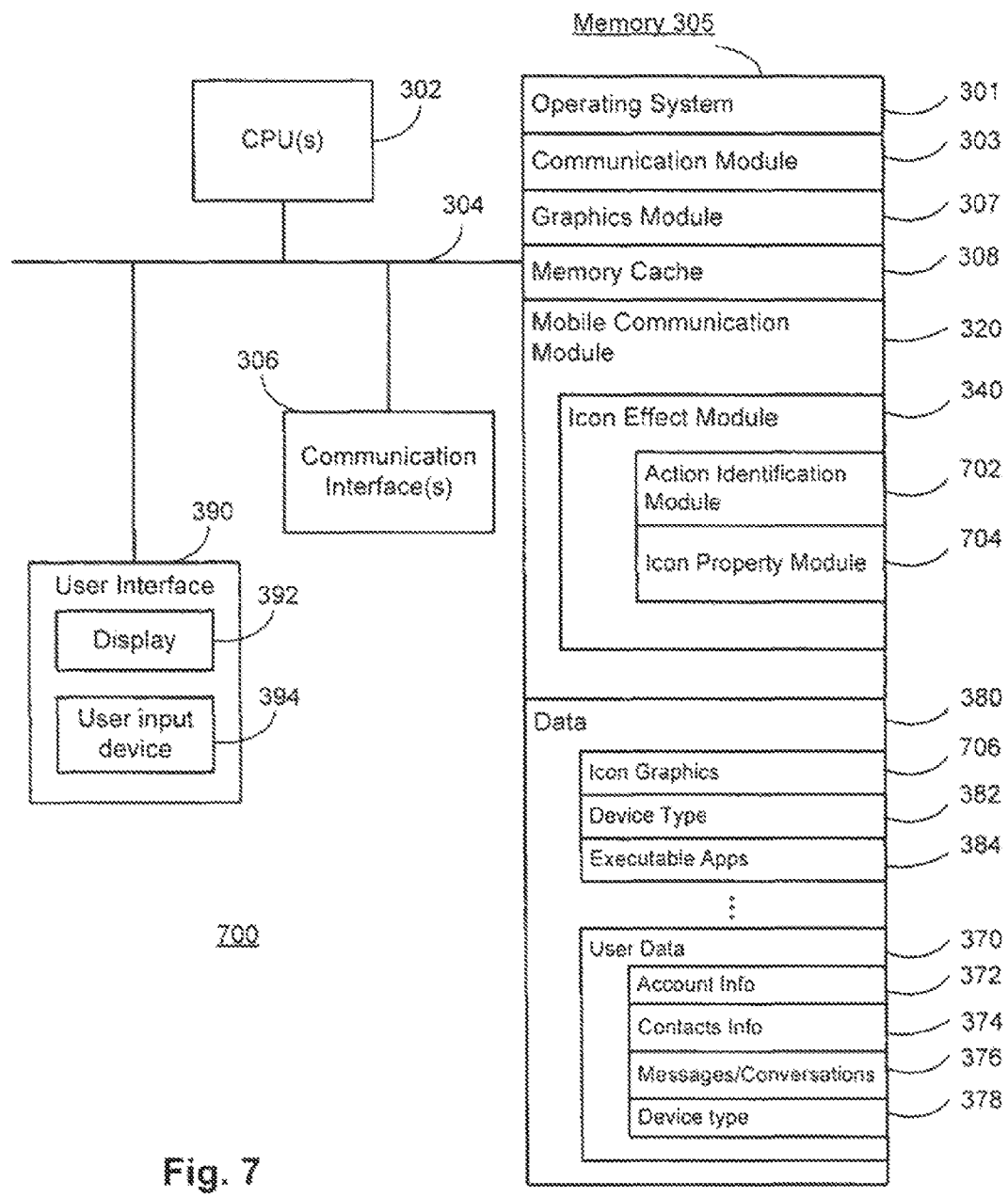
FIG. 7 is a block diagram illustrating an exemplary client device with components to carry out functions of an icon effect module in accordance with some embodiments of the present invention.

FIG. 7 is a block diagram illustrating an exemplary client device with components to carry out functions of an icon effect module in accordance with some embodiments of the present invention. The client device 700 in FIG. 7, similar to the client device 300 described in FIG. 3, includes one or more processing units (CPU's) 302, one or more network or other communications interfaces 306, memory 305, and one or more communication buses 304 for interconnecting these components. The client device 700 also includes a user interface 390 having a display 392 and a user input device 394. Memory 205 similarly includes an operating system 301, a communication module 303, a graphics module 307, memory cache 308, data module 380 containing information about device type 382, executable applications 384, and user data 370, and a mobile communication module 320.

The mobile communication module 320 may include an icon effect module 340 to render the visual effect. The icon effect module 340 further includes at least one of an action identification module 702, an icon property module 704, and a data module 380.

The action identification module 702 identifies each state with which an icon is associated. The module's purpose is to identify a change in state, and to coordinate with the icon property module 704 to change a property of a corresponding icon.

The icon property module 704 changes a property in the icon to create a visual effect in association with a change, thus reflecting to a user that a change in state has taken place.

The data module 380 contains information about the device type 382, executable applications 384, and user data 370 as previously described in FIG. 3, and an icon graphics module 706.

The icon graphics module 706 contains different image files for icons that are employed by at least some of the applications that execute on the client device. In some embodiments the icons may be bit map files, each icon having a unique graphic profile. The icon files may also be stored in different graphics formats, including TIFFs, GIFs, and JPEGs, to name a few possibilities.

In a prior art system, multiple individual icons, each representing a single application state and having their own, separate icon files, are used to simulate popout effects. With such prior art icons, a first icon is displayed to represent a first state of an application or application entity (such as an icon showing that an email is unread). A change in state from the first state to a second application state (for example, indicating that an email has been read) is shown by replacing the first icon with a second icon corresponding to the second state. As noted above, the second icon would have its own icon file. This prior art system is wasteful of storage as it requires a separate icon file for each application or application entity state that needs to be represented. This is a problem with memory-constrained portable devices.

In contrast, in embodiments of the present invention, application state icons are defined in respective icon files, each with static properties that enable the icon, when displayed, to interact in different manners with a display background that can be varied by the icon effect module 340 to reflect status changes. The icon files are typically represented as bit map files (.BMPs), but graphics files in other formats, including but not limited to JPEGs, TIFFs or GIFs, can also be employed. In some embodiments, the icon properties include color, shading, texture, background and foreground colors, and transparency and/or opacity (or "alpha" at a per-pixel level) of all or a portion of the icon. These icon properties can be defined using any standard graphics program, such as Adobe® PhotoShop® or Microsoft® Paint. The icon effect module 340 is configured to show state changes of an application or application entity (such as an email icon) by selectively varying one or more aspects of a background displayed behind or around these icons to produce interactions with the aforementioned icon properties and thereby create visual effects characteristic of the state change. As a result, an icon capable of representing multiple states and dynamic effects can be defined with only one static, icon graphics file. As mentioned above, the appearance of such an icon is varied by virtue to changes to the icon's background to illustrate visually that a change in application or application entity state has taken place. This change in appearance is accomplished by selectively varying the background displayed behind the icon, such that changes to the background visibly interact with, or are seen through, one or more properties of the single icon file. Very well-calibrated effects can be achieved as control over the background, and the definition of the icon itself, can be restricted to areas as small as a single pixel. The result is that a full range of application states are represented using a single icon whose appearance can be selectively modified, which conserves memory resources.

As one example, an icon can be defined with an opaque border of a first color that is not visually apparent when displayed against a background of the same color. However, when the background is changed to a second color (for example, by the icon effect module 340), the icon would appear to pop out from the background due to the now differently colored border. In another example, the icon can be defined with transparent writing that indicates a message, such as "URGENT." When displayed against a background of the same color as the icon, the writing would not be visible. However, when the background in the same area as the writing (or even in the same positions as the writing) is changed in color, the transparent writing would appear, due to the different background color being seen through the mask of the transparent writing. In another example, the transparency (or alpha) values of pixels in the icon can be varied to achieve blended color effects in combination with changes to the color or the background, which can also employ different alpha values defined per pixel. In different embodiments, lines in the icon can appear to be thickened or highlighted using similar techniques. For example, a transparent region in the icon around visible detail lines can have their background changed in color to appear to add to the thickness of, or highlight, the existing detail line).

Many other icon effects can be achieved that would be apparent to one skilled in the art in view of the prior descriptions. In addition, while the techniques have been described with respect to embodiments related to representing multiple icon states in a mobile device using a single, static icon file, similar techniques can be used to achieve a variety of visual effects for a range of applications that execute on any device type, including but not limited to mobile devices.

One embodiment of a method to achieve an icon effect is described below in reference to a client-based email application configured for mobile devices with a wireless communication interface. It should be understood that the description of achieving an icon effect can similarly be applied in other applications, such as a non-email application, or an application not specifically configured for mobile devices. Therefore, the description used herein with reference to the context of a client based email application should be viewed as illustrative and not restrictive.

Figure 8A:
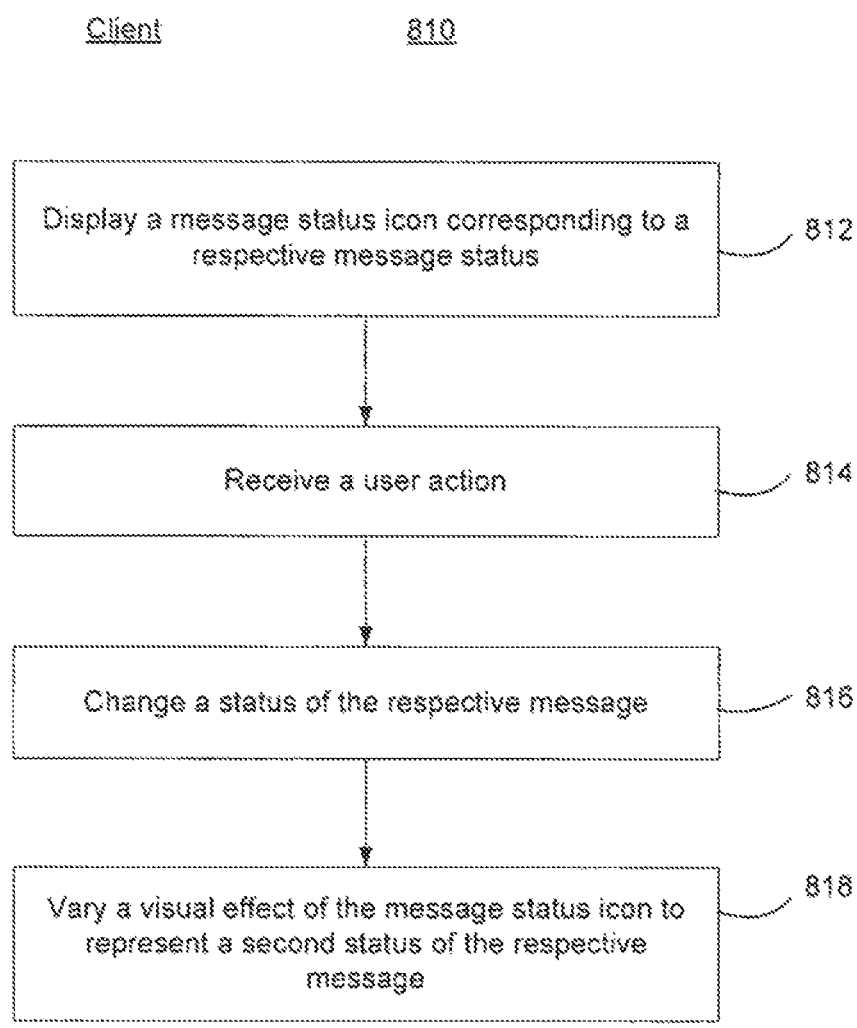
FIG. 8A is a flow diagram illustrating variation of a message icon property to reflect a change in message status on a client device in accordance with some embodiments of the present invention.

FIG. 8A is a flow diagram illustrating variation of a message icon property to reflect a change in message status on a client device in accordance with some embodiments of the present invention. In some embodiments, a method 810 describes a change in icon effect to reflect a change in status of a message in an email application on a client device. As shown in block 812, an email application in a client device displays a message status icon that corresponds to a respective message and represents a first message status of the respective message. In block 814, the client device has received a user action to perform an operation. In some embodiments, this user might correspond to the user reading/opening a newly received message. In block 816, the status of the respective message is changed as a result of the user action. In block 818, the appearance or visual effect of the message status icon is varied to represent a second message status of the respective message and to identify a status change of the respective message. In other words, as a result of these operations a user will visually observer a change in the icon that reflects a status change in the respective message. This visual change is accomplished, not be replacing one icon image with another icon image, but by varying appearance of the icon image (by virtue of modifying the icon's background to achieve an intended interaction with the icon's properties). In some embodiments, an email message status icon is a fixed image with at least some fixed graphics characteristics (e.g. icon outline and/or shape). However, the icon may have at least one property, such as color, uniformity of color, and/or line thickness of text and graphics etc. whose appearance can be varied to visually demonstrate that a change has taken place.

It should be appreciated that the method shown above for an email message can be applied equally to a conversation (i.e., a collection of messages). In some embodiments, at a client device, an email application based on a conversation-message system displays a conversation status icon that corresponds to a respective conversation. The conversation status icon represents a first conversation status of the respective conversation. In response to a user action that has taken place, such as after a user has read an unread message contained within the conversation, the client device changes a status of the respective conversation. Correspondingly, the client device varies a property of the conversation status icon so that the displayed conversation status icon reflects a second conversation status of the respective conversation to identify a status change of the respective conversation. For example, the second conversation status tells a user that the conversation no longer contains any unread messages. Similar to the conversation status icon described above, any status icon that has a fixed image with at least one varying property can be applied to any application, where a state of an item is reflected visually by variation of at least one visual property of the status icon.

This method of indicating a state change is preferred in a mobile device such as a cellular phone with a wireless communication interface to receive messages and conversations. One reason this method for visually showing an icon effect is used for applications on a mobile device, such as a client based email application, is the limited memory in a mobile device. For example, while indicating a change in status of a message or a conversation can be accomplished by replacing one icon image with a second icon image, the numerous images used to accomplish this objective take up memory. Each image may be a simple bitmap (.BMP) file, but having one image representing every state can increase the number of image files significantly, thus taking up valuable storage space that can otherwise be used for operations or data.

Different embodiments of this icon effect can be achieved. In some embodiments, a status icon is displayed adjacent to message or conversation identifying information (e.g., conversation or message subject, participant identification, and time and date information listed for a conversation or message). In some embodiments, the status icon has a graphics outline that does not vary. In other words, the image or graphics that depicts the icon does not change. The icon image is therefore static. A static icon image means that none of the inherent properties of the icon image changes, but rather, another property external to the icon image changes to create the visual effect. For instance, a closed envelope and an opened envelope each has different graphics and are two different image icons. In contrast, a closed envelope in one color is different from another closed envelope in a different color. Further more, a closed envelope without graphics is different than another closed envelope with a graphical effect created by a change in color. In either of these cases, the icon is the same, but it is an external property, e.g. color, that changes. A number of properties including color, pattern, and image transparency etc., in the message or conversation status icon can be varied to visually illustrate a change in status. In other embodiments, dynamic changes of the properties in the icon image is also possible, but more difficult to implement and may require a more complicated process to effect that kind of dynamic change.

In some embodiments as described above, the visual effect change created in a static image is created by a variation in the background color of the display. The variation in the background of the display can be controlled at the individual pixels level. In other words, the color of each pixel on the display can be controlled and varied independent of other pixels. For example, color of the pixels beneath the area of the icon image itself can be made differently than pixels outside of the border of the icon image. Alternately, different pixels lying beneath the area of an icon image on the display can have different colors.

In some embodiments, the status icon includes an image with an opaque border surrounding the image. The opaque border is intended to allow the icon image to stand out visually when there is a change in color of the background. For example, if the opaque border is white and the background is white, the icon image does not stand out. However, if the background color changes, for example, to blue, and there is a white opaque border, the icon image will stand out because of the white opaque border. In other embodiments, the border may be made to have a translucent color while the image background is in a fixed, opaque color. The same principle as the case of the opaque border appliers. However, in this case, the color of the translucent border will change when overlapped with a different display background color. Therefore the image background will be in one fixed opaque color, the display background in a different color and the translucent border changes color from its original color to another color after it is being combined and overlapped with the display background color. Additionally, in other embodiments, the border may be uniform or non-uniform. With a non-uniform border, a 3-dimensional effect may be crated. Besides color changes, different patterns or uniformity of colors may be used in other embodiments so that different effects can be achieved. For example, an icon can have an image and/or border with different patterns, uniformity, and colors being combined with a display background that can also vary in patterns, uniformity, and colors to create a myriad of visual effects. The individual pixels of the display background can be controlled so that different parts of the display, whether it is outside or within the area covered by the icon image, can be changed to create the visual effect while maintaining a static icon image.

In other embodiments, the status icon can have graphics depicting an opaque (e.g. white) image in the center of the icon, a transparent image background of the icon behind the graphics and an opaque (e.g. white) border. Assuming the default display background color is white, besides the outline of the icon and image, everything appears white, including the graphics, image background, border, and display background. However, when the message or conversation is selected, the background associated with the selected message or conversation will change colors, in this instance, the transparent image background of the icon behind the graphics or opaque image will have the same color as the background. There is now a clear a white border that separates the colored display background from a now colored image background and the white opaque image in the center of the icon, thus making the image in the middle of the icon stand out visually. Individual icon files are configured such that the Icon Property Module 704 can change one or more of to the colors of the background pixels to modify the appearance of the corresponding icons, while keeping the icon image static and unchanged.

In other embodiments, the reverse can be true. An icon image can have a transparent image or graphics with a certain part(s) of the icon that is opaque in color. For example, consider two concentric circles, a smaller circle centered within a larger circle, where each circle has a black outline, the area between the outline of the large circle and the outline of the small circle is opaque in color, e.g. grey, and the area of the smaller circle is transparent. Consider then a situation where the entire display background changes from one color to another color, for example, blue. The resulting background would then become blue, and the icon will have the same blue color in the smaller circle with the area between the larger outline and the smaller outline of the circles remaining grey. Consider a different situation where only the selected area in the smaller circle is varied (e.g. changed to red). As a result, while the display background would remain white and the area between the larger outline and the smaller outline of the two circles would remains grey, as a result of varying only the selected area in the smaller circle the smaller circle would now be red. In other embodiments, different effect can be similarly created by employing different levels of translucency.

It is well known in the art that each pixel has different RGBA (Red, Green, Blue, Alpha) components. RGB stands for the different levels of red, green, and blue colors, and A stands for alpha channel. Alpha is the same as opacity of certain colors in composition of the image. For example, a pixel having a 0% alpha channel, the pixel is fully transparent, and a 100% alpha channel means that the pixel is opaque. Values between 0% and 100% make it possible for pixels to show through a background like a glass (translucency), an effect not possible with simple binary (transparent or opaque) transparency. In some embodiments, the different levels of RGBA can be varied for each pixel in a display and different pixels can be selectively displayed with different levels of RGBA per pixel. The ability to vary the different levels of RGBA for different pixels in a display contributes to the different visual effects that can be created for a static icon image.

In some embodiments, other different visual effects can also be created using a similar principle. For instance, an icon image having a completely transparent background with black graphics outlining an image and border on the icon. Besides the ability to vary the color in the background of the image, the graphics outlining the image and border on the icon can also be modified. Since specific pixels can be controlled, the pixels bordering the graphics can be precisely modified to have the same black color as the graphics, thus creating a "thickened" line, much like having bold text. Also, since the background of the icon image is transparent, the icon image will not block the modification of the pixels bordering the graphics, thus enabling the "bold" effect to the graphics of the icon image.

The previous descriptions describe different possibilities of varying visual effect of an icon effect as a result of a user selection of the message or conversation by changing background color of the message or conversation. This technique is equally applicable in rendering such an effect by a user selection of a message or conversation, or in rendering an effect resulting from a change of states such as after a message has been read. In some embodiments, a state or status of a message or conversation can be indicated by different display background colors surrounding the message or conversation. For example, the entire display background color of an area surrounding the message or conversation is of one color before it is read and of a different color after it has been read. In other embodiments, the text associated with the message or conversation displayed adjacent to the status icon changes from being shown as bold to being shown with normal weight after the message or conversation has been read or viewed by the manner described above. Still, just colors of the icon image can be varied to reflect a user selection of a message or conversation, or a change in state of a message or conversation after it has been read.

Figure 8B:
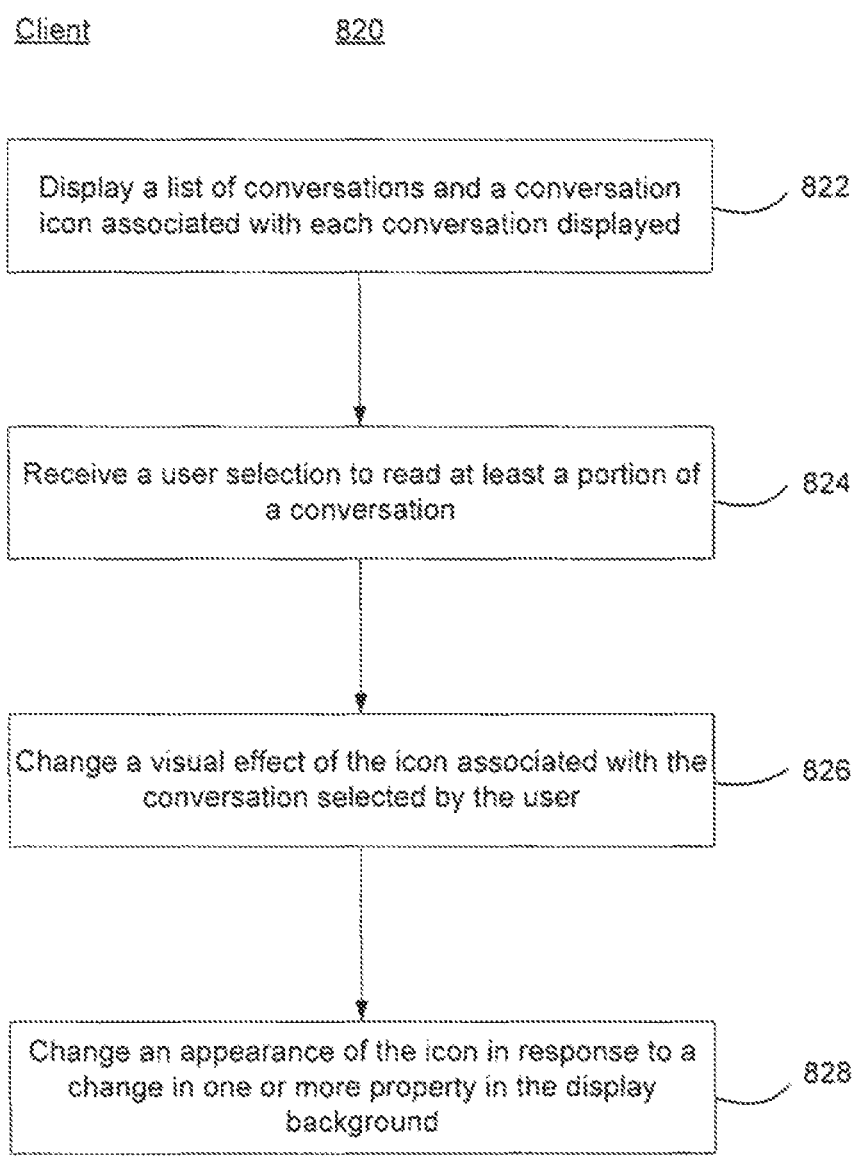
FIG. 8B is a flow diagram illustrating variation of a property of an icon to reflect a change in conversation status on a client device in accordance with some embodiments of the present invention.

FIG. 8B is a flow diagram illustrating variation of a property of an icon to reflect a change in conversation status on a client device in accordance with some embodiments of the present invention. In some embodiments a change in the graphical user interface can be described in the flow diagram 820 as shown in FIG. 8B. It should be appreciated that while the graphical user interface is described in terms of a change in conversation status, the description similarly applies to a change in message status in an email application operating in a mobile wireless communication device. In some embodiments, a graphical user interface on a client device displays a list of conversations and a conversation status icon associated with each conversation displayed as shown in block 822. The conversation status icon corresponds to a respective conversation and represents a conversation status of the respective conversation. The client device then receives a user selection to read at least a portion of the conversation shown in block 824. In response to a user selecting and reading at least a portion of a conversation, a change in appearance of the icon is effected by a change in one or more property in the display background to indicate that the conversation has been selected and read by the user as shown in block 828. The change in appearance of the icon is accomplished by varying one or more visual properties of the display background behind the conversation status icon, as described above, with the conversation status icon having a fixed image and at least one display background property that varies independent of the fixed image.

Figure 9A:
FIG. 9A is a screen shot of a prior art illustration of two different icons each showing a different status of a conversation.

FIG. 9A is a screen shot of a prior art illustration of two different icons each showing a different status of a conversation. FIG. 9A illustrates a common implementation of using a different icon image to reflect a change in state, in for example, a message or conversation. In some embodiments, text of an unread message 901 (or a conversation with an unread message) is in bold and a closed envelope icon 902 is used to associate the status of the message or conversation. However, after a message is read 903 (or a conversation without an unread message), the text is normal and an opened envelope icon 904 is used to denote the change in state. The prior art shows the use of different iconic images, one for each particular state representing the message or conversation, which can only be accomplished by using different icons.

Figure 9B:
FIG. 9B is a screen shot illustrating an icon having a different color as an effect change in accordance with some embodiments of the present invention.

On the contrary, FIG. 9B is a screen shot illustrating an icon having a different color as an effect change in accordance with some embodiments of the present invention. As described earlier, a particular state of each message or conversation may be associated with a particular color, and an icon may have a transparent, semi-transparent or scaled or toned color, so that when overlapped with the particular display color in the background of the message or conversation, the color of the icon image can be varied. In some embodiments, as illustrated in FIG. 9B, a display background color of an unread message or conversation 911 can have a same or different color compared to the background color of a read message or conversation 913. In this example, the display background color of an unread message or conversation 911 is the same as the background color of the read message or conversation 913 (e.g. white). Furthermore, assume a situation where the icon image's background color 914 is entirely transparent by nature. When a message or conversation is read, the display background color of the message and the conversation 913 is white. However, if the message or conversation is unread, the pixels filling the area corresponding to the area of the icon image will be blue in color. Therefore, the icon image will appear to have a different color, e.g. blue, if the message or conversation is unread, but it will appear white if the message or conversation is read. In other embodiments, different variations created by different combinations of colors can be achieved. For instance, the static icon image may be translucent, so when it overlaps with a section of colored displayed background, the icon image will appear to be in a different color.

Figure 9C:
FIG. 9C is a screen shot illustrating an icon having a "bold" outline and a part of the image having a different color as an effect change in accordance with some embodiments of the present invention.

FIG. 9C is a screen shot illustrating an icon having a "bold" outline and a part of the image having a different color as an effect change in accordance with some embodiments of the present invention. In some embodiments, states of a message or conversation are associated with a certain text effect. It is possible that the same text effect can be achieved in the icon image without changing the inherent image file. For example, an unread message is reflected by the bold or thickened lines for its text. The same effect can be applied to the icon image 927 so it appears with thickened icon graphics 925. Similar to what was described above, the icon image 927 generally has an area 923 in the image that is transparent. The thickened graphics lines can be achieved by coloring the pixels surrounding the borders and the graphics of the icon black. Since the area 923 is transparent, these additional black pixels will show up in the interior of the icon image, thus allowing the graphics inside the icon to appear. Furthermore, since the area 923 is transparent, a different color, e.g. red, can be used to modify the pixels in the display background underlying the area 923 of the image and thus coloring that area 923 of the icon red. In other embodiments, a similar principle can be used to create a blinking icon image. Figuratively speaking, an icon can have an opaque background color (e.g. white) while having a transparent area denoting a graphical image (e.g. an exclamation mark) in the middle of the icon. To create the blinking effect in a particular state, the pixels underlying the entire icon can be modified to have a blinking color (e.g. red). Therefore, in a particular selected state, assuming the display background is also white, the icon will have its usual opaque background color (e.g. white) and its usual graphical outline and borders, but there will be a blinking red exclamation mark in the middle of the icon because of the transparent graphical image of an exclamation mark that allows the blinking red color created by the selected pixels in the display background beneath the icon image. Since the rest of the icon image background is in an opaque white, the red color of the display background beneath the image will not be visible.

Figure 9D:
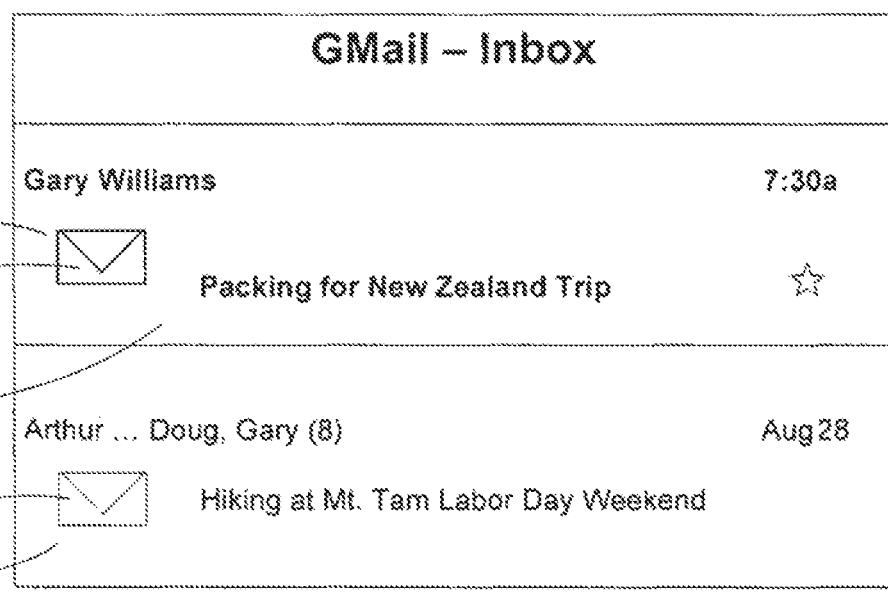
FIG. 9D is a screen shot illustrating an icon having a border and a transparent background in accordance with some embodiments of the present invention.

FIG. 9D is a screen shot illustrating an icon having a border and a transparent background in accordance with some embodiments of the present invention. As described earlier, in some embodiments, the icon image can have a transparent background with an opaque border. When a message or conversation is selected and has a different display background color compared to the non-selected message or conversation, the status icon associated with the message or conversation will then take on the same color as the color of the selected message or conversation while highlighted by the opaque border. The screen shot 930 illustrates an unselected conversation having a white background 935 with an icon image having a transparent background 934 which also appears to be white. In comparison, when an unread conversation is selected, the message will have in its background a different color 933 which is directly reflected in the icon image background 932 because the icon image background is transparent. Also, while the white opaque border 931 of an icon image blends into an unselected conversation's background, the same white opaque border 931 stands out clearly against the different color 933 of the selected conversation, thus visually highlighting the icon image and bringing the icon image to the user's attention.

It should be understood that any of the above-described techniques for varying one or more properties of an icon image can be equally applied in any icons in any application. In particular, since such variation of one or more properties in an icon image can be realized with one icon image, these techniques are particularly suitable for mobile device applications, such as client applications operating in a client device having limited memory resources.

Auto-Complete Contact Entry on Mobile Devices

In desktop and web environments, common email applications provide an auto-complete function wherein, when a user begins to enter a contact's name or email address into a "recipient" field, the email application provides some suggested completions from one or more contact lists available to the application. Implementation of this feature in desktop or notebook computers, or servers (in the case of some web-based email systems), benefits from a vast amount of computing power driving the function to perform sophisticated searches on large contact lists without concerns related to efficiency. Implementing such a feature on a mobile device in this manner would be less than satisfactory as mobile devices lack the computing power and responsive user interfaces of desktop and notebook computers.

Contact auto-complete features are sometimes made available on relatively advanced and intelligent mobile devices (such as a Blackberry™ communicator) for limited use with device-specific email applications (e.g., the Blackberry™ email application). These auto-complete features are device and application-specific, so they are not made available to other applications running on such platforms, such as cross-platform email applications that are configured to operate on a wide range of mobile devices (e.g., cell phones, smart phones or PDAs). Also, at least some of these auto-complete features suffer from at least one of the following three problems. First, results of partial matches are ordered alphabetically or in some other manner that does not take into account frequency (e.g., business contacts first, then personal contacts). Second, prefix matching of the string entered is only done against contacts' names. Third, an entire contacts list is updated/downloaded as a whole, which means that a large amount of storage space is occupied by contacts that are rarely used; this also slows down the response time of the user interface and device operation both during contact searching and updating of the entire contacts list. These problems illustrate a trade off of existing system between accepting a slow user interface in order to have all contacts available on the client device, or having a fast interface and accepting a limited subset of contacts. In contrast, embodiments of the present invention provide a more efficient and user-friendly auto-complete function for mobile devices by employing one or more intelligent criteria to pre-screen a number of contacts for fast access, while still allowing searching of the entire contacts list as required.

Accordingly, embodiments of an auto-complete contact entry system and method are described that are configured to execute on mobile devices with small memories and limited user interfaces. In some embodiments, the auto-complete contact entry system and method are implemented in a client-server environment, where the auto-complete entries are provided to a client mobile device by a server with which the client device is in communication. In various embodiments, the auto-complete entries that are provided to the client can be sorted in a manner specified by the client, sorted in a manner determined by the server (based on the type of the client device), and/or limited in number based on the amount of memory in the client device for storing contacts. Possible sorting methods include sorting by frequency (no. of times the contact has been used), sorting by recency (time since the contact was last used), or sorting alphabetically by name. Some embodiments are operable with cross-platform email applications, such as Mobile Gmail™ that can be executed on a variety of mobile platforms, ranging from powerful devices, such as the Blackberry™ communicator, to a basic cell phone.

Figure 10A:
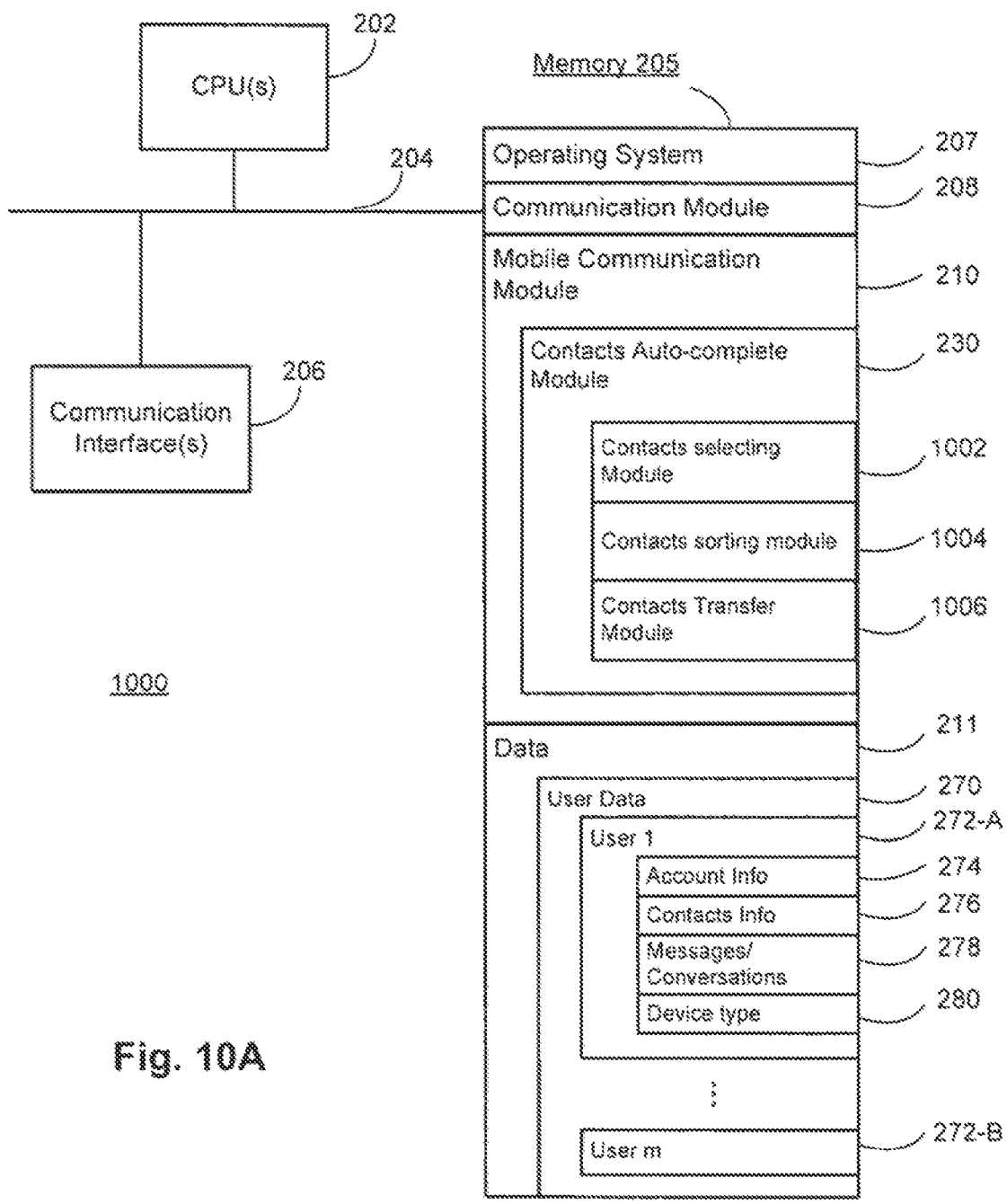
FIG. 10A is a block diagram of an exemplary server having components for carrying out functions of a contacts auto-complete module in accordance with some embodiments of the present invention.

FIG. 10A is a block diagram of an exemplary server having components for carrying out functions of a contacts auto-complete module in accordance with some embodiments of the present invention. In some embodiments, the application in which the contacts auto-complete function is implemented in a client-driven email application operating in a client devices such as a mobile communication device. In other embodiments, the application can be a server driven email application operating on a client device such as a personal computer or a wireless mobile device like a cellular telephone.

The server structure 1000 in FIG. 10A, similar to the server 200 described in FIG. 2, includes one or more processing units (CPU's) 202, one or more network or other communication interfaces 206, memory 205, and one or more communication buses 204 for interconnecting these components. Memory 205, similar to the server 200 described in FIG. 2, also stores programs, modules and data structures, or a subset thereof, includes an operating system 207, a communication module 108, a data module 211 containing similar user data 270 for individual users that may range from user 1 272-A to user m 272-B as previously described in FIG. 2, and a mobile communication module 210.

The mobile communication module 210 may include a contacts auto-complete module 230 that performs an auto-complete function in certain contexts of an email application. The mobile communication module 210 further includes at least one of a contacts selecting module 1002, a contacts sorting module 1004, and a contacts transfer module 1006.

The contacts selecting module 1002 chooses and selects a predetermined number of contacts from the contact list on the server for transmitting to the client device for fast access by the components carrying out the auto-complete function on the client device. The predetermined number of contacts is generally selected in accordance with one or more criterion determined based on a server, a client device, or a combination of both.

The contacts sorting module 1004 sorts the predetermined number of contacts prior to transmitting the list of contacts to the client device. In some embodiments, the order in which the list of contacts is to be sorted before transmission may include sorting by frequency in which contacts are encountered, by temporal measurement in which contacts are most recently encountered, or by a combination of the above.

The contacts transfer module 1006 transmits the predetermined number of contacts in a sorted list to the client device.

Figure 10B:
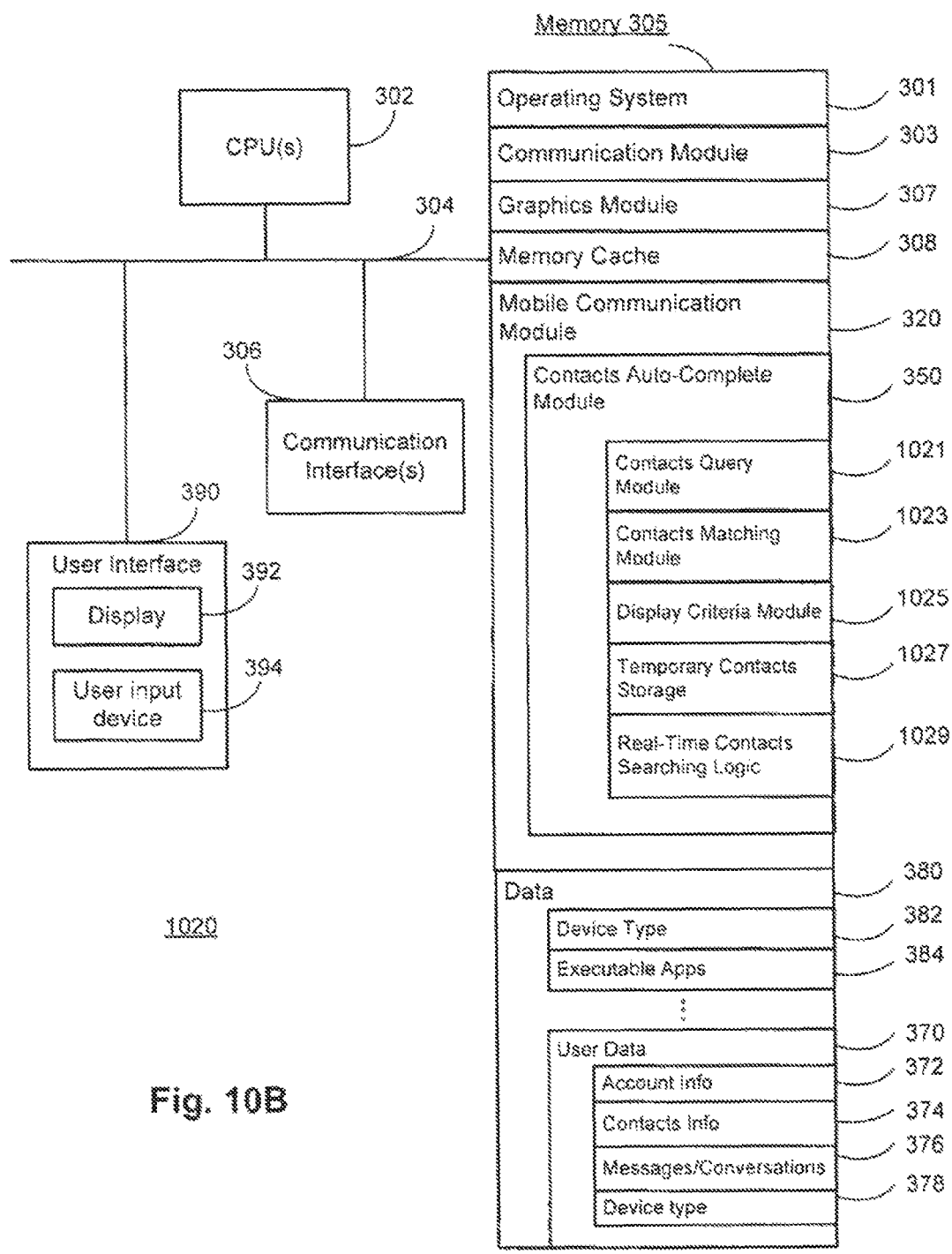
FIG. 10B is a block diagram of an exemplary client device having components for carrying out functions of a contacts auto-complete module in accordance with some embodiments of the present invention.

FIG. 10B is a block diagram of an exemplary client device with components for carrying out functions of a contacts auto-complete module in accordance with some embodiments of the present invention. The client device 1020 in FIG. 4B, similar to the client device 300 described in FIG. 3, includes one or more processing units (CPU's) 302, one or more network or other communications interfaces 306, memory 305, and one or more communication buses 304 for interconnecting these components. The client device 1020 also includes a user interface 390 having a 392 and a user input device 394. Memory 205 similarly includes an operating system 301, a communication module 303, a graphics module 307, memory cache 308, data module 380 containing information about device type 382, executable applications 384, and user data 370, and a mobile communication module 320.

The mobile communication module 320 may include a contacts auto-complete module 350 for implementing the auto-complete function on the client device. The auto-complete module 350 further includes at least one of a contacts query module 102, a contacts matching module 1023, a display criteria module 1025, a temporary contacts storage 1027, and a real-time contacts searching logic 1029.

The contacts query module 1021 receives a partial entry having one or more characters in a string. This module 1021 recognizes the partial entry as a query to the contacts list and looks to the contacts list to retrieve contacts.

The contacts matching module 1023 matches the partial entry to contacts on the contacts list that matches the partial entry. In some embodiments, the partial entry may be used to match the name of the contact. In other embodiments, the partial entry may be used to match the email addresses of the contact. Still, in other embodiments, the partial entry may be used to match a nick name or other information that is associated with a contact. Therefore, the partial entry may be used as a basis to match different parts of a contact's information and not limited to a first name or a last name.

The display criteria module 1025 determines what contacts to be displayed. In some embodiments, there is a limit on a number of contacts to be displayed. For example, during contact entry, no more than three retrieved contacts are displayed at anytime in the auto-complete feature for a user to select and view on screen. The predetermined number of retrieved contacts matching the partial entry to be displayed on screen is based one or more predetermined criterion. In some embodiments, the criterion may include at least one of the screen size of the client device, memory available to display the matched contacts and how the matched contacts are displayed.

The temporary contacts storage 1027 stores contacts that are transmitted to the client device. In some embodiments, the contacts received are a subset of a complete list of contacts which are permanently stored on the server. In some embodiments this subset of contacts are stored in cache memory or other volatile memory on the client device. Therefore, whenever the application is inactivated or no longer currently in use, the contacts information is removed from the cache memory or from the volatile memory. In other embodiments, the contacts information is stored in non-volatile memory of the client device and is updated either on a regular basis or each time when the email application is activated.

The real-time contacts searching logic 1029 searches the contact list on the server for contacts that are not matched on the sorted subset of contacts list transmitted to the client device.

Figure 11A:
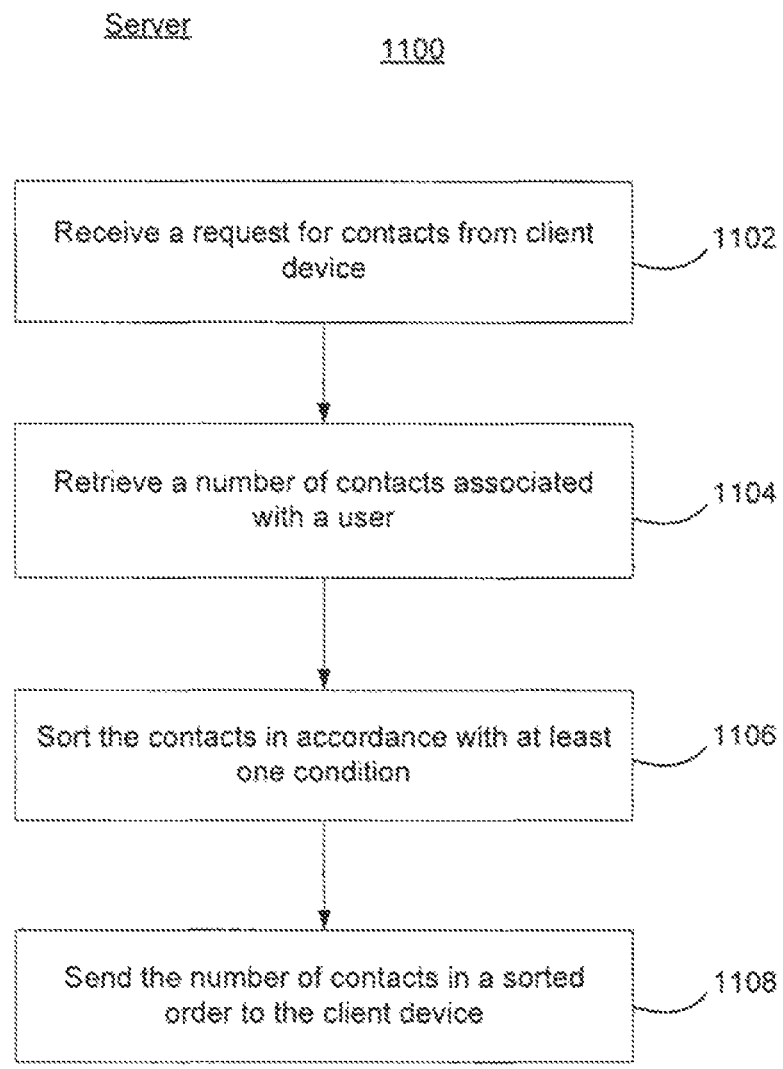
FIG. 11A is a flow diagram illustrating actions in a server in response to a request for a list of contacts from a client device in accordance with some embodiments of the present invention.

FIG. 11A is a flow diagram illustrating exemplary actions in a server in response to a request for a list of contacts from a client device in accordance with some embodiments of the present invention. In some embodiments, a contacts auto-complete feature is activated in a client based email application program operating on a mobile communication device. In other embodiments, the contacts auto-complete function is available to a user when a user composes an email, including when a user forwards an email to another user, but not available to a user in a context beyond composing an email for sending to a recipient. The purpose of the auto-complete feature is to provide a responsive user interface for users of a mobile device. A responsive user interface includes accurately and expeditiously locating the contact information of a recipient of a message and using a minimal number of key presses for centering a target recipient's contact information for delivering the message.

In some embodiments, as shown in FIG. 11A, a server 1100 receives a request for contacts from a client device in block 1102. This occurs, for example, when an email application is activated on a client device. In some embodiments, a request is automatically sent from the client device to the server for a list of contacts when the email application on the mobile device, or client device, is initiated. In other embodiments, a request for contacts information may be sent specifically in response to a user request. In some embodiments, when and how a list of contacts is retrieved from a server onto a client device may be user configurable. A manual request for contacts information may be desirable when a mobile device has a limited amount of memory, or when a user has no intention to compose email, but simply wants to check and read email(s).

In response to the request from the client device, the server retrieves a number of contacts associated with a user as in block 1104. In some embodiments, the number of contacts may be a subset of the contacts in the contacts list. In other embodiments, the entire list or a user determinable number of contacts may be retrieved. In some embodiments, the number of contacts to be retrieved and downloaded onto the client device may be determined in the server in accordance with at least one condition, including, but not limited to, memory size of the client device, cost of transmitting the number of contacts, latency of transmitting the number of contacts, and processing capabilities of the client device etc. Still in other embodiments, the number of contacts to be downloaded may be determined based on a request received from the client device. In other words, the user can specify and determine the number of contacts to be downloaded based on the memory capacity of the device, or a user may simply specify the number of contacts to be downloaded as desired.

The server then sorts the number of contacts in accordance with at least one condition as shown in block 1106. In some embodiments, the conditions which the number of contacts are sorted includes frequency by which contacts are encountered by an application, frequency by which contacts are encountered by the client device and temporal order by which contacts are encountered. There is a benefit to sorting the contacts. Contact sorting is a way of pre-selecting the most relevant contacts or contacts most likely to be encountered by a user. This is a method to maximize the likelihood that the contacts can be useful to a user given the limited number of contacts transmitted to a client device. Some criteria for sorting include, but are not limited to, selecting and prioritizing contacts based on the frequency in which they are encountered by the user, the frequency in which it is encountered by the mail program, and the most recently encountered contacts.

Once the retrieved or selected contacts are sorted, the sorted list of selected contacts is transmitted to the client device, as shown in block 1108. In some embodiments, the sorted list of selected contacts is sent "as is" in the exact sorted order to the client device. Each contact sent to the client device includes at least a name and an email address for each contact. In some embodiments, the contact may also include a phone number of the contact, which can be used for another feature such as auto-call back when a user decides to reply to an email message with a phone call instead of an email. The sorted list of selected contacts contains copies of various contacts in a particular order selected from the original and complete list of contacts, which is stored permanently on the server.

In other embodiments, when a contact is not found to match a partial entry, a server may receive a second request from the client device for the partial entry not found in the contacts sent to the client device. In response to this second request, the server will retrieve an additional contact, if such an additional contact can be found to match the second request, and transmit the additional contact to the client device. In these embodiments, one can appreciate the benefit of sending a subset number of contacts in a contact list to a client device that is a mobile device having a wireless communication interface. Mobile devices having a wireless communication interface such as a cellular telephone often has limited memory, and by sending a pre-selected and sorted subset of the contacts to the client device, such as a selected group of the most frequently encountered contacts, this can reduce the cost of data transmission for the user. Additionally, the user can have the downloaded contacts which are sorted and selected according to the highest probability of use by the user, for quick access. When a contact that is not likely to be encountered is queried, a request to the server for the contact can be made quickly and at a minimal cost. This is an exemplary benefit of contacts auto-complete feature which is based upon selecting a subset number of contacts and sorting them according to one or more relevant criterion to predict the likelihood that they will be requested by the user.

Figure 11B:
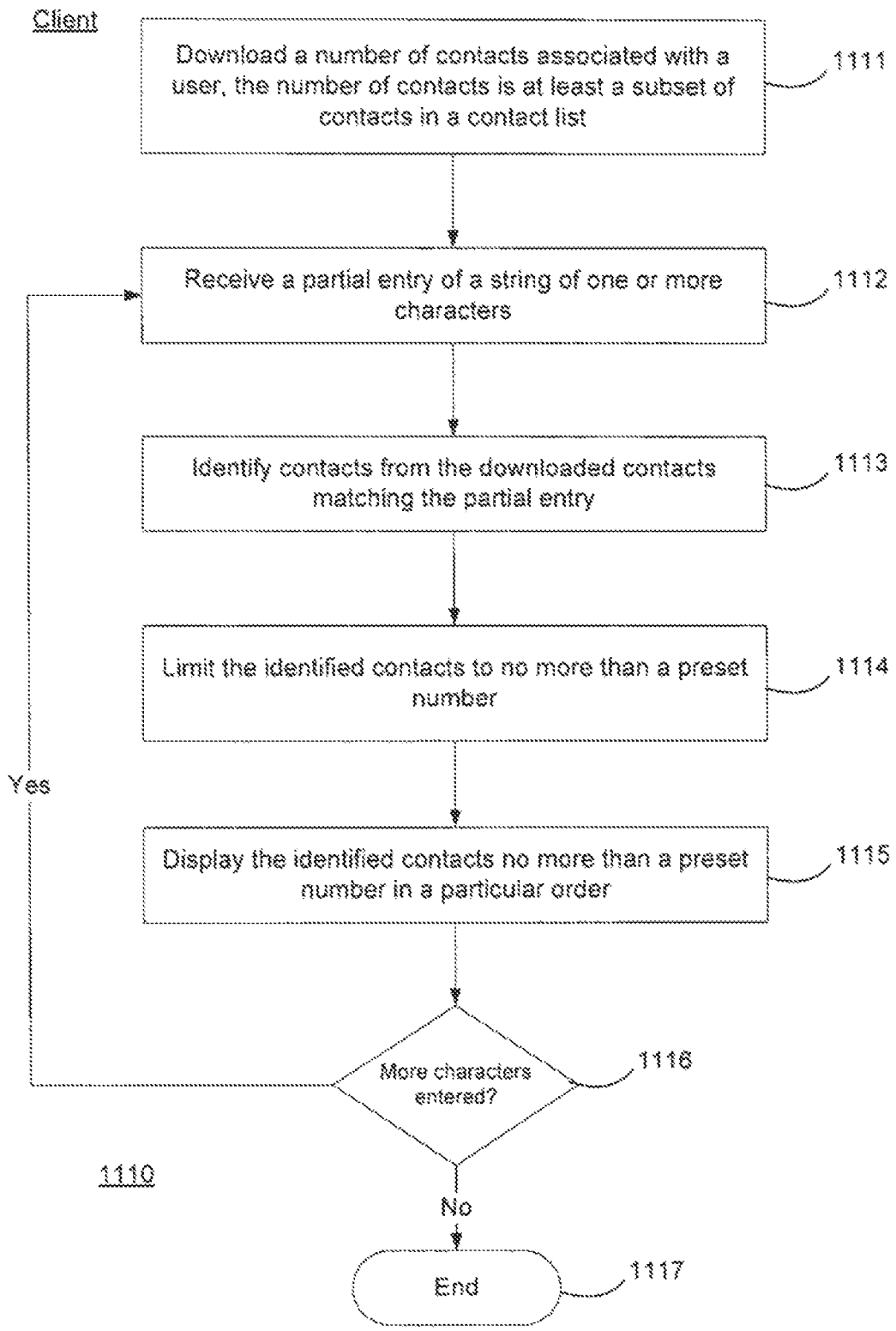
FIG. 11B is a flow diagram illustrating an exemplary contacts auto-completion as a client device receives a partial entry in accordance with some embodiments of the present invention.

FIG. 11B is a flow diagram 1110 illustrating an exemplary contacts auto-completion as a client device receives a partial entry in accordance with some embodiments of the present invention. In some embodiments as shown in FIG. 11B, a client device, after sending a request to the server for a list of contacts, downloads from the server a number of contacts that is at least a subset of a complete contacts list of the user, as shown in block 1111. The request for the list of contacts, as described before, may be an automatic response to the initiation of an email application, or to a user specific request. In a context of composing an email in the email application, the client device receives from the user a partial entry comprising a string of one or more characters to determine a recipient's contact information, as shown in block 1112. In response to the partial entry, the client device identifies and ties to match the string of one or more characters with the list of contacts downloaded from the server, as shown in block 1113. Furthermore, the client device also limits the identified or matched contacts to no more than a preset number for displaying, as indicated in block 1114, and displays the identified contacts to no more than the preset number on a screen or display of the client device in a particular order, as shown in block 1115. The object of limiting the number of contacts displayed on the screen is to compensate for the small screen size so the displayed list of contacts does not take up all the space on the display screen and also to enable a user to focus on only a few contacts at a time rather than a long list which may not contain relevant contacts.

In block 1116, when the client device receives a request from the user to add or delete characters from the string of characters in the partial entry to form a different expanded or retracted partial entry, the client device will repeat the identification process and identify contacts from the downloaded list of contacts matching the expanded or retracted partial entry, limiting the identified contacts to a preset number for display and displaying the identified contacts in the particular order.

In some embodiments, the downloaded contacts may be stored temporarily in a memory of the client device. For example, the contacts may be stored as long as the email application is activated, or the contacts may be stored until the list is updated in accordance with a schedule, or it may be stored until a user requests an update. Furthermore, as described earlier in some embodiments, the number of contacts downloaded is determined by the server. In other embodiments, the number of contacts downloaded is determined by the server in accordance with at least one condition, including but not limited to size of the client device, cost of transmitting the number of contacts, latency of transmitting the number of contacts, and processing capabilities of the client device. Still in other embodiments, the number of contacts downloaded is determined based on a request by the client device specified by a user of the client device. For example, if the memory size of the client device is relatively small, the number of contacts downloaded from the server may be lesser than another number of contacts downloaded onto a device with more memory. Similarly, if the cost of transmitting data is less expensive for a user with a client device having a small memory, the user may opt to have no contacts downloaded or a minimal number of contacts downloaded onto the client device and opt instead to perform a search on the server more frequently. Furthermore, if the latency of transmission of the number of contacts is long, a user may choose to download a larger list of contacts onto the client device if there is sufficient memory so there is a lower probability to perform a search on the server.

As described above, the list of contacts downloaded may be sorted in a particular order. In some embodiments, the sorting order is determined by the server. In other embodiments, the sorting order is determined based on at least one criterion provided by the client device to the server so that the number of contacts is ordered before they are downloaded onto the client device. The criteria from which the list of contacts is sorted may include but not limited to frequency by which contacts are encountered by an application, frequency by which contacts are encountered by the client device and temporal order by which contacts are encountered. An object of the criteria is to download a list of contacts onto a client device that is most likely to be called upon by a user when composing an email. Consequently, sorting the list alphabetically is not used in many embodiments because an alphabetized list by itself does not assist in the accuracy and predictiveness in which a contact list is searched by a user (though the present invention can be applied to contact lists that are sorted alphabetically). Rather the list of contacts are sorted and selected based on criteria such as which contacts are most frequently used by the user (frequency) and which contacts the user has been in contact with most recently (recency). The frequency and recency metric select contacts most frequently encountered and most recently encountered as some of the factors in for determining which of the contacts are most likely to be requested by a user. In some embodiments, the contacts are arranged in descending order in accordance to the criterion used for sorting. Furthermore, each contact in the list of contacts may include at least a contact's name and email address and may further include a phone number for the purpose of calling the sender instead of sending of a message.

In some embodiments as described, the number of contacts to be displayed may be limited to a preset number. One rationale behind this limitation is the small screen size of most mobile devices. If a large number of contacts matches the partial entry, the matched contacts may extend to a long list and cover a large portion, and possibly rest of the screen. In some embodiments, the preset number of contacts to be displayed on the client device is predetermined by the application. In other embodiments, the present number of contacts displayed may be determined based on a screen size of the client device. Still in some embodiments, a user may have an option to specify and determine the preset number of contacts in which to display.

Still, in some embodiments, the application in the client device may fetch fewer contacts from the server at startup and progressively fetch more contacts as the number of matching prefixes gets smaller. In other words, in the process of matching the partial entry to the list of contacts downloaded onto the client device, the application senses that the number of matches is reducing and yet there is still no match to the partial entry. When this occurs, the application or client device will make a request to the server to download more contacts in attempt to find a match for the partial entry. This implementation has the benefit of potentially requiring less data, but the logic will become more complicated and there may be an increased latency resulting from the increased response time for making a request to the server, searching matching contacts on the server, and downloading any additional contacts onto the client device.

In other embodiments, filtering of contacts may be based on more than just the contacts' names and email addresses. In some embodiments, the entry may be mated to information somewhere else in the contact's data. For example, the contact's instant messaging user name, the contact's other website IDs such as the contact's social networking website user name, or even people related to the contact such as the contact's family. Still in other embodiments, the client device may anticipate the next character the user is likely to press and perform filtering in the background in advance. This is a benefit if there are common names and character combinations. In some embodiments, anticipation of entry characters may be accomplished by computing the first set of matches for all next characters in advance. Alternately, in other embodiments, this can be accomplished by picking likely next letters based on pair-wise letter frequencies in the user's language (e.g. French, English, Italian etc.).

Figure 11C:
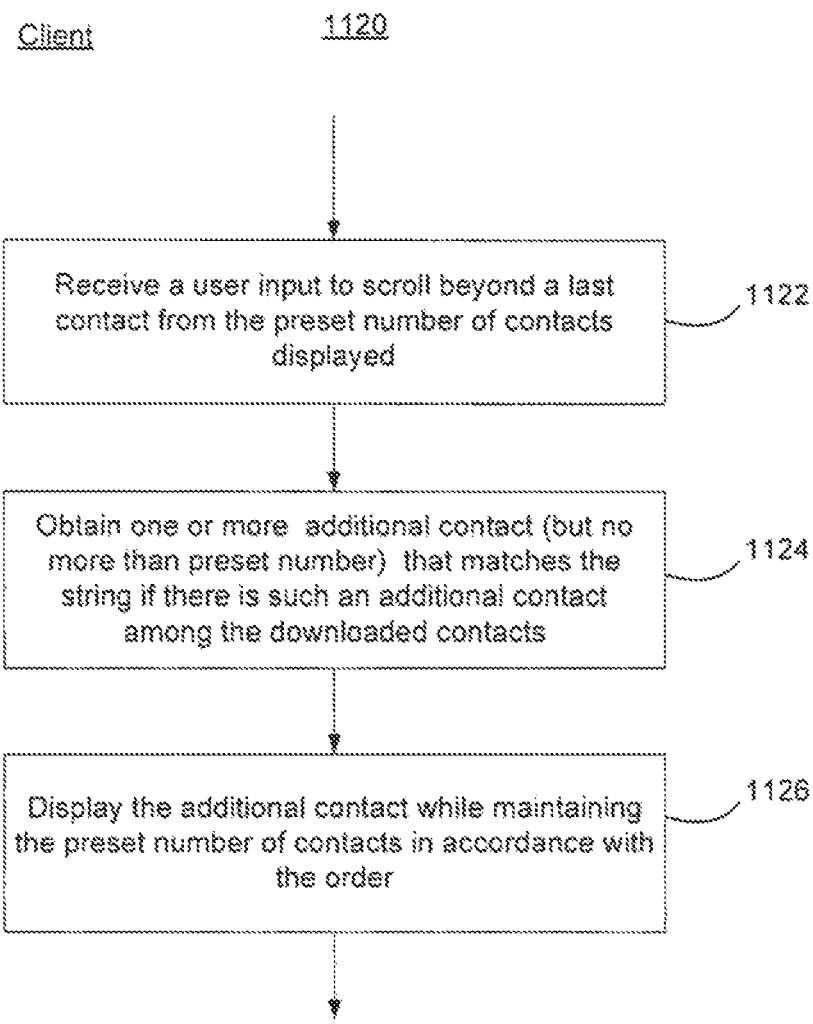
FIG. 11C is a flow diagram illustrating an exemplary contacts auto-completion feature as a client device receives a user input to scroll beyond a last contact from a preset number of contacts in accordance with some embodiments of the present invention.

FIG. 11C is a flow diagram illustrating an exemplary contacts auto-completion feature as a client device receives a user input to scroll beyond a last contact in a preset number of contacts in accordance with some embodiments of the present invention. In some embodiments, after a list of contacts are matched and displayed on the screen, the client device further receives a user input to a scroll beyond the last contact from the preset number of contacts displayed, as shown in block 1122. In response to this user input, the client device obtains an additional contact which matches the string, if present in the number of contacts downloaded onto the client device, as shown in block 1124. The client device then displays the additional contact(s) onto the screen, while maintaining the preset number of contacts being displayed, following a particular order as the contacts are sorted, as shown in block 1126. In other words, when a user wants to scroll and view more matching contacts beyond the preset number of matched contacts displayed, the client device identifies in real-time additional contact(s), if present, from the downloaded contact list. Since the preset number of contacts displayed is maintained constantly, the contacts is displayed similar to a FIFO (first in first out) order where the additional matched contact(s) will be displayed on the screen after the last contact previously displayed, while the first contact previously displayed is removed from the display list, such that each contact previously displayed is moved up by one position. It should be appreciated that in some embodiments, the contacts identified from the list of contacts downloaded is retrieved and displayed in the similar order as the list of contacts. In other words, the client device simply looks for contact(s) that matches the partial entry as it searches the list of the contacts downloaded from top to bottom, thus displaying the matched contact(s) in a similar order as they are found.

In some embodiments, when a contact is not found in the list of contacts downloaded from the server, the client device, upon a user's request, may further send to the server a second request containing the partial entry and asks the server to find from the complete contact list a contact that matches the partial entry. If such a contact is found, the contact is sent from the server to the client device. This may occur if a user does not recall the contact information of the contact and fails to find the contact in the list of contacts downloaded onto the client device. Therefore, in some embodiments, this may be an optional request, while in other embodiments it may be an automatic request. In some embodiments, the client device may automatically detect and send the request when the client device realizes that no contact matching the partial entry is found on the client device, and a user has stopped entering characters and/or continue to scroll for more contact matches when no more matches is found. In some embodiments, the client device or the application can take advantage of background threads. The client device or the application may issue a request for more contacts to be downloaded when the number of matches to the contact entry gets small on a prefix. This is done to preempt the situation where, when the next character is entered, the number of matches is likely to be reduced to zero or nearly zero. Following the request, there may be more contact data to provide the user. In other embodiments where the device has a reasonably fast connection and plenty of memory (or RMS storage space), a request can be sent for all the contacts matching a prefix of the prefix as well, so there is more data to show the user if the user hit the backspace or shorten the entry string.

Figure 12A:
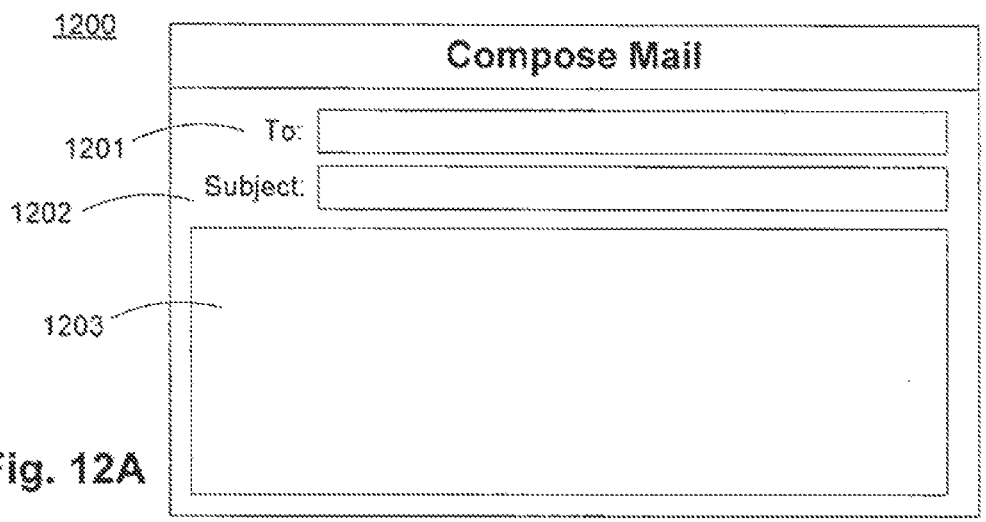
FIG. 12A is a screen shot of an exemplary message composing screen on an exemplary client device in accordance with some embodiments of the present invention.

FIG. 12A is a screen shot of an exemplary message composing screen on an exemplary client device in accordance with some embodiments of the present invention. FIG. 12A shows an exemplary "compose mail" screen shot 1200 in accordance with some embodiments of the invention. The compose mail screen takes up an entire area of a screen of the mobile device and has a "To" field 1201 for entering a recipient's contacting information, for example, an email address, and a "Subject" field 1202 for informing the recipient the matter in which the correspondence or mail is about. A message body is entered into a message body area 1203 below the "To" field and the "Subject" field. This exemplary configuration for a "compose mail" screen may also include optional "Cc" (Carbon Copy) or "Bcc" (Blank Carbon Copy) fields which are not shown.

Figure 12B:
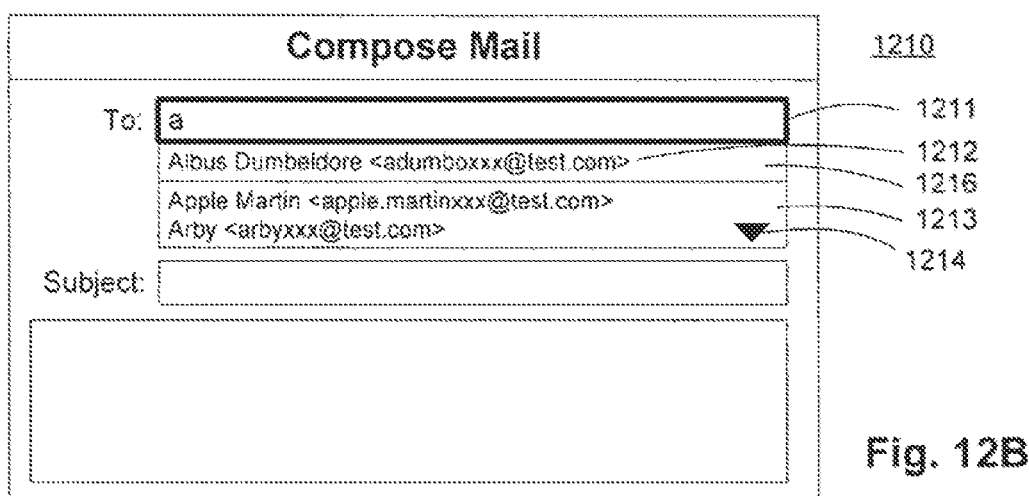
FIG. 12B is a screen shot of an exemplary auto-completion feature of a partial contact entry with a preset list of contacts displayed on the screen of a client device in accordance with some embodiments of the present invention.

FIG. 12B is a screen shot of an exemplary auto-completion feature of a partial contact entry with a preset list of contacts displayed on the screen of a client device in accordance with some embodiments of the present invention. FIG. 12B shows a similar "compose mail" screen shot as FIG. 12A except it also includes a partial entry in the "To" field 1211 containing a string consisting of a letter "a". The entry field or box of the "To" field also has a highlighted frame to visually aid a user that the field is actively receiving user input. Upon receiving the partial user entry, the client device displays a preset number of contacts found to match the partial entry. Note that an area 1213 containing the matching contacts are displayed immediately below the "To" field but above the "Subject" field. Since there is only limited space on the screen, the message body area 1215 has been reduced in size, in comparison to the message body area 1203 previously seen in FIG. 12A, to accommodate for the matched contacts displayed below the "To" field entry.

In this example, the client device displays a predetermined number (e.g. three) of contacts on the screen matching the partial entry. From this screen, a user can understand there are more than three contacts matching the partial entry because a "down triangle" 1214 is visible. The "down triangle" denotes that there are more contacts than the ones displayed that match the partial entry. However, these extra matching contacts are not displayed because of the preset number of matching contacts allowed to be displayed at any one time. There is a highlight 1216 over the first matching entry 1212, this highlight indicates to the user that the client device determines this to be the closest match to the user's partial entry based on the sorting factor(s) and a user may select this first matching entry by hitting the enter key when this first matching entry 1212 is highlighted of "selected". If none of the first three displayed entries matches what the user has in mind, the user can move the highlighted area over any of the other two matching entries and hitting a return or enter to select the highlighted entry.

Figure 12C:
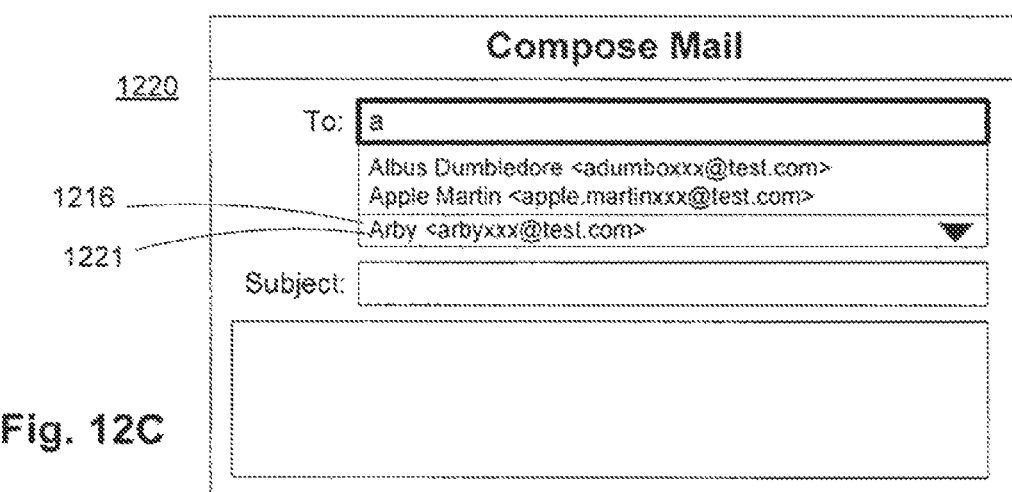
FIGS. 12C-E are screen shots of an exemplary auto-completion feature in a client device receiving a user input to scroll beyond the preset number of contacts displayed on the screen in accordance with some embodiments of the present invention.
Figure 12D:
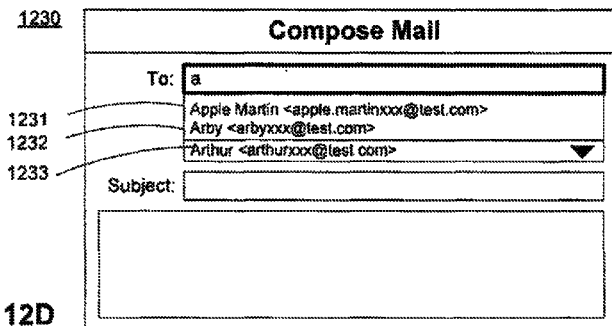
Figure 12E:
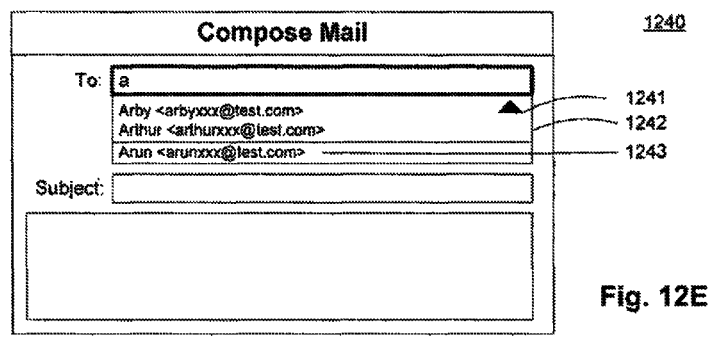

FIGS. 12C-E are screen shots of an exemplary auto-completion feature in a client device receiving a user input to scroll beyond the preset number of contacts displayed on the screen, in accordance with some embodiments of the present invention. FIG. 12C shows a "compose mail" screen shot 1220 similar to the screen shot 1210 in FIG. 12B. One difference is that the user has selected the third matching contact 1221, as indicated by the highlighted region 1216 highlighting the third matching contact. As a user attempts to scroll beyond this third matching contact 1221, a next matching contact will appear as shown in FIG. 12D. In this case, the original first matching contact 1212 as shown in FIG. 12B will disappear while the list of matching contacts shift upwards with a new, fourth, matching contact 1233 displayed at the bottom of the list of matching contacts displayed. For instance, the previously second matching contact 1231 replaces the first matching contact at the top of the list and the previously third matching contact 1232 is now second on the list. A similar "down triangle" as previously observed in FIGS. 12B and 12C are also displayed along side of the fourth matching contact 1233. This suggests to the user that more matching contacts are found from the downloaded list of contacts, but not displayed. As a user continue to scroll beyond the fourth matching contact 1233 as shown in FIG. 12D, the user will arrive at a screen shot 1240 as shown in FIG. 12E.

In FIG. 12E, a user has scrolled beyond the fourth matching contact and selected the fifth and last matching contact 1243 in the display area 1242. The user can tell this is the last matching contact because there is no "down triangle" associated with the last matching entry in the display area. This suggests to the user that the last displayed contact is the last matching contact found in the list of contacts downloaded from the server. Furthermore the user sees that an "up triangle" 1241 is now displayed alongside the third matching contact, suggesting that if the user wants to scroll back towards the initially found matching contacts, the user can scroll backwards.

Figure 12F:
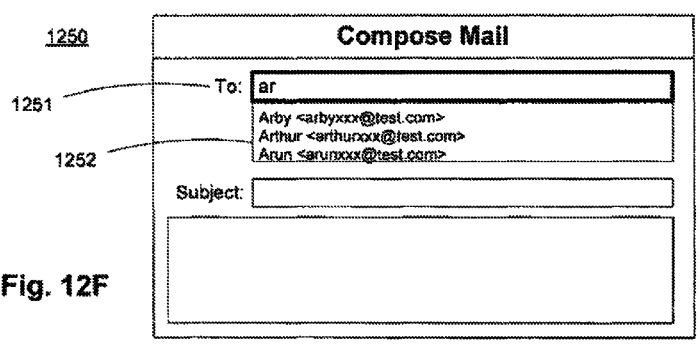
FIGS. 12F-G are screen shots of an exemplary auto-completion feature receiving additional characters to the partial contact entry displaying a list of contacts on the screen in accordance with some embodiments of the present invention.
Figure 12G:
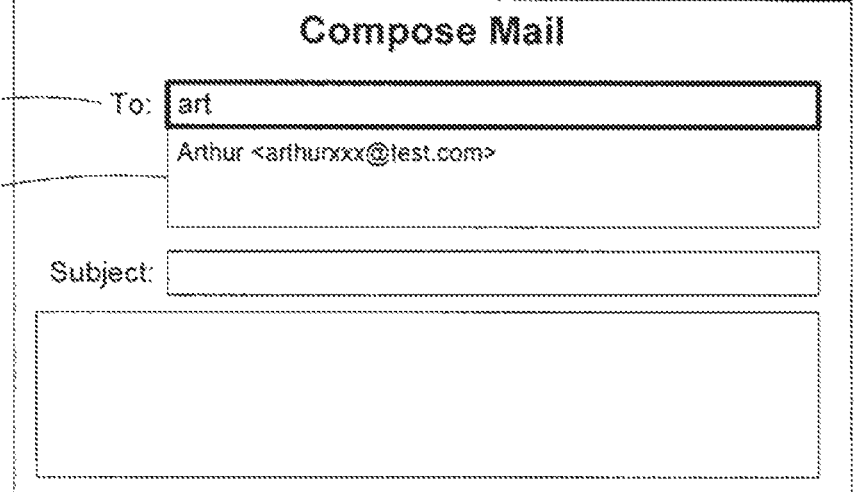

FIG. 12F-G are screen shots of an exemplary auto-completion feature receiving additional characters to the partial contact entry displaying a list of contacts on the screen in accordance with some embodiments of the present invention. In FIG. 12F, a character is added to the string of the partial entry; consequently, the number of matching contacts is reduced. The screen shot 1250 shows that with the new string 1251, there are only three matching contacts found in the display area 1252. Since there is no "down triangle" in display, this suggests to the user that only three matching contacts are found in the list of contacts downloaded from the server. Still in FIG. 12G, another character is added to the string 1261 of the partial entry, further reducing the number of matching contacts to one in the display area 1262. It should be appreciated that in some embodiments, even if there is only one matching contact, the display area 1262 appearing below the "To" field still contains sufficient space to display the maximum preset number of contacts for display. In other embodiments, this display area 1262 may take up only the sufficient space to display, for example, one, two, and up to three contacts, as the number of contacts are found matching from the downloaded list of contacts, but will not exceed the space to display beyond, for example, three matching contacts, as determined by the maximum preset number of contacts to be displayed.

When no matching contact is found, the application or client device may have the option to search the complete contact list on the server. In some embodiments, when a user has not made an entry, an option is given to the user to search over all contacts on the server. In other embodiments, a user may specify, such as via a menu or other means, that the user is interested in all contacts and the contacts should be manually fetched from the server. Still, there can be an optional entry displaying in the auto-complete window stating, for example, "Can't find your contact? Click here to search all contacts?" for the user to click the optional entry and the application or client device will fetch more contacts from the server.

Figure 12H:
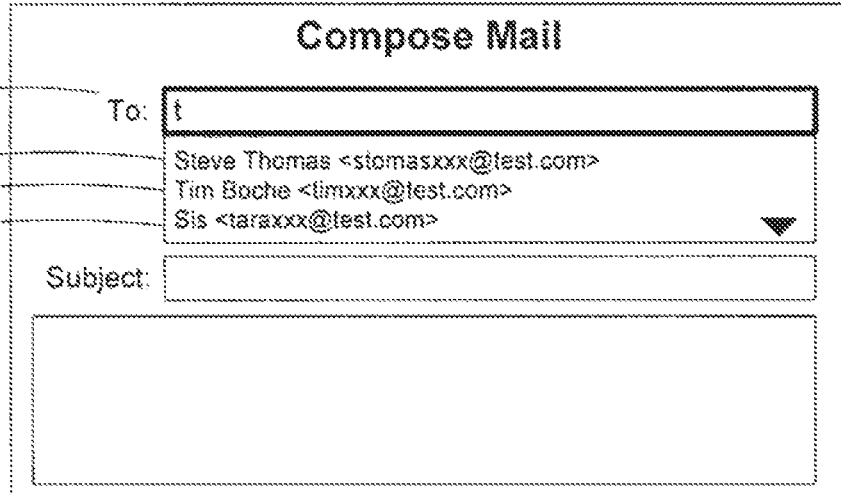
FIG. 12H is a screen shot of an exemplary auto-completion feature in a client device receiving a partial entry with a variety of contact entries matching the partial entry displaying on the screen in accordance with some embodiments of the present invention.

FIG. 12H is a screen shot of an exemplary auto-completion feature in a client device receiving a partial entry with a variety of contact entries matching the partial entry displaying on the screen in accordance with some embodiments of the present invention. FIG. 12H shows a screen shot 1270 of a "compose mail" screen with a partial entry consisting of a letter "t". In some embodiments, when the list of contacts downloaded onto the client device is not sorted alphabetically, but instead is sorted on the basis of other criteria, such as frequency of encounter and/or the temporal time frame in which the contacts were last encountered, the contacts will not appear alphabetically on the list, but in the order based on the factor(s) in which they are sorted. Furthermore, it should be appreciated that not just the names of the contacts are being matched, but also the email addresses or any other information such as a nick name associated with the contact will be searched and matched. In this example, as the letter "t" was entered, the client device returns various different matching contacts. A first matching contact 1272 has a last name that begins with a "t", a second matching contact 1273 has a first name, and an email that begins with a "t", and a third matching contact 1274 that has an email beginning with a "t". Therefore, the partial entry is matched to different information associated that are stored in the contact list.

Application Wide Accelerator Keys for Mobile Devices

Mobile devices have small physical dimensions that contribute to the convenience and case of carrying them from place to place. However, the small dimensions also contribute to difficulties for user interactions with the device. For instance, a small screen causes the size of text and graphics to be reduced in order to maintain a similar amount of text or graphics to be displayed on screen. Small screens make text and graphics difficult to read and for a user to interact with menus. Small overall dimensions of a device may lead to a smaller user interface and user input device. Key pads for user inputs are often smaller than usual and thus are challenging to users who are not dexterous. Another reason for difficulties in user interaction is that a user interface may vary widely among applications and vary among different screens in a similar application. In accordance with teachings of the present invention, one solution to facilitate user interaction on mobile devices is to utilize a simple accelerator key approach, where certain key actions are consistent across an entire application or different applications, making it faster and easier to perform certain actions in different contexts in the one or more applications. Such an approach is described in detail below.

Figure 13:
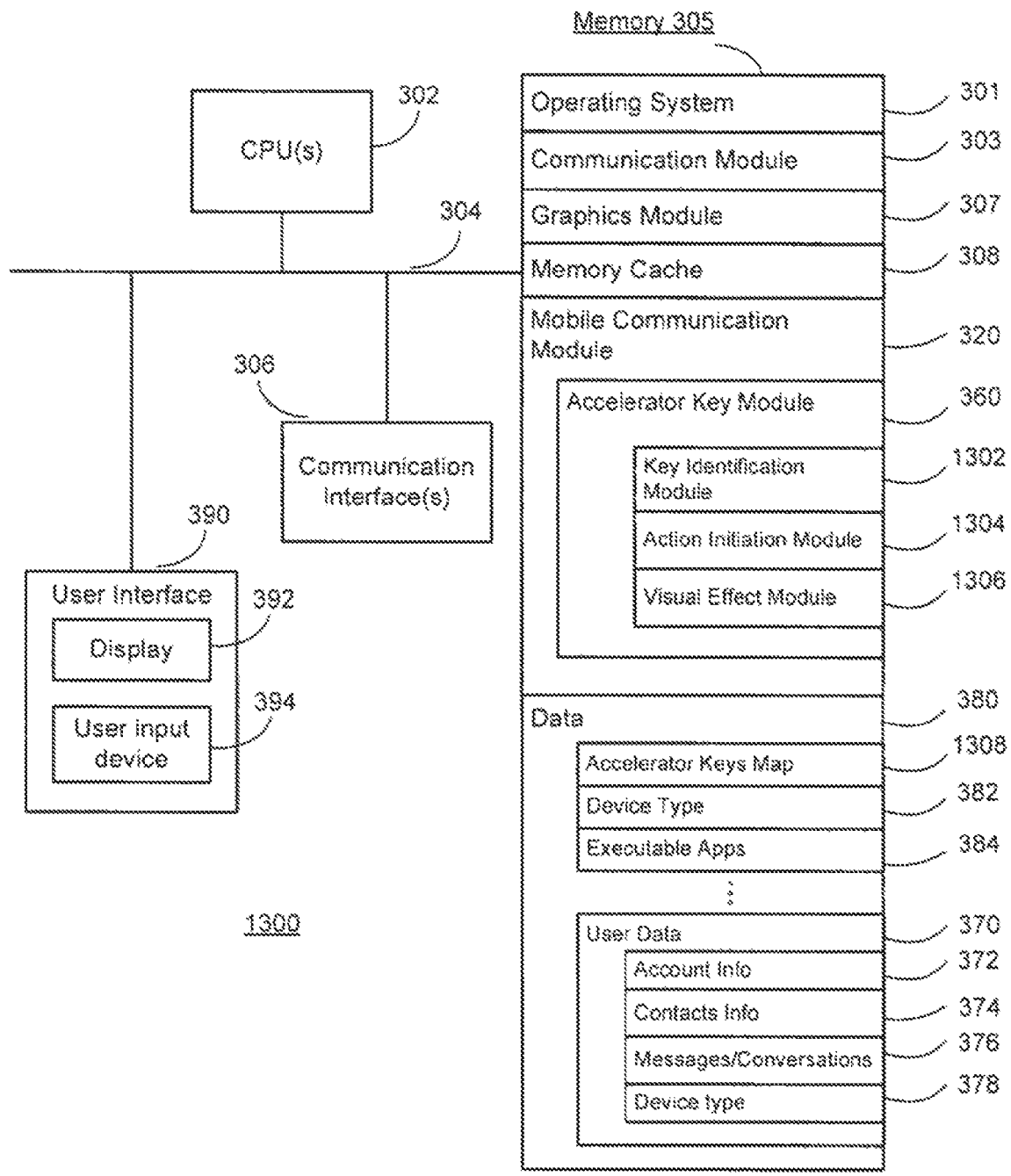
FIG. 13 is a block diagram of an exemplary client device having components for carrying out functions of an accelerator key module in accordance with some embodiments of the present invention.

FIG. 13 is a block diagram of an exemplary client device having components for carrying out functions of an accelerator key module in accordance with some embodiments of the present invention. The client device 1300 in FIG. 13, similar to the client device 300 described in FIG. 3, includes one or more processing units (CPU's) 302, one or more network or other communications interfaces 306, memory 305, and one or more communication buses 304 for interconnecting these components. The client device 1300 also includes a user interface 390 having a display 392 and a user input device 394. Memory 205 similarly includes an operating system 301, a communication module 303, a graphics module 307, memory cache 308, data module 380 containing information about device type 382, executable applications 384, and user data 370, and a mobile communication module 320.

The mobile communication module 320 may include an accelerator key module 360 for performing certain actions in accordance with user entry of particular key actions recognized in certain contexts of the one or more applications. The accelerator key module 360 further includes at least one of: a key identification module 1302, an action initiation module 1304, and a visual effect module 1305.

The key identification module 1302 identifies when an accelerator key has been actuated in an application. For instance, there may be contexts in which accelerator keys are not recognized or not accepted in an application. This module 1302 distinguishes the key actions for a particular context in an application to recognize that an accelerator key has been actuated.

The action initiation module 1304 executes a function that is equivalent to a set of key strokes represented by an accelerator key after it has been activated. In particular, when the actuation of an accelerator key is recognized, and the context of the application at the time of the actuation is such that the corresponding action is available, the action corresponding to the actuated accelerator key will be initiated by this module.

The visual effect module 1305 indicates to a user that actuation of the accelerator key has been accepted and that an action has been initiated in response to the actuation of the accelerator key.

The data module 380 further includes an accelerator keys map module 1308 for storing a map to indicate what action(s) are to be taken when certain keys are actuated in different contexts of an application. In some embodiments, the accelerator keys map module 1308 maps the accelerator keys to actions for a single application. In other embodiments, the accelerator keys map module 1308 stores information about actions of global accelerator keys to be actuated for similar actions across contexts of different applications in which the accelerator keys are recognized.

Figure 14:
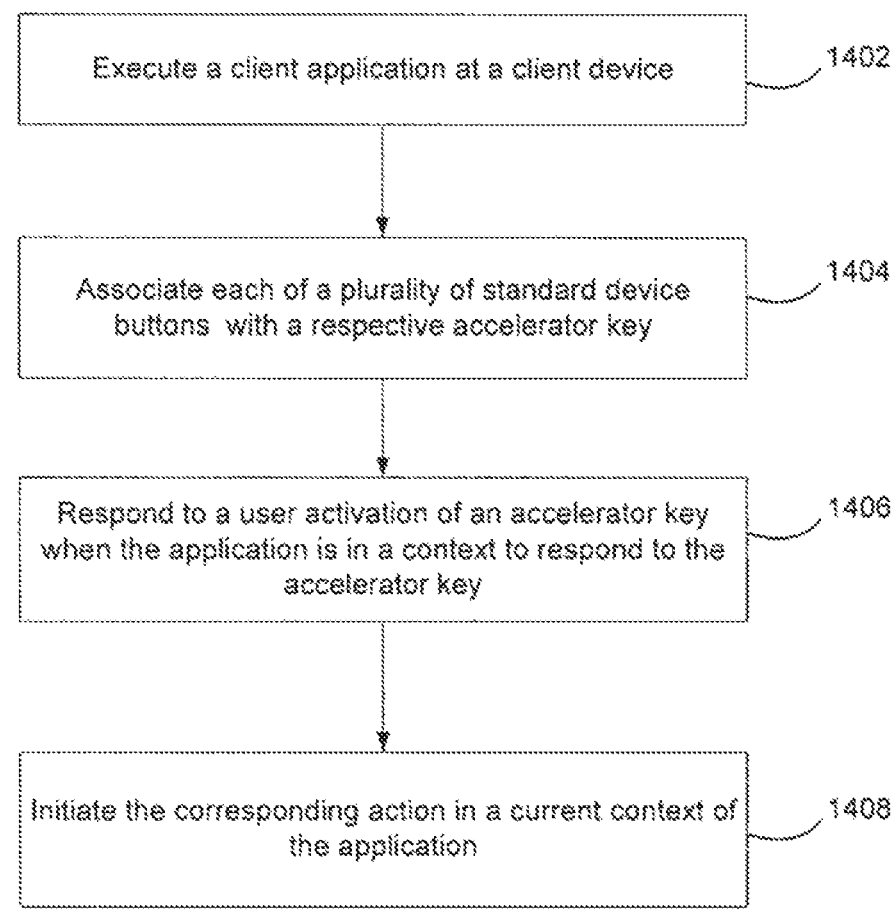
FIG. 14 is a flow diagram illustrating how an action in an application is activated by an accelerator key in accordance with some embodiments of the present invention.

FIG. 14 is a flow diagram illustrating how an action in an application is activated by an accelerator key in accordance with some embodiments of the present invention. In some embodiments, application-wide accelerator keys may be operational for a client based email application program adapted to operate on a mobile communication device. The flow chart 1400, as shown in FIG. 14, illustrates the actions of application-wide keys as applied to an application on a mobile communication device. In block 1402, a client based application is executed on a mobile communication device. In block 1404, a client device associates each of a plurality of standard device buttons with a respective accelerator key so that a respective accelerator key corresponds to a respective same action, in a plurality of contexts of the client application. For example, keys on an input device correspond to similar actions in different contexts (i.e., screens) in an application. In block 1406, while the application is in a context responsive to an accelerator key, the client application will respond and interpret the user activation of the accelerator key. In block 1408, a corresponding action is initiated in response to the user activated accelerator key while in the context of the application that in which the accelerator key is recognized.

The benefit of application-wide accelerator keys is to allow a user to activate one key or button and accomplish a similar task or action corresponding to the one key or button, which would otherwise require a series of key presses via a menu or some other mechanism in each different context in an application. While this may save work on the part of the user, the user does have to discover the accelerator keys and recall them when attempting to carry out a task. In many existing mobile applications, when accelerator keys are available, they vary widely for different tasks and/or screens within a similar application. Inconsistency means the user must learn and recall a number of different keys and be able to recall the situation when each key is appropriate or recognized. Therefore in all the embodiments described, application-wide accelerator keys are configured to be consistent at least within each application, and in some instances, application keys can represent a similar action across different applications.

In some embodiments, assignment of standard device buttons as accelerator keys is predefined and based on one or more criteria that may include, but are not limited to, ease of use of each standard device button, standard device buttons most commonly used, and standard device buttons most intuitively matching generic functions they are to represent. In other embodiments, the assignment of standard device buttons as accelerator keys may be, optionally, defined by a user of the mobile communication device. Giving a user an option to define his/her accelerator keys may facilitate easy recall of which key is appropriate for a particular task.

There are a wide variety of mobile communication devices ranging from the 'smart' phones that have alphanumeric keys such as 'QWERTY' input key pad, to the common cellular telephones having a traditional numerical input key pad similar to a touch tone telephone pad with some additional soft keys. Different keys on different mobile communication devices may be assigned as accelerator keys. For instance, a 'c' may correspond to a 'compose mail' action in an email application. Similarly an 'a' may correspond to a 'reply to all' action, and an 'r' may correspond to 'reply to sender' etc. While these examples are more intuitive to a user of smart phones like a Blackberry™ that has an alphanumeric input key pad, any numerical key or soft key may be assigned as an accelerator key for a typical mobile communication device such as a cellular telephone that has a numeric only key pad. In some embodiments, a client device may be a mobile phone having input buttons form '0' to '9', and a plurality of the input buttons from '0' to '9' are assigned as accelerator keys. For instance, in a client based email application a '2' may be assigned to 'compose mail', a '1' may be assigned to 'search mail', a '*' may be assigned to 'star' a message or a conversation to mark it as unique. In some embodiments, the application in which the accelerator keys are implemented is an email application that is configured specifically for a mobile device but is not specific to a type of mobile device. In other words, this exemplary email application is configured for operation on mobile devices that are simply cellular telephones or smart phones alike and not just in one or another category. Furthermore, this concept of accelerator keys may also be applied to other applications that can be implemented across different platforms, such as cellular phones and smart phones.

In one embodiment, each respective accelerator key in a mobile device corresponds to a respective action in a plurality of contexts of the client application. Using a client-based email application that performs wireless communication using a conversation-centric user interface such as Gmail™, the plurality of contexts include, but are not limited to, a message composition context, a message reading context, a conversation viewing context, and a conversation listing context etc. In other words, at least certain accelerator keys will perform the corresponding actions in this plurality of contexts of the email application.

In some embodiments, the association of standard device buttons with accelerator keys and application actions is permanent and distinct with respect to each different application executed by the client device. For example a '2' is permanently assigned to 'compose mail' for an email application on the mobile device in which the email application is operational, but the '2' may represent a 'call back' feature in a SMS (Short Message Service) application responding to a SMS message. In other embodiments, the association of standard device buttons with accelerator keys and application actions is permanent and shared between at least two different applications executed by the client device. For instance, a '1' may be assigned to 'reply to sender' for an email application on mobile device, but it may be similarly assigned to 'reply to sender' for a SMS application. In some cases, such assignments of buttons or keys as accelerator keys may be performed by the user, or it may be pre-defined by the client device, or it may be pre-defined by a source that produce both applications for the mobile device.

Once an accelerator key is activated, a confirmation is employed to indicate to a user that a task corresponding to the accelerator key has been executed. In some embodiments, the confirmation may be a visual indication such as displaying of a short text or a graphical symbol on the screen of the mobile device. In other embodiments, the confirmation may be an audio indication. Still in other embodiments, the confirmation may be a combination of audio and visual indications. A confirmation can also be generic for all actions executed by all accelerator keys, or the confirmation can be unique for each individual task executed by each unique accelerator key. In some embodiments, after successfully initiating a task in respond to activation of an accelerator key, the client device provides a confirmation in response to user activation of the accelerator key to indicate performance of the action corresponding to the user activated accelerator key. This confirmation can include, but is not limited to, generating at least one of an icon change, a text change, a screen change, a dialogue informing that an action is completed, and an audible alert. In some embodiments, no deliberate confirmation is provided other than the visual feedback that a task has been completed as a result of the activation of the accelerator key.

FIGS. 15A-15F, like all other figures in this disclosure, are shown for the purposes of illustration and should not be construed as limiting to the invention. For example, the user interfaces in all of FIGS. 15A-15F may take on different physical appearances, such as different presentations of the conversations or messages. Further, a different configuration of the menus is possible, the screen display can be configured to display more or less actions, different actions can be displayed on the menus compared to what's shown, and different accelerator keys can correspond to the actions are illustrated.

Figure 15A:
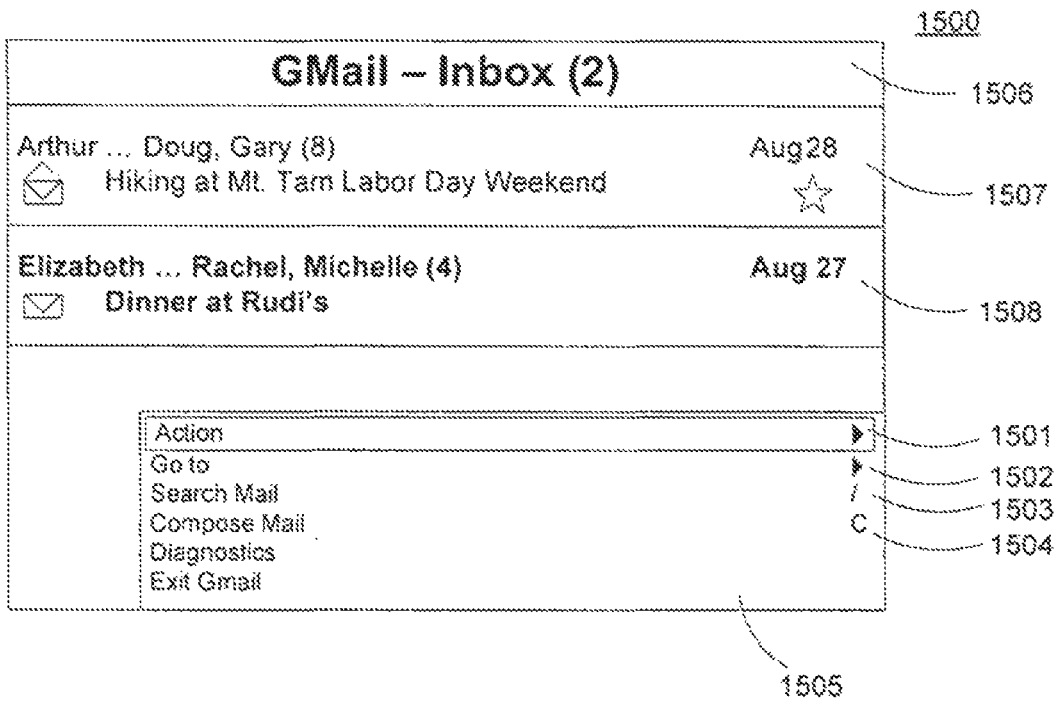
FIGS. 15A-B are screen shots of one exemplary series of on-screen menus showing accelerator keys corresponding to particular functions in one type of mobile communication device in accordance with some embodiments of the present invention.
Figure 15B:
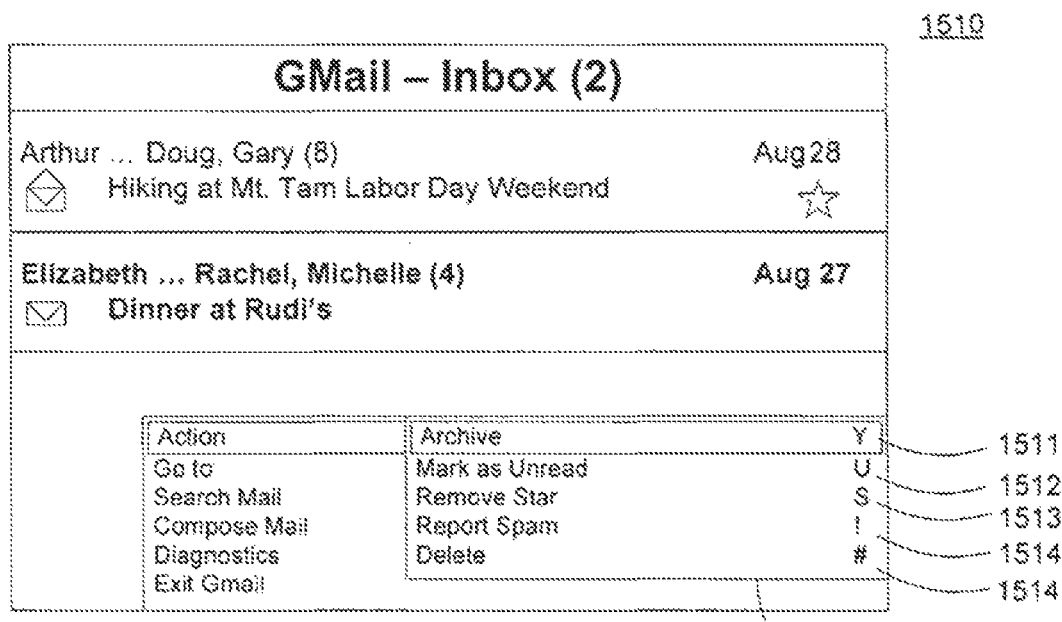

FIGS. 15A-B are screen shots of an exemplary series of on-screen menus showing accelerator keys corresponding to particular functions in a type of mobile communication device in accordance with some embodiments of the present invention. The screen shot 1500 in FIG. 15A shows an exemplary screen shot of conversation-listing view in an exemplary client-based email application that has a conversation-centric user interface. The screen shot 1500 shows a menu that may be activated in the context of a conversation-listing view. In this embodiment, which is representative of an email application operating in a smart phone, the '/' key 1503 and the 'c' key 1504 represent the actions of 'search mail' and 'compose mail' respectively. This menu shows the user which tasks are executed upon actuation of the accelerator keys '/' 1503 and 'c' 1504, and also suggests that these accelerator keys are recognized in the context of a conversation-listing view in the application.

FIG. 15B shows a screen shot 1510 that includes an exemplary sub-menu 1516 upon further expansion of the 'action' item 1501 in the main menu of FIG. 15A. Also shown are examples of various accelerator keys such as 'Y' 1501, 'U' 1512, 'S' 1513, '!' 1514, '#' 1515 that correspond to the actions 'archive', 'mark as unread', 'remove star', 'report spam', and 'delete' respectively. These are also accelerator key actions that are recognized in the context of a conversation listing view.

Figure 15C:
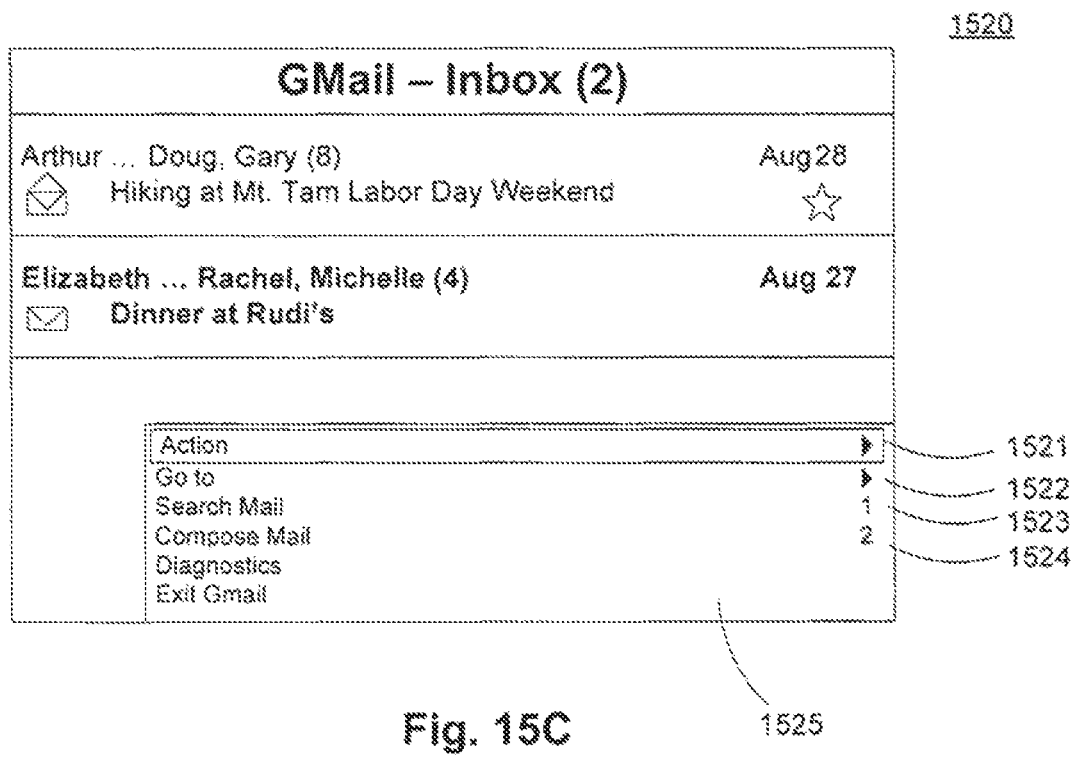
FIG. 15C is a screen shot of an exemplary on-screen menu showing accelerator keys corresponding to particular functions in a simple mobile communication device in accordance with some embodiments of the present invention.

FIG. 15C is a screen shot of an exemplary on-screen menu showing accelerator keys corresponding to particular functions in a simple mobile communication device in accordance with some embodiments of the present invention. In contrary to the screen shots as shown in FIGS. 15A and 15B which contain alpha characters, the menu 1525 contains numerical characters of '1' 1523 and '2' 1524 as exemplary accelerator keys corresponding to the actions of 'search mail' and 'compose mail' respectively. FIGS. 15A-15C illustrate that while a user can activate a menu to accomplish a certain task by pressing one or more keys one or more times, a similar task can be executed by an accelerator key as indicated to a user in the menu. In general, accelerator keys will facilitate execution of tasks in any application operating on a mobile communication device.

Figures 15D, 15E:
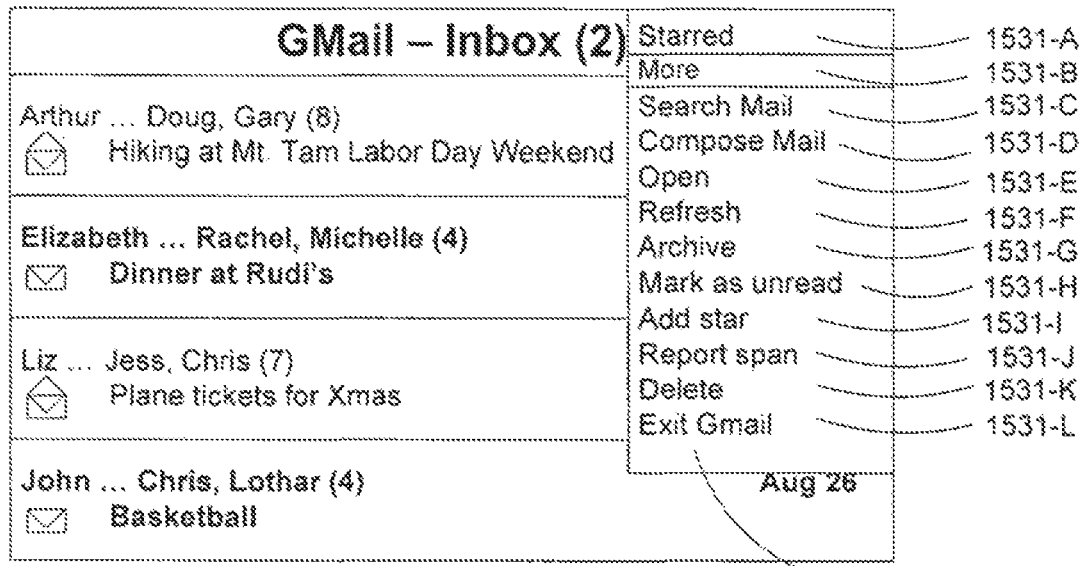
FIGS. 15D-F are screen shots of an exemplary series of on-screen menus showing accelerator keys corresponding to particular functions in a complex mobile communication device in accordance with some embodiments of the present invention.
Figure 15F:
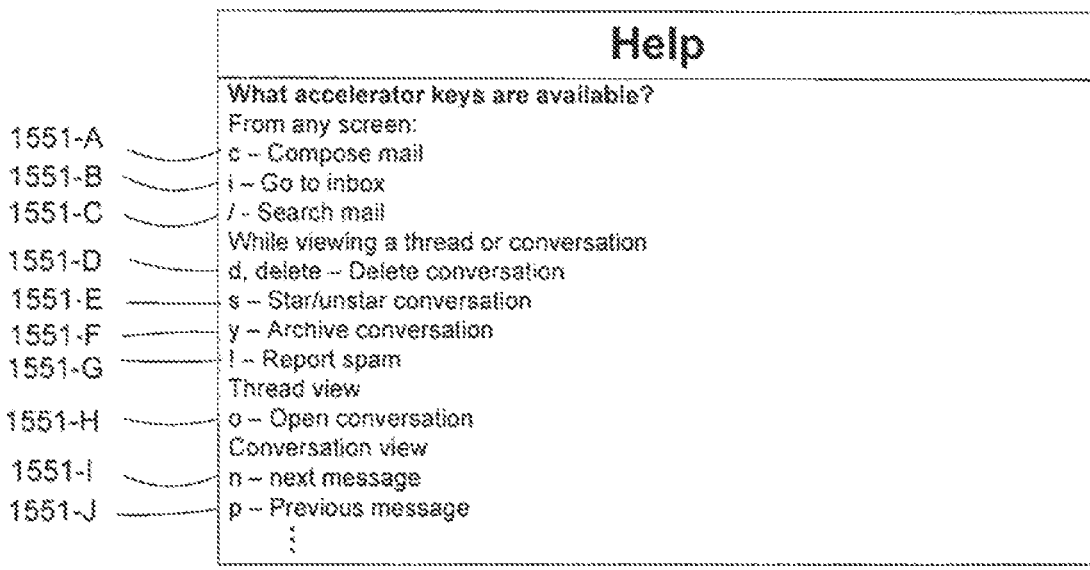

FIGS. 15D-F are screen shots of an exemplary series of on-screen menus showing accelerator keys corresponding to particular functions in a complex mobile communication device in accordance with some embodiments of the present invention. In some embodiments, the accelerator keys may not be shown corresponding to an action as displayed on a menu. FIGS. 15D and 15E shows that in some devices, a user must first activate a main menu 1532 as shown in FIG. 15A, further activate an item, like the action 'more' 1531-B, in the main menu, to activate a sub-menu 1542 as shown in FIG. 15B, and then further activate another item 'help' 1541-B, before arriving at a key map showing different actions corresponding to different accelerator keys. In some embodiments, as shown in FIG. 15F, there may be a series of keys 1551-A to 1551-C that are recognized in any screen or any context of the application, but some other keys such as 1551-D to 1551-G may be in fewer contexts of the application. In other embodiments, there may be accelerator keys 1551-H, 1551-I to 1551-J that are recognized in fewer contexts of the application.

Thus, one should appreciate that a set of acceleration keys may contain keys that are recognized by one or more applications and can function in a spectrum of contexts in one or more applications. In some embodiments, a set of accelerator keys may be recognized and actuate similar respective functions across all or selected contexts in some or all applications operating on a mobile communication device. In other embodiments, a set of accelerator keys may be applicable in a specific application, and within the set of accelerator keys, a first subset may be recognized in all contexts, while a second subset may be recognized in a lesser group of contexts, and still a third subset of accelerator keys may be recognized only in one or two contexts of the application. In still other embodiments, within one set of accelerator keys for an application, each accelerator key is recognized for similar respective functions throughout the same application, but not all accelerator keys may be recognized in all contexts in the same application.

Attachment Transcoding for Mobile Devices

Most mobile devices are not capable of rendering complex document formats such as Microsoft®Word, Excel, PowerPoint, Adobe PDF, etc., or image formats such as .jpg, .bmp etc., but documents of these types are often included in email attachments. As more users read emails on their mobile phones, it becomes more important to make the data in these files available on the phones as well. The majority of these files include presentation information and essential data or information. The "real data" or essential data is the information that is important to the user. The following disclosure describes a mechanism to strip away all presentation-focused information from the file formats, sending the essential data or information contained in the respective file formats to the client device for display.

Figure 16A:
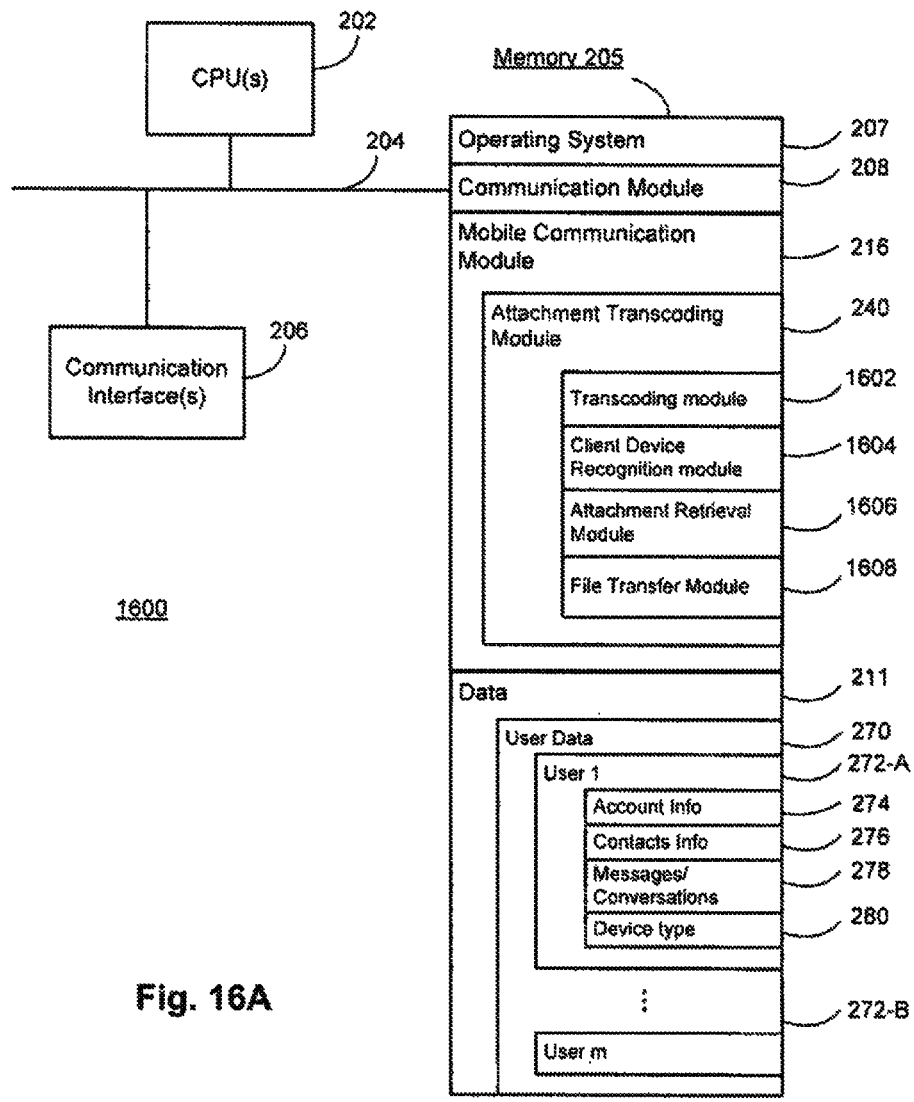
FIG. 16A is a block diagram of an exemplary server having components for carrying out functions of an attachment transcoding module in accordance with some embodiments of the present invention.

FIG. 16A is a block diagram of an exemplary server with components to carry out functions of an attachment transcoding module in accordance with some embodiments of the present invention. The server structure 1600 in FIG. 16A, similar to the server 200 described in FIG. 2, includes one or more processing units (CPU's) 202, one or more network or other communication interfaces 206, memory 205, and one or more communication buses 204 for interconnecting these components. Memory 205, as described with reference to the server 200 described in FIG. 2, also stores programs, modules and data structures, or a subset thereof, includes an operating system 207, a communication module 108, a data module 211 containing similar user data 270 for individual users that may range from user 1 272-A to user m as previously described with reference to FIG. 2, and a mobile communication module 210.

The mobile communication module 210 similarly includes an attachment transcoding module 240 for converting attachments from a native or original file format to a different file format that can be rendered and displayed in a client device, such as a mobile device. This attachment transcoding module 240 further includes at least one of a transcoding module 1602, a client device recognition module 1604, an attachment retrieval module 1606, and a file transfer module 1608.

The transcoding module 1602 translates, transcodes, or re-writes files from a native or original file format that is not readable by a mobile device to a format that can be rendered and displayed on a client device. Attachments are generally formatted in a native file format of whatever original application created the attachment file. A client device, such as a mobile device, is usually not sufficiently sophisticated or powerful to support all of the different applications typically associated with attachments. Furthermore, the native file format typically includes formatting information for the benefit of working with the file in the associated application, but which is unrelated to the essential information. The transcoding module 1602 separates the presentation format information from the essential information, leaving the essential information in a format that is presentable to a user on the display of a mobile device.

The client device recognition module 1604 recognizes a client device type. The purpose of this module 1604 is to recognize the type of client device, such as its technical specifications, memory size, and processing capabilities, to understand what format the client device is capable of reading and displaying.

The attachment retrieval module 1606 retrieves the attachment that is stored on the server in response to a user's request to view the attachment. In some embodiments, since a representation of the attachment is initially sent with a message to the client device, a user has to actively request viewing of the attachment for the server to transcode the actual attachment stored on the server and send the transcoded attachment to the client device.

The file transfer module 1608 transmits a representation of the attachment in the message to which the attachment is associated, along with the text of the message, to the client device. This module is also responsible for sending the transcoded attachment, in response to the user's request to view the attachment, to the client device for display.

Figure 16B:
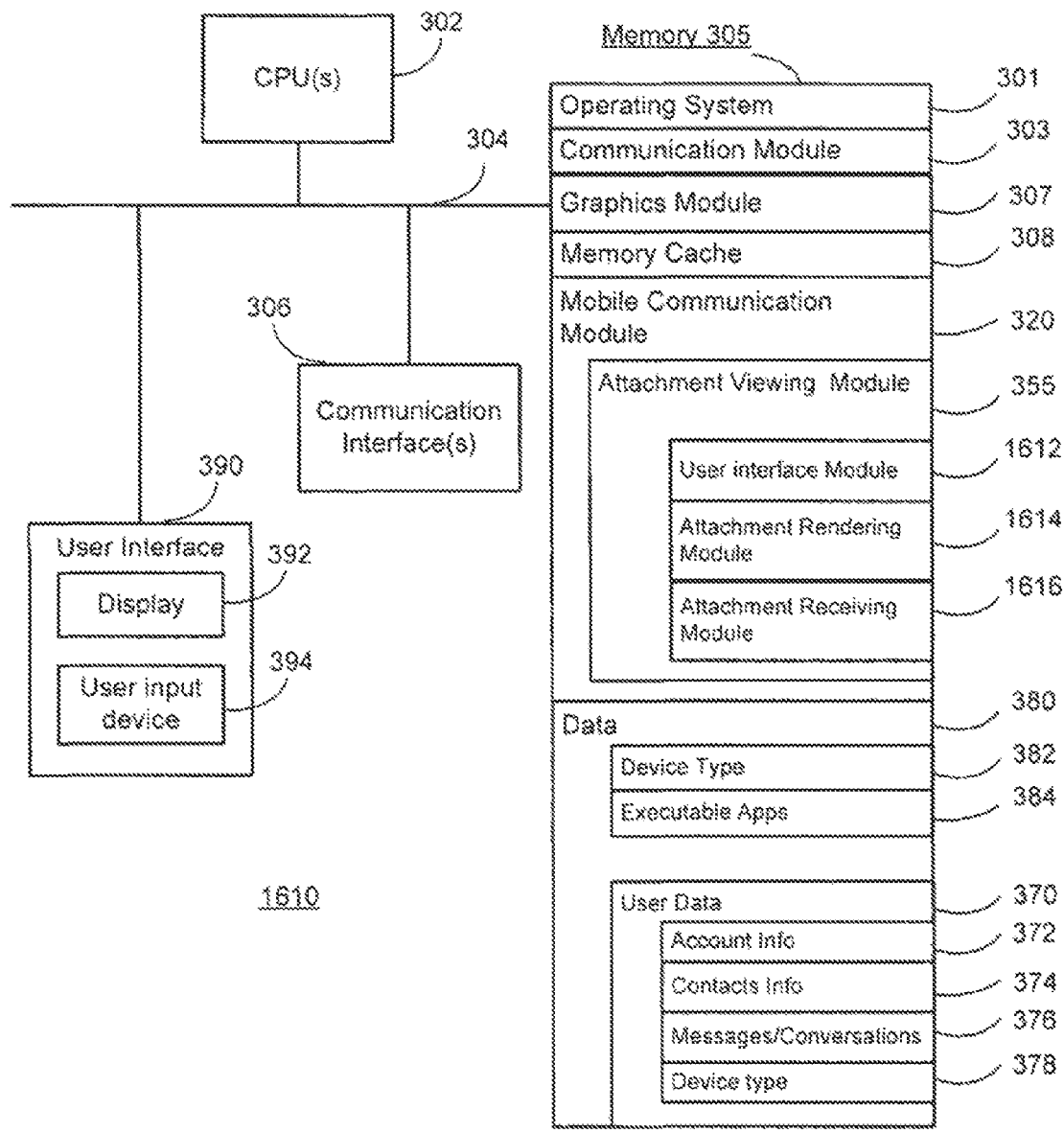
FIG. 16B is a block diagram of an exemplary client device having components for carrying out functions of an attachment transcoding module in accordance with some embodiments of the present invention.

FIG. 16B is a block diagram of an exemplary client device having components for carrying out functions of an attachment transcoding module in accordance with some embodiments of the present invention. The client device 1610 in FIG. 16B, similar to the client device 300 described in FIG. 3, includes one or more processing units (CPU's) 302, one or more network or other communications interfaces 306, memory 305, and one or more communication buses 304 for interconnecting these components. The client device 1610 also includes a user interface 390 having a display 392 and a user input device 394. Memory 205 similarly includes an operating system 301, a communication module 303, a graphics module 307, memory cache 308, a data module 380 containing information about device type 382, executable applications 384, and user data 370, and a mobile communication module 320.

The mobile communication module 320 may include an Attachment Viewing Module 355 for rendering the transcoded attachment for display on the client device. This attachment viewing module 355 further includes at least one of a user interface module 1612, an attachment rendering module 1614, and an attachment receiving module 1616.

The user interface module 1612 provides a user interface in a message to display a representation of an attachment and to allow a user to interact with the representation of the attachment such as making a request to the server to view the attachment.

The attachment rendering module 1614 renders a transcoded attachment for display. This module 1614 renders a transcoded attachment to display in a client device and enables a user to navigate about the transcoded document in the display environment. For instance, this module may render a transcoded attachment originally in a document format or in an image format for display by the client device. In some embodiments, if an attachment is large in size, a portion of the attachment is transcoded and displayed. The module 1614 permits a user to request for more of the attachment to be transcoded or transmitted from the server to the client device for display.

The attachment receiving module 1616 receives the transcoded attachment transmitted from the server onto the client device for rendering and displaying.

Figure 17A:
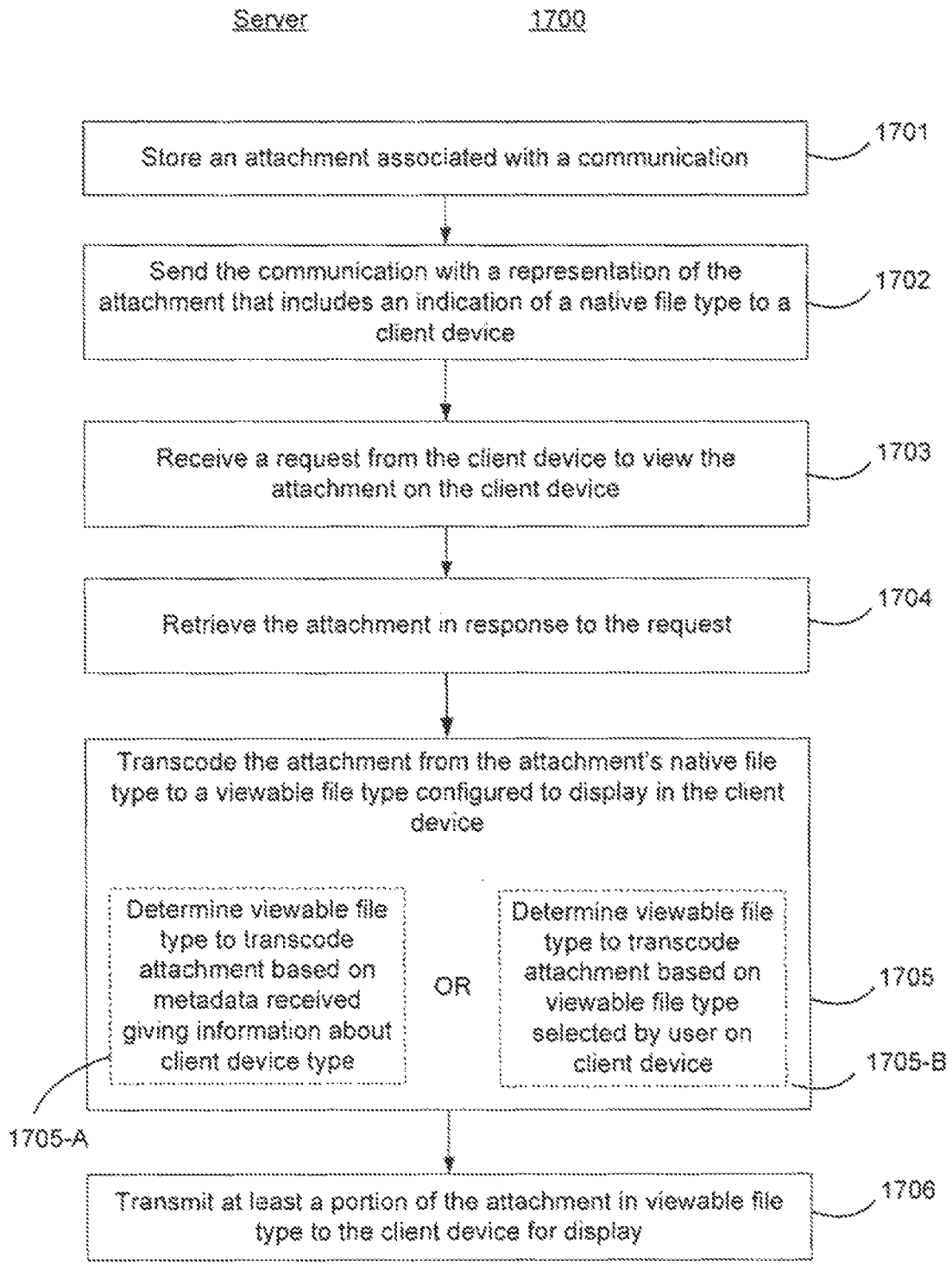
FIG. 17A is a flow diagram illustrating exemplary attachment transcoding operations in a server in accordance with some embodiments of the present invention.

FIG. 17A is a flow diagram illustrating exemplary attachment transcoding operations in a server in accordance with some embodiments of the present invention. The flow chart 1700 in FIG. 17A describes the transcoding operation in a server. In some embodiments, after a mail server receives a communication with an attachment, the attachment associated with the communication and the communication are both stored in the server, as shown in block 1701. In some embodiments, the communication includes, but is not limited to any one of an email message, an SMS message, an instant message, and a message in a message board. As the communication is sent to the client device, a representation of the attachment indicating a native file type of the attachment, but not the actual attachment, is also sent to the client device along with the communication, as shown in block 1702. Once a user reviews the communication and indicates a desire to view the content of the attachment, the server may receive a request from the client device to view the attachment on the client device, as shown in block 1703. In response to the request from the client device, the server retrieves the attachment from the server, as shown in block 1704 and transcodes the attachment from the attachment's native file type into a viewable file type configured for display in the client device, as shown in block 1705. In some embodiments, there is more than one file type viewable by the client device. In these cases, the server may, in one option, determine the viewable file type in which to transcode the attachment based on metadata received from the client device that provides information about the client device, as shown in block 1705-A. Or, the server may in another option, determine the viewable file type in which to transcode the attachment based on a viewable file type selected by a user of the client device, which may or may not be in response to a user query, as shown in block 1705-B. Still in some embodiments, the viewable file type may be chosen by the server without any information about the client device type from the client device or the user. In this case, the viewable file type would be one considered universally viewable, for viewing in even the simplest of mobile devices (such as a text file). After the attachment has been transcoded, at least a portion of the attachment in a viewable file type is transmitted to the client device for display, as shown in block 1706.

In some embodiments, the size of the transcoded attachment will be smaller than the size of the attachment in its native file type. This is because the native file type generally contains format related presentation information to aid display of the document in its native form in the application in which the file was created. However, the presentation information is irrelevant to the essential data or information contained in the document which is of interest to the recipient of the attachment. Unless the attachment is sent in a native file containing little to no presentation formatting information, such as WML, HTML or Text file, which does not require transcoding for display, the native file will mostly be large in size as compared to the viewable file type. By definition, a native file type is a file format that is not viewable on a mobile device. An object is therefore to transcode and to modify the attachment in this native file type into a file type that is compatible with a mobile device for display, enabling a user to view the attachment on the client device. In some embodiments, after transcoding, the viewable file type may be further compressed and resized before being transmitted to the client device; in other embodiments, the native file type may also be compressed and then resized. In other embodiments, the viewable file type from which document files may be transcoded into for viewing on a client device includes at least one of text, XHTML and WML. In some embodiments, the document native file type from which an attachment may be converted from includes any WORD file, EXCEL file, PDF file, and POWERPOINT file etc. In other embodiments, the native file type includes image files or any other type of files that is viewable using an application executable on a personal computer.

In some embodiments, there may be a large amount of information contained in a document or an image file. If the client device is a mobile device, it may encompass wireless communication devices including, but not limited to, cellular phone, smart phone, and personal digital assistant (PDA) devices. While the amount of memory storage space available for each type of mobile device differs, generally, the amount of memory is significantly less than the capacity of a personal computer. Consequently, after an attachment is transcoded into a viewable file type on the server, usually a portion, rather than the entire amount, of the viewable document is sent to the client device by wireless transmission. In some embodiments, a small portion of the viewable file type is sent to the client because of at least one of many reasons including, but not limited to, the type of the client device, limited memory storage in the client device type, a latency in transmission of data, cost of transmission of data, and the sheer size of the transcoded document even after it has been compressed and resized. In some embodiments, the amount of truncation of the attachment in the viewable file type, for example, a fixed data size for the transcoded attachment, is automatically determined by the server according to at least one of the predetermined criteria describe above. In other embodiments, there may be an additional option to allow a user to fetch more information, or to even allow an entire transcoded document to be transmitted to the client device.

In some embodiments, the attachment is permanently stored on the server and the transcoding of the attachment is performed on the server. However, the rendering of the transcoded attachment into viewable file format is performed on the client device. This should be clearly distinguished from attachment transcoding implemented for some email applications that are used on desktop computers. For example, in these desktop computer applications, the attachment may often be sent in its native file along with the communication onto the client device and both the transcoding and the rendering of the attachment is performed on the client device, presumably because the client device (e.g., a desk tip computer) has both the memory storage space and the computing power to perform the actions. For client devices such as mobile devices where attachments are stored on the server, the fetching process and the transcoding process of the attachment can be much faster because it eliminates the complexities of caching and transferring of the attachments.

In some embodiments, the attachment transcoder translates a document into a format that the phone's browser can support and serves that to the user on the client device. While HTML formatted documents are viewable on mobile devices, HTML it is not always the best file format for document attachments. HTML is generally optimized for desktop viewing. In some embodiments of HTML files, the files sometimes are too verbose, using as much text in the HTML tags as the document data itself, are too desk-top focused, and do not consider the device's dimensions and capabilities in generating the page. In some embodiments of the attachment transcoder, the displaying capabilities of the browser are not relied upon for displaying the attachment; instead, the attachment transcoder will translate or rewrite the attachment into a format that is readable by the browser. In other words, the attachment transcoder will do all the work to translate the attachment into a format to adapt to the display capabilities of the browser instead of having the browser adjust the attachment for display.

While some embodiments of an electronic communication are in the form of email, or that of a mail application as described above, it should be appreciated that attachments may also be associated with other forms of electronic communication including at least one of, but not limited to, an instant message and SMS. Therefore, one should appreciate that the attachment transcoder may also transcode an attachment in an electronically transmitted message from any one of an email message, an instant message and/or an SMS message.

Figure 17B:
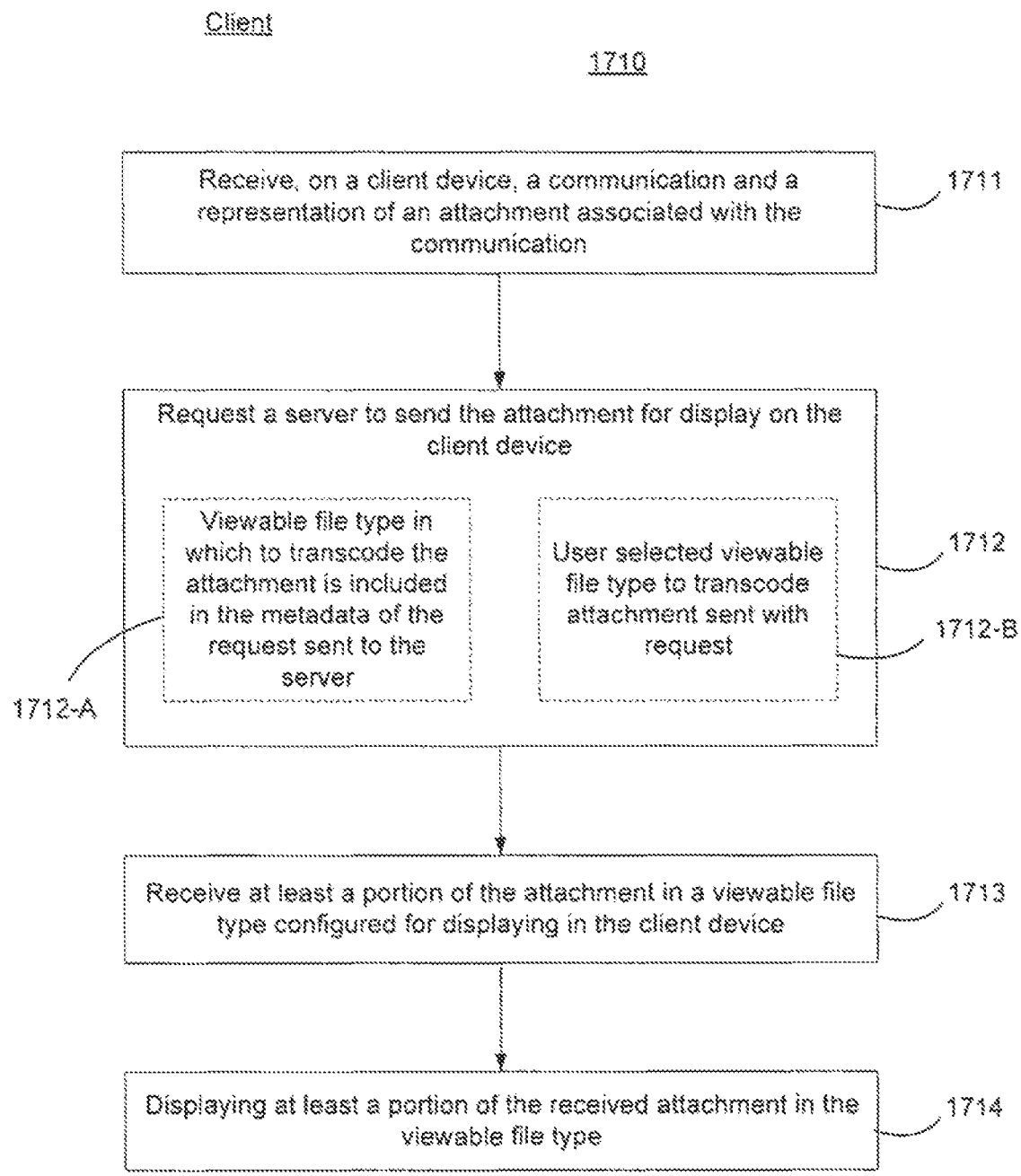
FIG. 17B is a flow diagram illustrating exemplary operations in a client device requesting for an attachment to be transcoded in accordance with some embodiments of the present invention.

FIG. 17B is a flow diagram illustrating exemplary operations in a client device requesting for an attachment to be transcoded in accordance with some embodiments of the present invention. The flow chart 1710 in FIG. 17B describes the transcoding operation in a client device. In some embodiments, a client device receives a communication and a representation of an attachment associated with the communication, as shown in block 1711. The communication may, for example, be an email communication sent from a server that stores a permanent copy of the attachment and the email communication. The communication in other embodiments may include SMS message, instant message etc. After viewing the communication, a user may send a request to the server to transmit the attachment for display on the client device, as shown in block 1712. A viewable file type in which to transcode the attachment may be determined in at least one of two ways. In one option, the viewable file type is included in the metadata of the request sent to the server as shown in block 1712-A; in another option, the viewable file type is selected by a user, and sent with the request, to the server. This option may be sent to the client device in response to a server requesting such information from the user. In another option, the viewable file type is determined by the server and the transcoder translates or rewrites the attachment into one of several predetermined file types known to be supported by most, if not all, mobile devices.

In block 1713, the client device receives a transcoded copy of the attachment in a viewable file type configured for display in the client device. As described earlier, at least a portion of the transcoded attachment is sent. Often, a portion, rather than the entire transcoded attachment is sent to the client device. An attachment may be too large in size and contains more information than a user chooses to view. Additionally, there may be factors such as data transmission costs, latency of transmission, and memory storage availability on the mobile device for storing the transcoded attachment, that discourages sending of the entire file. Furthermore, a client device and server may have an option for the user to request for more portions of the transcoded attachment, up to the entire transcoded attachment for downloading onto the client device. such an option will be available to the user after at least a portion of transcoded attachment downloaded onto the client device is displayed, as shown in block 1714.

While the client device is generally as a mobile device, such as one with a wireless communication interface to receive the communication and the attachment from the server, the client device may also be a computer with a limited computing and storage capacity, like the mobile devices. Moreover, the attachment and the communication may also be received by a wired connection instead of a wireless connection many devices are capable of both wireless and wired communications.

Figure 17C:
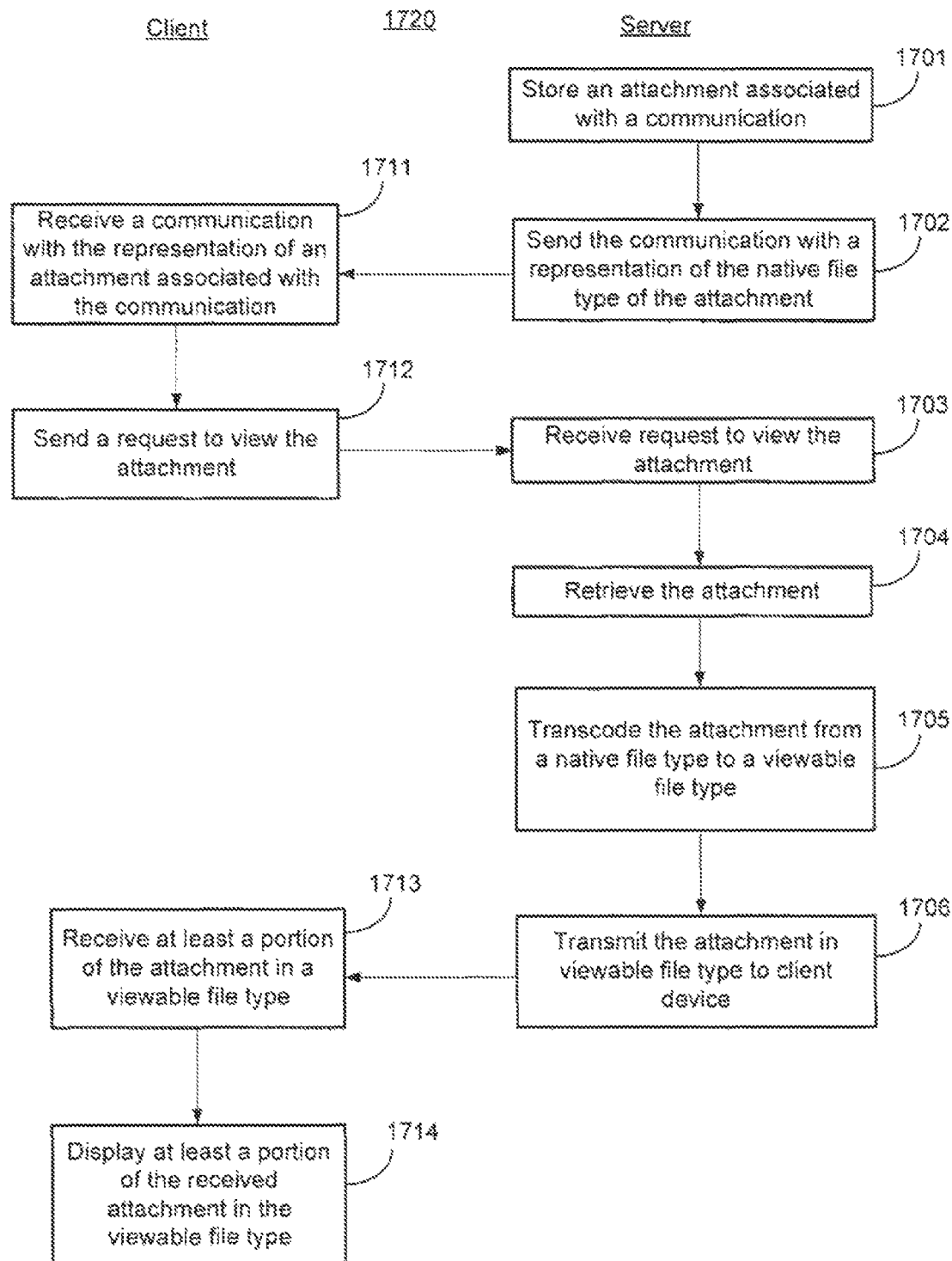
FIG. 17C is a block diagram illustrating exemplary interactions of a server with a client device in carrying out attachment transcoding operations in accordance with some embodiments of the present invention.

FIG. 17C is a block diagram illustrating exemplary interactions of a server with a client device in carrying out attachment transcoding operations in accordance with some embodiments of the present invention. The flow diagram 1720 in FIG. 17C shows the interactions between a server and a client device and is similar to the two block diagrams as illustrated in FIGS. 17A and 17B. In other words, FIG. 17C illustrates similar operations in the server and client device as show in FIGS. 17A and 17B but includes how and where the server and the client interacts with each other in the attachment transcoding operations.

Figure 18A:
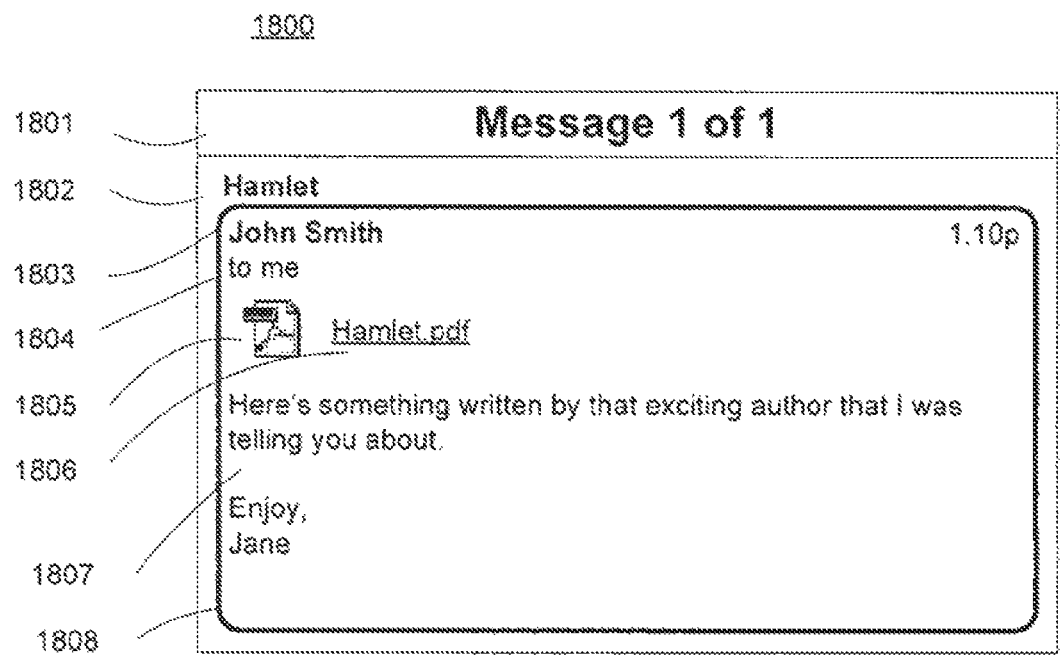
FIG. 18A is a screen shot of an exemplary message with a representation of an attachment and the message in which the attachment is associated in accordance with some embodiments of the present invention.

FIG. 18A is a screen shot of an exemplary message with a representation of an attachment and the message in which the attachment is associated in accordance with some embodiments of the present invention. In this screen shot 1800, an opened communication contains the typical subject 1802, sender 1803, recipient 1804 and header information 1801. In the body of the message containing the text 1807 is also the representation of the attachment 1805 having an icon designating the native file type, and also a file name with an extension 1806 denoting the file type. In this case, the file is a document file such as a PDF file.

Figure 18B:
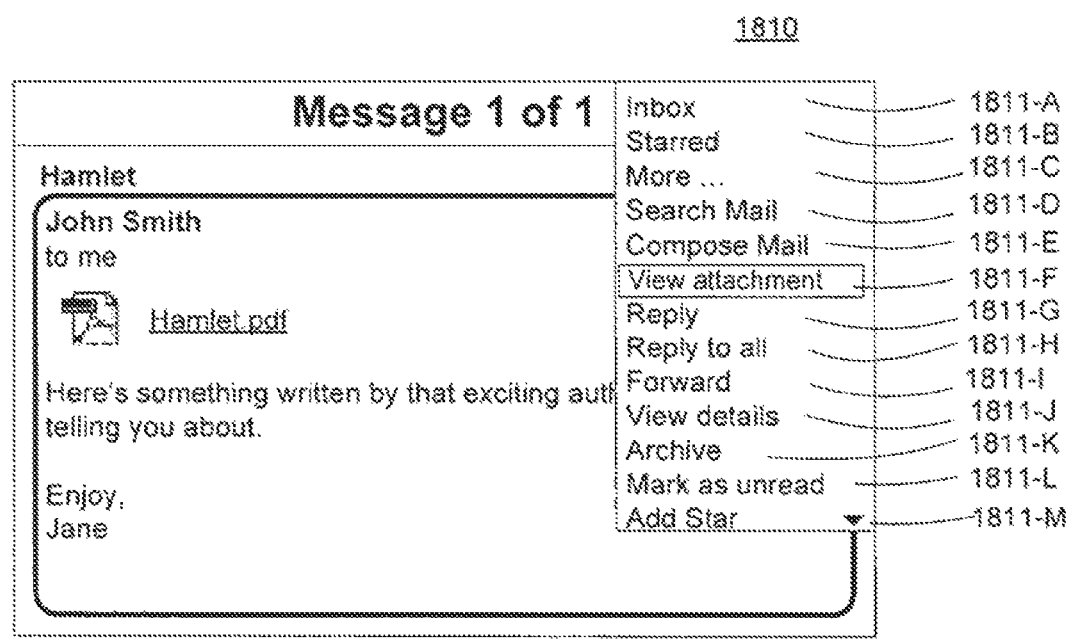
FIG. 18B is a screen shot of using an exemplary pull down menu to activate the attachment transcoding in accordance with some embodiments of the present invention.

FIG. 18B is a screen shot of using an exemplary pull down menu to activate the attachment transcoding action in accordance with some embodiments of the present invention. In the screen shot 1810 as shown in FIG. 18B, as a user decides to view the attachment. The user has an option to select and activate the file directly by using, for example, soft keys to perform the selecting and activating, or a user may open a menu to select an action. The menu as shown should be viewed for purposes of illustration and not restriction. For example, the illustrated menu shows a total of 13 action items, but in other embodiments may show more or fewer or different actions. In this screen shot, the user selects the action to "view attachment" 1811-F, as the action is highlighted, for sending a request to the server to view the attachment.

Figure 18C:
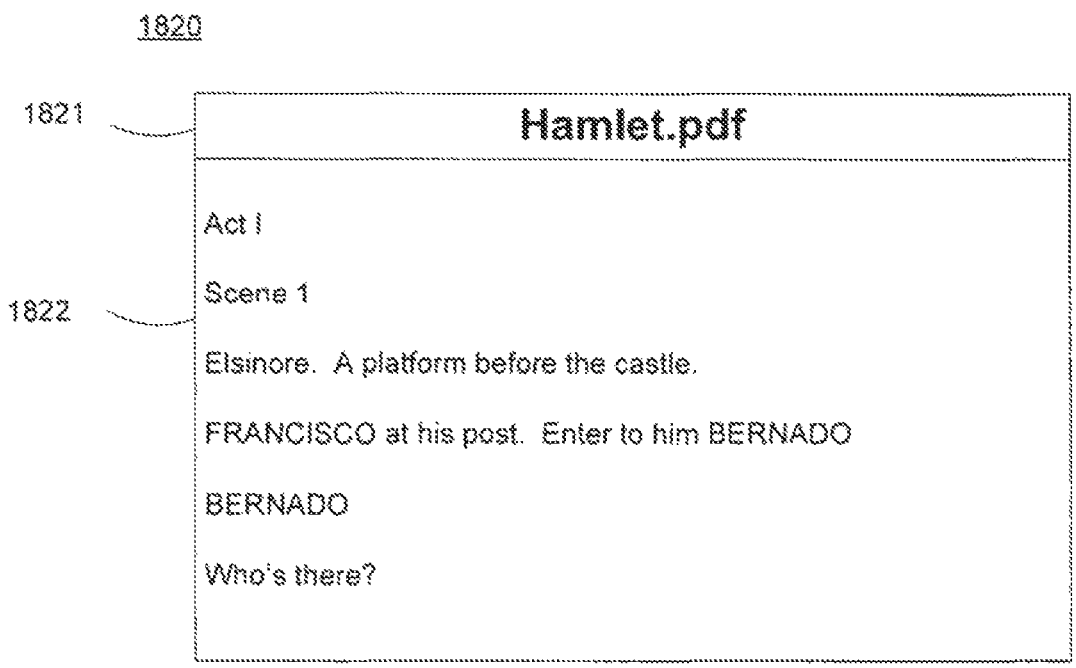
FIG. 18C is a screen shot of an exemplary transcoded attachment in accordance with some embodiments of the present invention.

FIG. 18C is a screen shot of an exemplary transcoded attachment in accordance with some embodiments of the present invention. Upon receiving a request from the client device, the server retrieves the attachment from storage, transcodes the attachment, and sends a portion of the attachment to the client device. The screen shot 1820 in FIG. 18C illustrates the attachment as displayed in the client device. In some embodiments, the transcoded attachment is displayed in a browser of the client device. In a screen shot 1820, the title of the attachment is shown as a header 1821 in the display, and the essential information of interest to the user is displayed in a form of text, as shown in the body 1822. It should be appreciated that while the native file type of the attachment is a PDF file, a document file, the essential information of the attachment will be displayed in a form of text, whether in a text file, WML, or XHTML etc. file format, as long as the file format can be displayed by the client device containing the essential information that can be presented in an organized and viewable form to the user on the client device.

Figure 18D:
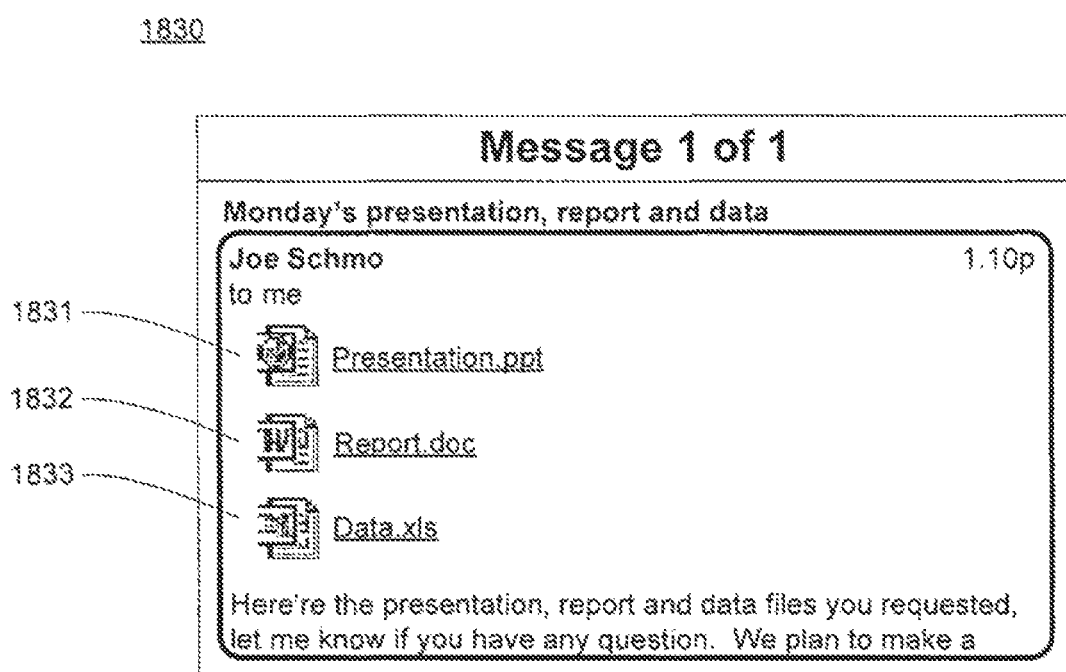
FIG. 18D is a screen shot of an exemplary message with several representations corresponding to several attachments and the message in which the several attachments are associated in accordance with some embodiments of the present invention.

FIG. 18D is a screen shot of an exemplary message with several representations corresponding to different attachments and the message in which the different attachments are associated in accordance with some embodiments of the present invention. The screen shot 1830 of a message in FIG. 18D contains attachments file formats that include a presentation file 1831, a word document file 1832 and an excel datasheet file 1833. While not all the documents can be displayed at once, each document may be viewed individually. A user may select and activate each representation of the respective attachments, one at a time, sending a request to the server to transcode and download each respective attachment onto the client device. It should be appreciated that attachments that are image files can similarly be transcoded into a viewable format b the client device, but it is not shown in this disclosure.

Respond to Email by Call From a Mobile Device

Typing on a mobile device is sometimes difficult, even on a smart phone with a full QWERTY keyboard. The input device on any mobile device is much clumsier than on a regular keyboard. Phones are well suited to voice communication but not for type written text communication. For this reason, when a user of a mobile device uses their phone to read their email, it is conceivable that the user would prefer to respond to the message by a phone call rather than by typing a message using the input device on the mobile device. Phones are capable of making a call with a phone number. The following disclosure will describe a process by which a user can respond to an email by replying to an email message with a phone call using a minimal number of key strokes or button presses. In other words, a user does not have to physically retrieve the sender's phone number or to physically dial in the phone number to make the call. The phone number of the sender of the message is stored on the server, and retrieved to make the phone call.

Figure 27:
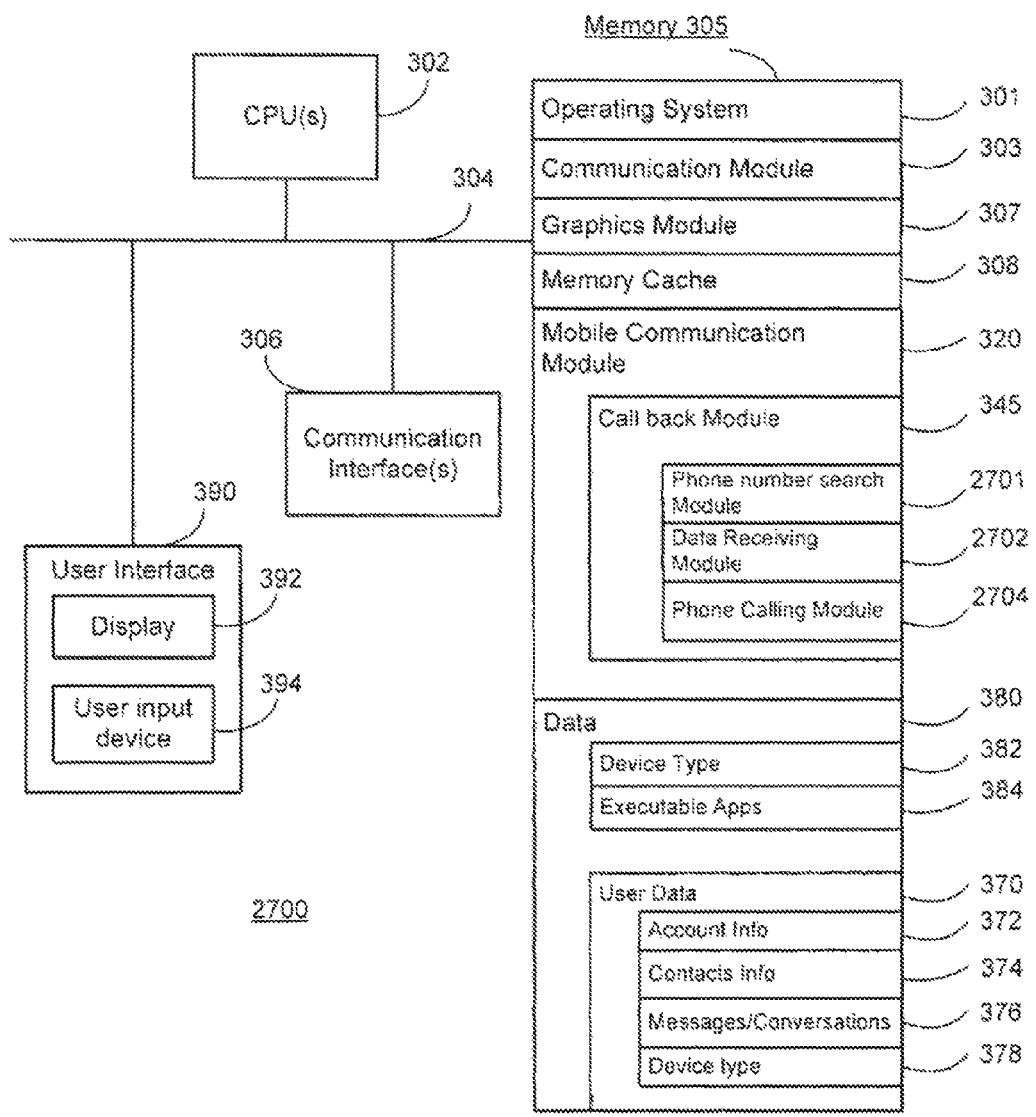
FIG. 27 is a block diagram of an exemplary client device having components for carrying out functions of a call back module in accordance with some embodiments of the present invention.

FIG. 27 is a block diagram of an exemplary client device having components for carrying out functions of a call back module in accordance with some embodiments of the present invention. The client device 2700 in FIG. 27, similar to the client device 300 described in FIG. 3, includes one or more processing units (CPU's) 302, one or more network or other communications interfaces 306, memory 305, and one or more communication buses 304 for interconnecting these components. The client device 2700 also includes a user interface 390 having a 392 and a user input device 3924. Memory 205 similarly includes an operating system 301, a communication module 303, a graphics module 307, memory cache 308, a data module 380 containing information about device type 382, executable applications 384, and user data 370, and a mobile communication module 320.

The mobile communication module 320 may include a call back module 345 that can automatically make a phone call to reply to a message. The call back module further includes at least one of: a phone number search module 2701, data receiving module 2702, and a phone calling module 2704.

The phone number search module 2701 searches for the phone number of the sender of the message in response to a user initiating the call back module 345. For example, if the phone number is contained in the metadata of the message, this module will automatically retrieve the phone number from the metadata that used for making the phone call. However, if the phone number is not contained in the metadata, this module may optionally search another source of contacts information, such as a local phone book on a mobile device, to find a phone number matching the sender to call the sender.

The data receiving module 2702 is responsible for receiving messaging information that may contain metadata or information containing the sender's phone number for the call back module 345 to call the sender of the message.

The phone calling module 2704 uses the phone number found by the phone number search module 2701 to make a phone call to the sender of the message in which the user or recipient wishes to call instead of replying with a message.

Figure 28A:
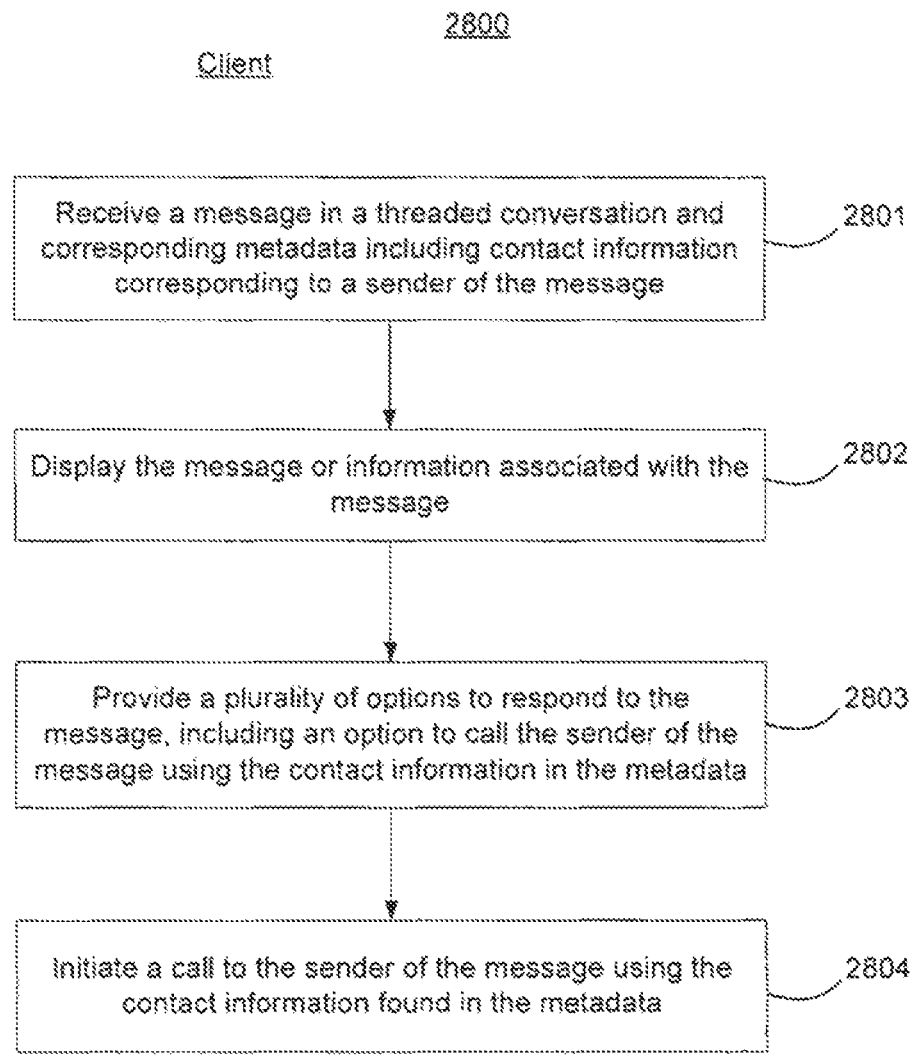
FIG. 28A is a flow diagram illustrating exemplary operations in a client device from receiving a message to initiating a call to sender of the message in accordance with some embodiments of the present invention.

FIG. 28A is a flow diagram illustrating exemplary operations in a client device from receiving a message to initiating a call to sender of the message in accordance with some embodiments of the present invention. The flow chart 2800 describes the call back operation in a client device for some embodiments. A client device receives a message in a threaded communication (e.g., email, instant, messages, and conversations etc.) and the corresponding metadata associated with the threaded communication as shown in block 2801. The corresponding metadata includes contact information belonging to the sender of the message in the threaded communication, such as at least a name and a phone number. After the threaded communication is received, the message and thread or conversation, etc. is displayed on the client device for viewing by the user, as shown in block 2802. Generally the metadata is not displayed, but in some embodiments, the contact information in the metadata associated with the message, may also be optionally displayed. When the message or the information associated with the message is displayed on the screen of the client device, a user has a number of options available to respond to the message. The options include, but are not limited to, replying by composing a message, and calling the sender of the message using the phone number contained in the metadata of the message, as shown in block 2803. The client device can initiate a call to the sender of the message in response to a user action activating the call back option, as shown in block 2804. In some embodiments, this option can be activated by the user when the message is displayed or opened on the screen of the client device. In other embodiments, a user can respond with a phone call even if the message is closed and the content of the message is not in view.

The contact information associated with a sender of a communication, such as a message in a conversation, is stored permanently on the server. In some embodiments, the contact information, including but not limited to, the phone number, email address, or other contacting information of the sender of a message, is stored as part of a complete list of contact information belonging to the user of the client device. The phone number of the sender of a message is part of the metadata embedded in the message and often not viewable by the user. This part of the metadata, the phone number, for example, is used for reply when the call back function is activated. The phone number does not inherently appear as part of the text associated with the message. In some embodiments, this information contained in the metadata can be made optionally available upon request by the user of the client device or it may be made optionally viewable along as part of the message upon request by the user.

In some embodiments, besides replying to the sender of a message by an email or a phone call, a user may also have the option to reply by SMS or another form of electronic communication. The information used for realizing these other forms of reply can also be stored in the metadata of the message when the message is sent to the user. A point of differentiation should be noted. While a user of a mobile device may respond to an SMS message by a reply phone call, this is different from using metadata stored in a message to reply an email by a phone call. In an SMS message, the phone number of the sender of the SMS message is associated with the device from which the SMS is sent. The phone number of the sender is part of the text of the SMS message and it is automatically inserted into the SMS text. A SMS message inherently associates a phone number of the device from which it is sent. Therefore, each SMS message is tied to the device from which the SMS message is sent.

In contrast, the call back feature in responding to an email is different. The phone number sent to a user of a client device is part of the metadata of the message and not in the text of the message itself. Furthermore, the source of the phone number is not associated with the device from which the message is initiated or sent, but rather, the number is retrieved from a server, where the contact information of the sender is permanently stored. Therefore, regardless of whether a user sends the email from a computer or from a mobile phone or from some other device, the source of the phone number of the sender is still the same. The source of the phone number is always the server, where the contact information is stored. The phone number is part of the user's list of contacts and will not be changed unless it is changed by the user. The device from which a sender of a message sends a message has no impact on the phone number in the metadata. Therefore, the call back feature for replying an email as described is tied to how two people are related rather than to where the message originates. Further, since the contact information is linked to the server, it is generally more reliable than, for example, information in a SMS message, where a sender of a message may not be owner of the device from which the message is sent.

In some embodiments, the metadata containing the phone number of a sender of the message is temporarily stored in a memory of the client device. The memory may be a volatile memory or the metadata associated with messages may be updated regularly on a fixed schedule basis.

In some embodiments, the contact information such as the phone number and email address of a sender of a message is stored in a central server as a part of a contact list of a user of the client device. Contact information in the contact list may be added, edited, or deleted by a user via a web-based mechanism.

In other embodiments, when a user tries to view a message on the client device like a mobile phone, the message if it is new or unread, is downloaded onto the client device, including the metadata containing contact information such as a phone number of the sender of the message. In some embodiments, when the message has been read and is neither new nor unread, the client device will send a request to the server for the message. The server responds by transmitting the text of the message and the associated metadata containing the phone number or contact information of the sender to the client device. When the message is displayed on the client device, the user is provided with an option to call the sender. In some embodiments, the option is an item in a menu that allows quick activation for a phone call to be made using information contained in the metadata. In other embodiments, the option is a one step activation of an accelerator key that automatically calls the sender using information contained in the metadata.

Description of accelerator keys is described in detail in another portion of this disclosure. In the context of the call back feature replying to an email, the accelerator key is a single key that carries out at ask that is other wise carried out by a series of key strokes or button entries on an input device. The accelerator key is activated under a context where the accelerator key is recognized within an application. In some embodiments, the accelerator key may be a key or button on an input device of the client device, performing, for example, the call back function in all screens of an application whenever the call back function is allowed. In other embodiments, the accelerator key may be a user configurable key or a "call" key or button in a mobile communication device.

Figure 28B:
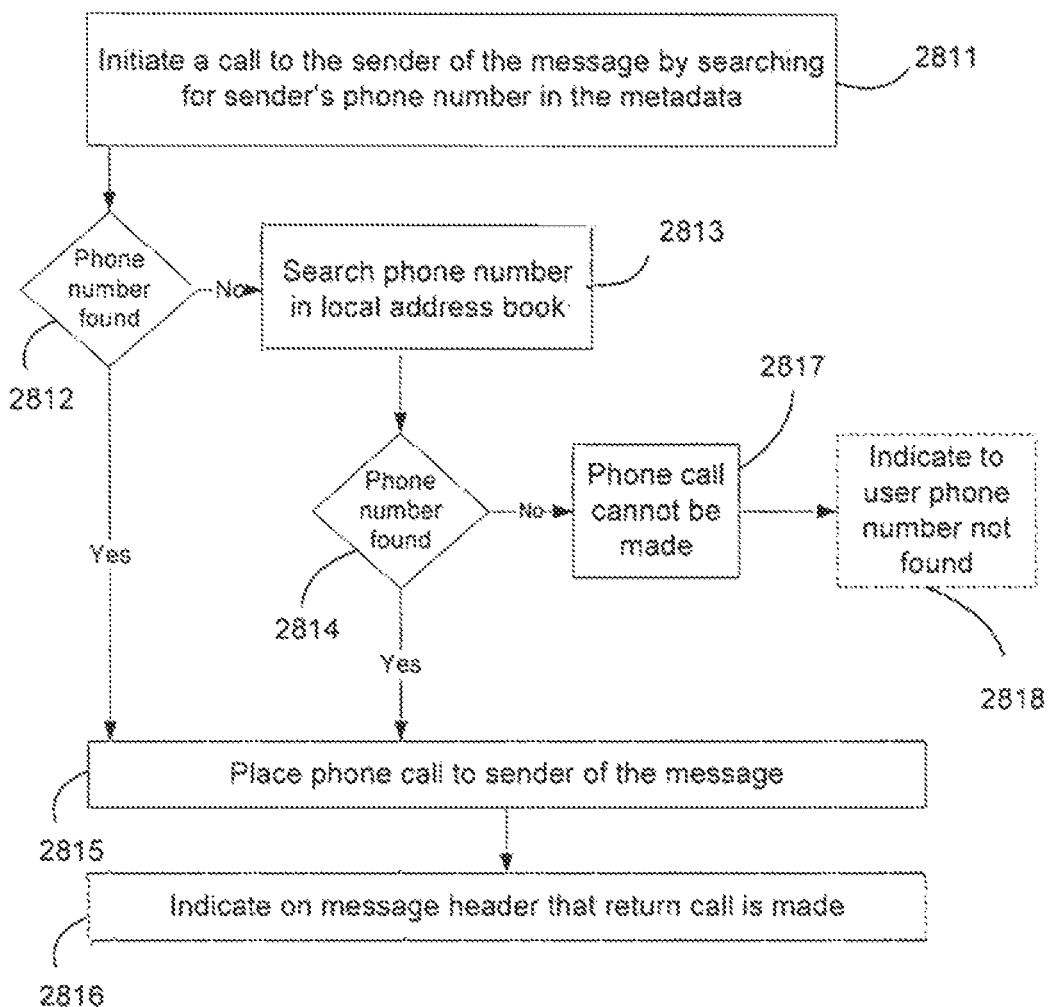
FIG. 28B is a flow diagram illustrating an exemplary decision process for a client device in placing a phone call to sender of a message in accordance with some embodiments of the present invention.

FIG. 28B is a flow diagram illustrating an exemplary decision process for a client device in placing a phone call to the sender of a message in accordance with some embodiments of the present invention. The flow chart 2810 shows an alternate way in which the client device obtains a phone number to complete the call back feature in response to a message, if the phone number of the sender is not found in the metadata of the message. In some embodiments, a user may receive a message from a server and decides to initiate a phone call in response to the email message by a sender, as shown in block 2811. As the call back feature is initiated, the client device will search for the phone number in the metadata of the message to make the phone call, as shown in decision block 2812. If the phone number is found, a phone call is placed to the sender of the message as shown in block 2815. If the phone number is not found, the client device can, optionally, search for a matching contact in a local phone book of the client device, such as a mobile wireless communication device like a cellular phone, as shown in block 2813. If the phone number is still not found, the phone call reply is not possible and will be indicated as such to the user, as shown in blocks 2817, 2818. If a matching contact is found and a corresponding phone number is found, a phone call is placed to the sender as shown in block 2815. In some embodiments, after the phone call is successfully made, there is, optionally, an indication, such as a representation in a header of the received message, that a return call is made to remind a user that the message has been replied to, albeit there is no record, because the response was by phone and not with a textual record such as an email, as shown in block 2816.

In some embodiments, the matching of contact identity of the sender of the message to an entry of the local contact phone book is based on at least a partial entry that matches at least one of: first name, last name, nickname, and email address, if present. While in some embodiments, there may be a default number in a contact to which a contact like a sender of a message is associated. In this instance, this one default number is sent to the client device in the metadata when the message is sent. In other embodiments, there may be more than just one number associated with the sender transmitted in the metadata. For example, if there are multiple phone numbers in the sender's contact entry in the contact list on the server, all the phone numbers are transmitted in the metadata to the client device and the user. The phone numbers are presented as options to the user when the call back feature has been activated to select a number to call the sender. Still in other embodiments, the contact information in the metadata may be a link to a copy of at least a portion of the contact list that is downloaded onto the client device after the email application is initiated by the user. In some embodiments, a copy of the contact list on the server is downloaded in advance onto the client device upon initiation of the email application; the metadata can refer directly to the downloaded copy of the contact list or have a link to the downloaded contact list to obtain a phone number to call the sender.

Figure 30:
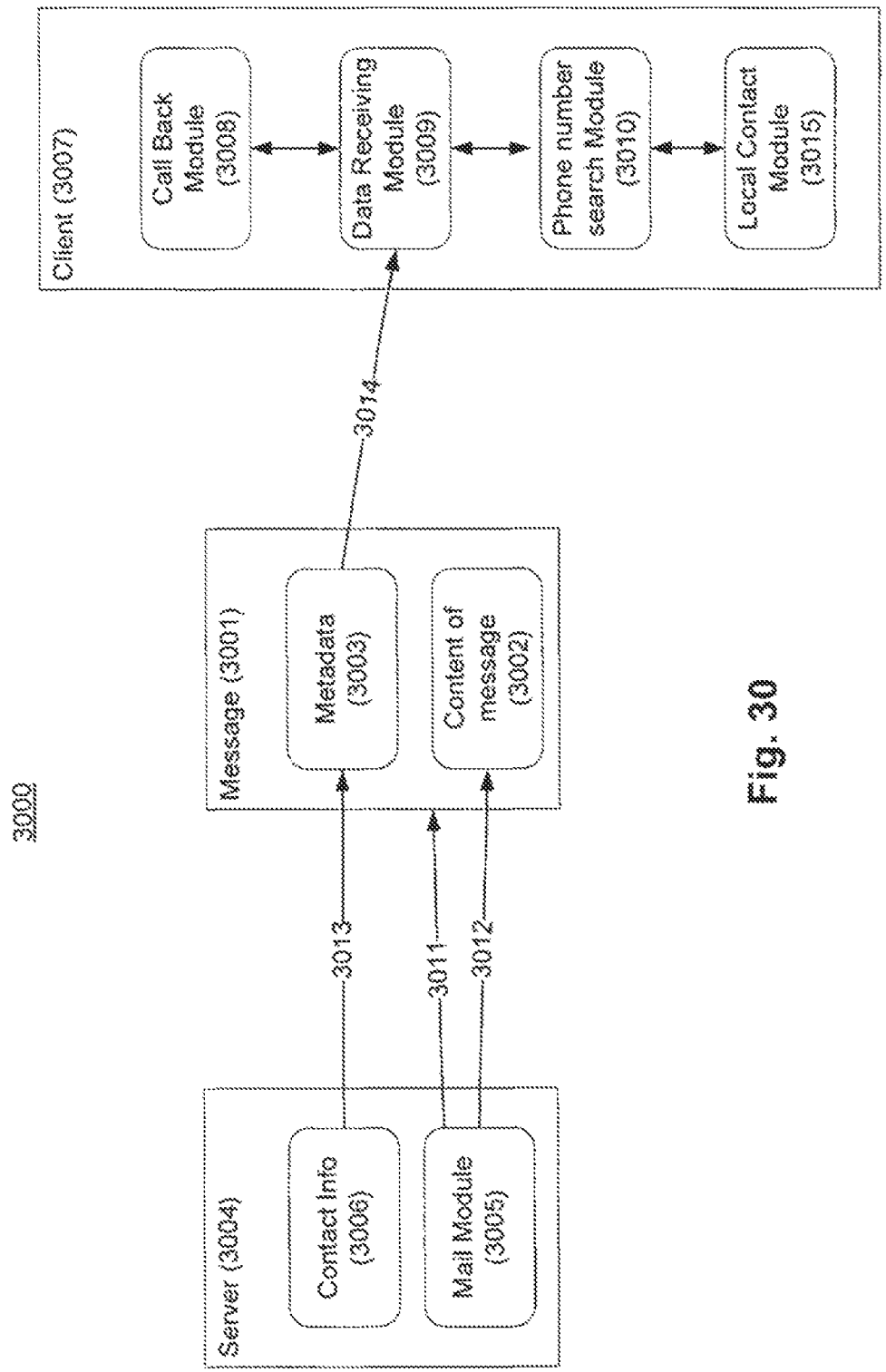
FIG. 30 illustrates how a phone number is retrieved from a server and used by the client device via metadata in the message to reply to a message in accordance with some embodiments of the present invention.

Diagram 3000 in FIG. 30 illustrates how a phone number is retrieved from a server and used by the client device via metadata in the message to reply to a message. In some embodiments of a client based email application where messages are stored on the server, the client device makes a request to view messages. Each message 3001 is sent 3011 from a server to a client device for viewing by the user. Each message 301 contains content of the message 3002 and metadata 3003 of the message which is not viewable by the user. The content of the message 3002 originates 3012 from the mail module 3005 residing on a server that regulates and organizes messages and conversations, while the phone umber used by a call back module 3008 in a client device 3007 is obtained 3013 from the contact information module 3006. This contact information module 3006, residing on the server and store the contacts information for a user of the mail module 3005, may or may not be a part of the mail module 3005. When the message 3001 is received at the client 3007, the data receiving module will retrieve 3014 the phone number from the metadata 3003 when the call back module 3008 is activated to reply to a sender of a message by phone call. If the phone number is not found in the metadata 3003, the data receiving module 3009 will request the phone number search module 3010 to perform a search in the local contact storage module 3015. If a matching number is found, as described before, the number is sent to the call back module 3008 for calling the sender. If a matching number is not found, no call back is made, or a user is prompted to enter a number for the phone call. It should be appreciated that while a message in an email application is used for exemplary purposes, this concept can be similarly applied to other communication applications including, but are not limited to, instant messaging, and news board postings.

Figure 29A:
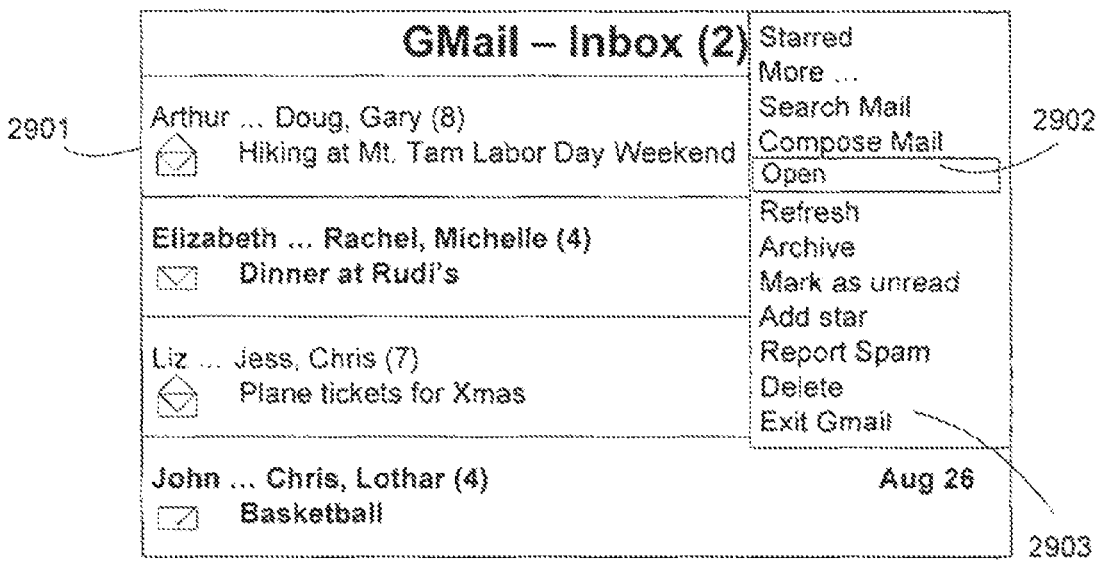
FIG. 29A is a screen shot of an exemplary conversation list view with a pull down menu having an "open" command to open one of the selected messages in the conversation list in accordance with some embodiments of the present invention.

FIG. 29A is a screen shot of an exemplary conversation listing view with a pull down menu having an "open" command to open one of the selected messages in the conversation list in accordance with some embodiments of the present invention. Screen shot 2900 shows a conversation selected in a conversation listing view. A pull down menu 2903 is activated so that an action or command such as "open" 2902 can be selected by a user to view or open the conversation and then further view a message contained within.

Figure 29B:
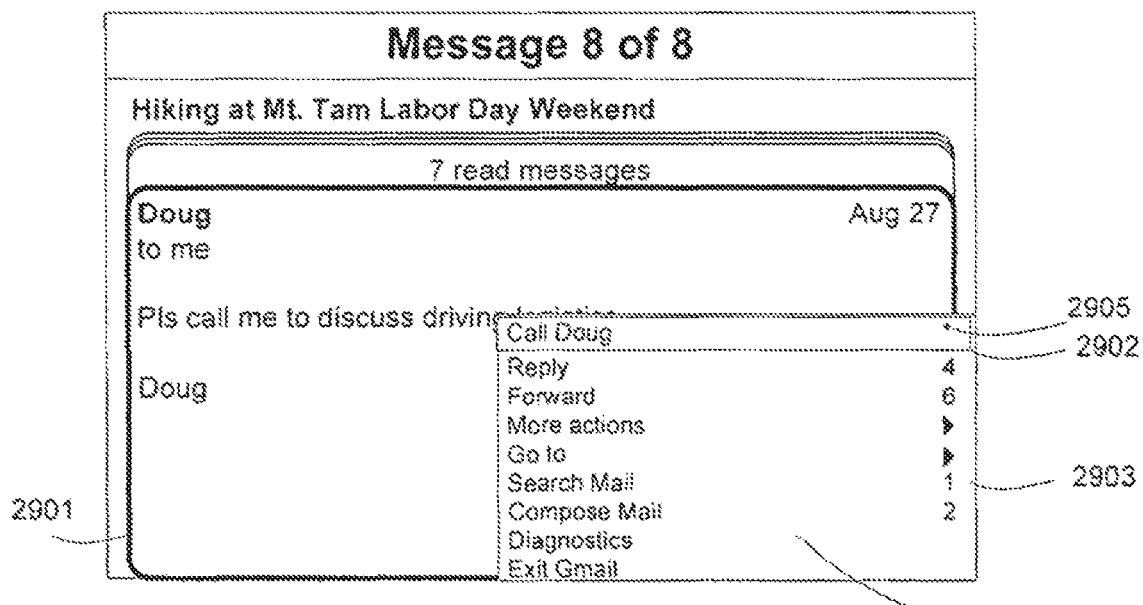
FIG. 29B is a screen shot of an exemplary expanded conversation view displaying a most recent message with a menu having a command to call the sender of the most recent message in accordance with some embodiments of the present invention.

FIG. 29B is a screen shot of an exemplary expanded conversation view displaying a most recent message with a menu having a command to call the sender of the most recent message in accordance with some embodiments of the present invention. Screen shot 2910 shows an opened message 2901 after the list of conversations has been selected. A menu 2904 is activated by the user. The menu contains multiple actions and commands, some even containing accelerator key entries 2903 corresponding to the actions and commands. It should be appreciated that the menu, the commands, and the accelerator keys corresponding to the commands are presented for illustration and should not be viewed in a restrictive sense. In other words, the number and types of commands presented, configurations in which the commands, menu, and acceleration keys can vary. In some embodiments, a first option, the call back feature 2902, is selected and has an accelerator key '*' 2905 associated with the call back feature. When the user activates this feature, a call will be automatically placed to the sender of the message, Doug, in this example. Similarly, the user can also accomplish the call back feature without activating the menu. The user can simply hit the '*' accelerator key in this screen where the call back feature is recognized, and a phone call can be automatically placed to the sender, Doug, of the message. Other accelerator keys can be used for the same function. The object is that a phone call can be used to reply to a sender of a message using a phone number associated with the metadata in the message.

A Card-Based System and Method for Transmitting and Reading Threaded Data to a Mobile Device A common usage pattern for email is that one user sends out a message to one or more recipients, who, in turn, send their own responses. Each of these responses may further result in one or more responses and the process may continue for many iterations. The string of messages or responses associated with one subject collectively forms a thread or conversation. For most email software, a response includes "quoted" text from the previous message, which is essentially a repetition of the text in a previous email. As the number of related messages increases, so grows the amount of quoted text in each subsequent message in the thread or conversation.

The increasing size of each message in a conversation becomes a problem for an email application operating on a mobile device. Large threads and large messages in threads increase costs of data transmission and often increase latency in a user receiving data. Further, as the displays for mobile devices are limited in size, the large amount of information included in each message in a thread or conversation is not conducive to display on the small screen. The following describes a method of transmitting messages from an email thread to a mobile device where transmission is on-demand and contains only text for messages that a user would want to read. The resulting messages that are transmitted will have a small total transmission size. This reduces the processing used on the client device for viewing the message, which is a benefit for mobile devices, especially where both memory and processing capability are constrained.

Associated with this type of message transmission is an intuitive and simple user interface for reading and managing email conversations on mobile devices. Each message of a conversation is displayed in a card independent of other messages to preserve a conversation context. The card based interface allows the messages in the thread to be more manageable. In some embodiments of this card-based user interface, each message in a conversation is displayed and dealt with individually in a card, making it easier for a user to focus on each message in the conversation. This card based system and method of transmitting and reading threaded data is further described below in detail.

Figure 19A:
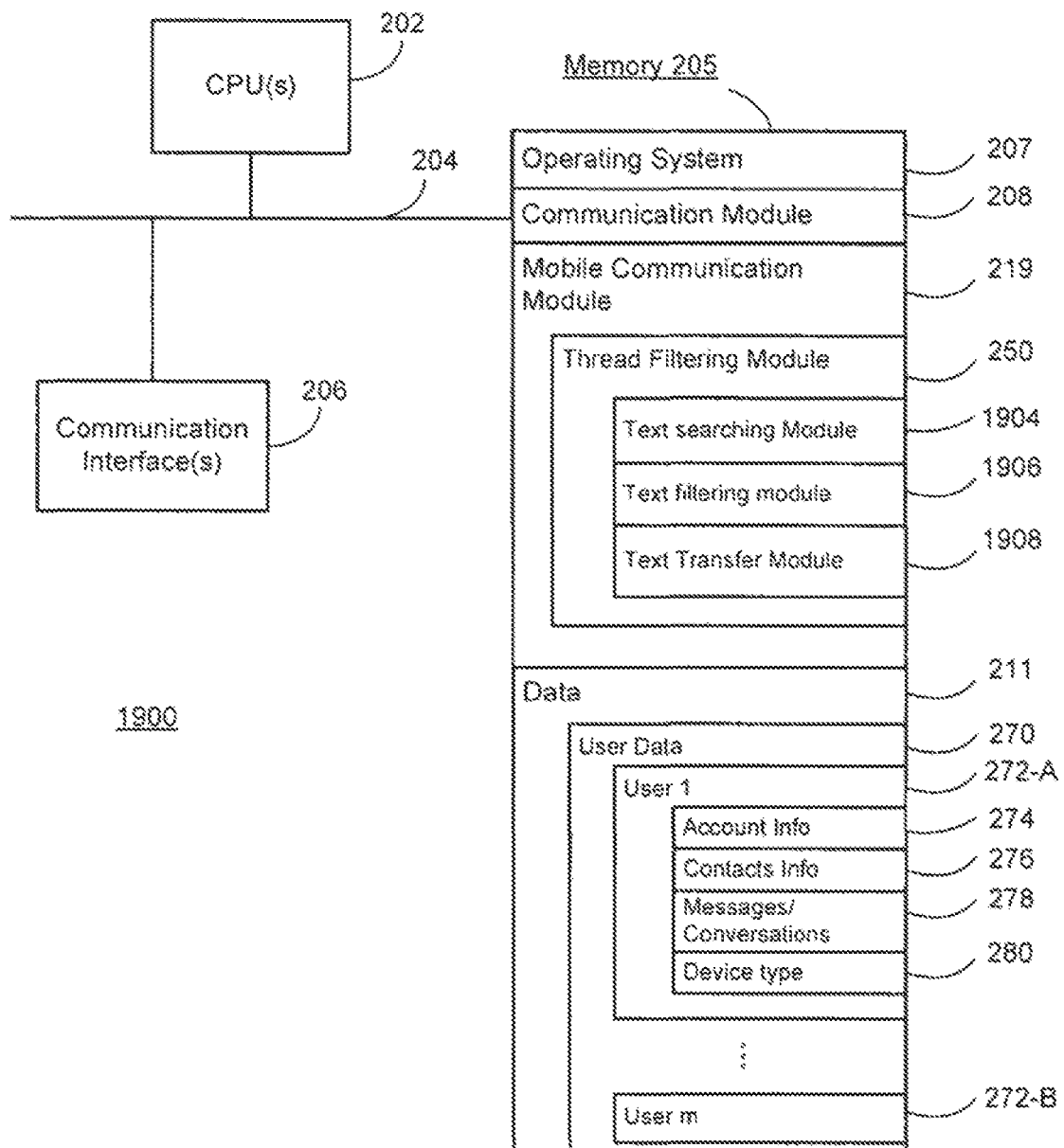
FIG. 19A is a block diagram of an exemplary server having components for carrying out functions of a thread filtering module in accordance with some embodiments of the present invention.

FIG. 19A is a block diagram of an exemplary server having components for carrying out functions of a thread filtering module in accordance with some embodiments of the present invention. In some embodiments, the card-based data transmission and display of threaded data is implemented in a client-driven email application operating in a client device such as a mobile communication device. In other embodiments, the application can be a server driven email application operating on a client device such as a personal computer or a wireless mobile device like a cellular telephone.

The server structure 1900 in FIG. 19A, similar to the server 200 described in FIG. 2, includes one or more processing units (CPU's) 202, one or more network or other communication interfaces 206, memory 205, and one or more communication buses 204 for interconnecting these components. Memory 205, similar to the server 200 described in FIG. 2, also stores programs, modules and data structures, or a subset thereof, includes an operating system 207, a communication module 108, a data module 211 containing similar user data 270 for individual users that may range from user 1 272-A to user m 272-B as previously described in FIG. 2, and a mobile communication module 210.

The mobile communication module 210 may include a thread filtering module 250 for selectively filtering text in messages for transmission from a server to a client device. The thread filtering module 250 may further includes at least one of: a text searching module 1904, a text filtering module 1906, and a text transfer module 1908.

The text searching module 1904 responds to a request from a client device to read one or more messages from an email conversation. All the messages and conversations are stored on the server. This module searches and retrieves the text of a message in a conversation for further processing before a message and the conversation is transmitted onto the client device.

The text filtering module 1906 filters out old text or quoted text in a message. The old text of quoted text is text appearing in older messages in a thread. For each message, this module extracts and saves only the text new to the message while stripping or filtering away all text that also appears in at least one previous message in the conversation.

The text transfer module 1908 transmits the message containing only the new text in a message, without the old text of quoted text, in response to the request, to the client device.

It should be appreciated that consequent to processing at a server, in some embodiments, each message in a thread transmitted to the client device contains only text written by a sender for a respective message, and the old text to which the sender's text is composed in response to is removed. On a client device, each message is displayed independent of each other and contains only the text for the respective message.

Figure 19B:
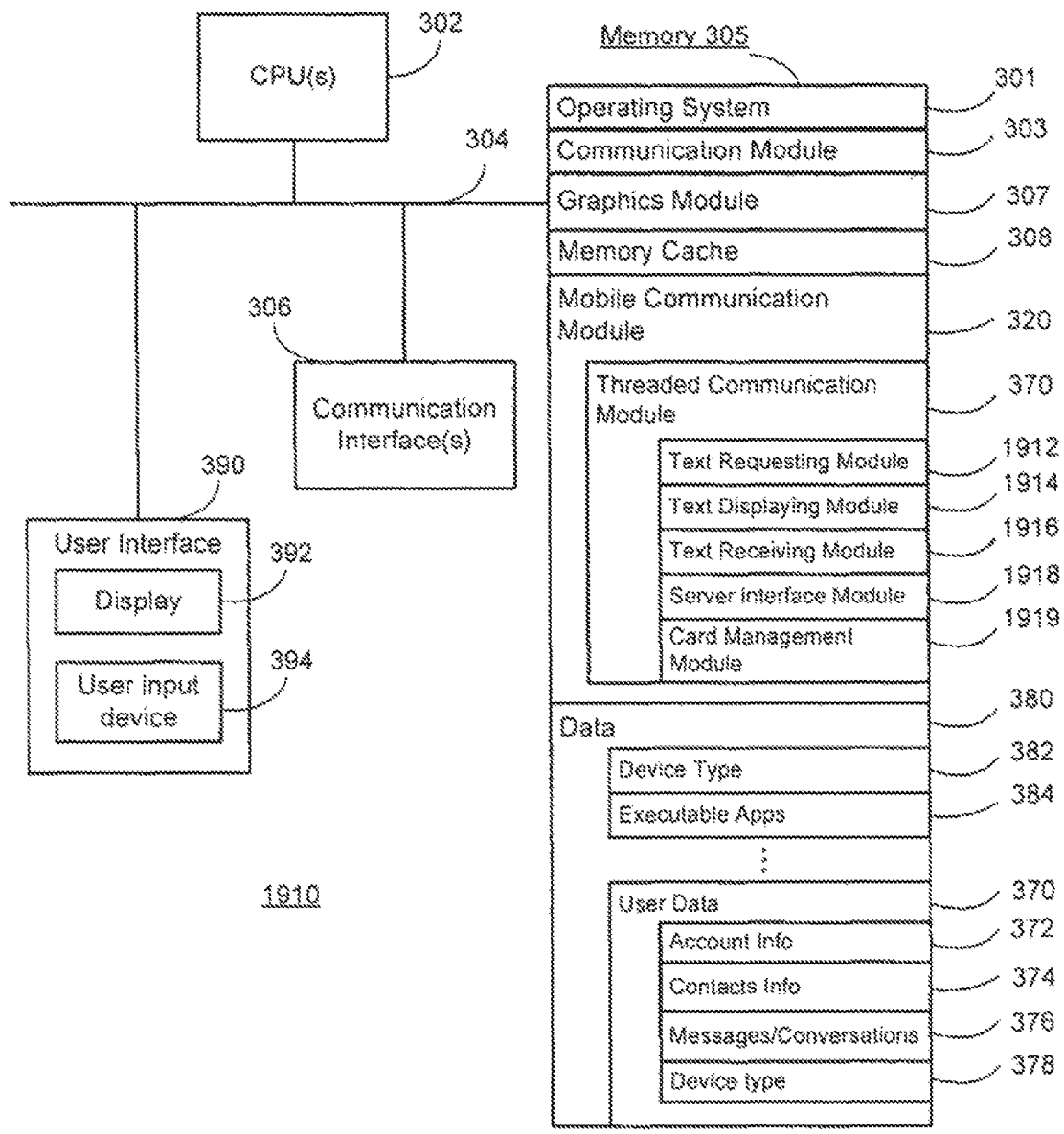
FIG. 19B is a block diagram of an exemplary client device having components for carrying out functions of a threaded communication module in accordance with some embodiments of the present invention.

FIG. 19B is a block diagram of an exemplary client device having components for carrying out functions of a threaded communication module in accordance with some embodiments of the present invention. The client device 1910 in FIG. 19B, similar to the client device 300 described in FIG. 3, includes one or more processing units (CPU's) 302, one or more network or other communications interfaces 306, memory 3065, and one or more communication buses 304 for interconnecting these components. The client device 1910 also includes a user interface 390 having a 392 and a user input device 394. Memory 305 similarly includes an operating system 301, a communication module 303, a graphics module 307, memory cache 308, a data module 380 containing information about device type 382, executable applications 384, and user data 370, and a mobile communication module 320.

The mobile communication module 320 may include a threaded communication module 370, which further includes at least one of a text requesting module 1912, a text displaying module 1914, a text receiving module 1916, a server interface module 1918, and a card management module 1919.

The Text Requesting Module 1912 sends a request to the server for information associated with a conversation that includes at least new text for a message in the conversation.

The text receiving module 1916 receives the data about a conversation from the server. The data about a conversation includes at least new text for a message, and information about other messages in the conversation or thread. The information may include at least one of: the number of messages in the conversation or thread, the sender of each message, and the date each message was sent.

The text displaying module 1914 displays the conversations and messages in the client device. Text belonging to each message is displayed in a card. Information about a number of messages may be collectively displayed in one collapsed card, or, the information can be separately displayed in a number of collapsed cards, each collapsed card containing information about a separate message. A card is expanded when the text associated with a particular message is viewed. Therefore expanded cards contain text of a message, but collapsed cards contain information about the message.

The server interface module 1918 controls the interaction between the client device and the server. The user's commands and inputs on a client device are interpreted by this module. This module interfaces with the server to carry out the commands and requests by the user of the client device.

The card management module 1919 organizes the information to be displayed on the client device. In some embodiments, the card management module separates textural information belonging to each message into cards. In other embodiments, the module decides how to collectively display information about several messages into one collapsed card and how the information about several messages may be separated into individual collapsed cards. This module works closely with at least the text displaying module 1914 to organize and display messages as threaded data on the client device.

Figure 20A:
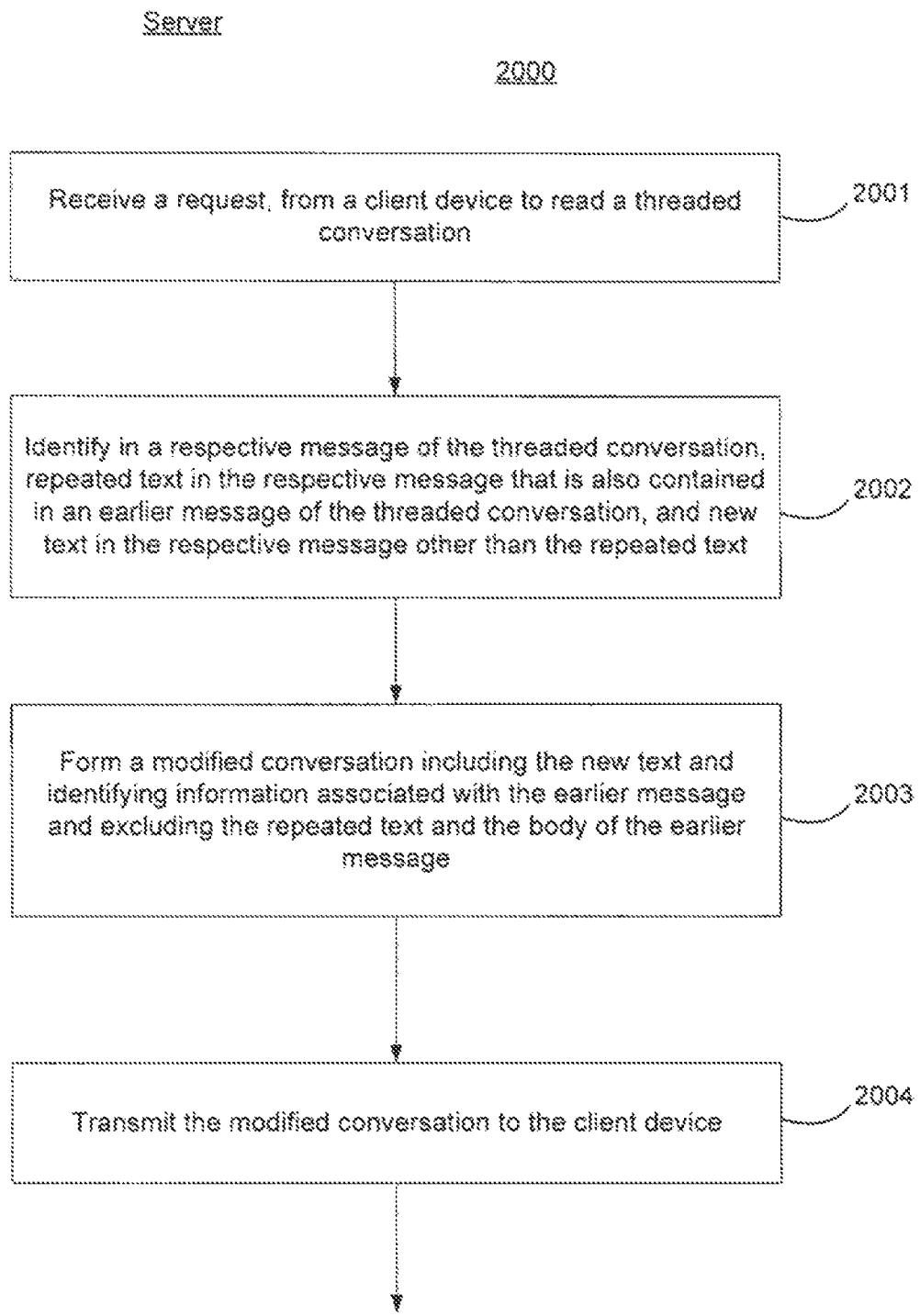
FIG. 20A is a flow diagram illustrating exemplary operations in a server forming a modified conversation in response to a request from a client device to read a threaded conversation in accordance with some embodiments of the present invention.

FIG. 20A is a flow diagram illustrating exemplary operations in a server forming a modified conversation in response to a request from a client device to read a threaded conversation in accordance with some embodiments of the present invention. The flow chart 2000 describes operations of stripping text in a message to form modified conversations in a server. In some embodiments, the server receives a request from a client device to read a threaded conversation, as shown in block 2001. The server responds by identifying, in a respective message of the threaded conversation, repeated text in the respective message that is also contained in an earlier message of the threaded conversation and new text comprising text of the respective message other than the repeated text, as shown in block 2002. Therefore, when a client device requests for a threaded conversation, at least one message including new text will be sent as part of the conversation to the client device from the server. A modified conversation is formed. The modified conversation includes at least the one message with the new text and identifying information associated with the earlier message, excluding the repeated text of the respective message and a body of the earlier message, as shown in block 2003. The modified conversation is then transmitted to the client device for display, as shown in block 2004. An object of forming a modified conversation is to eliminate duplication of text in a message. Further, modified conversations, containing unique parts or text specific to messages, minimize the amount of information displayed on screen and the amount of information downloaded onto the mobile device. Overall, an application that displays modified conversations helps to improve user experience by increasing a response of the application and by reducing data usage.

The flow chart illustrates a method where, when a user sends a request to view a threaded conversation, the server sends a modified conversation containing at least one opened message containing only new text in the message, extracts repeated text appearing in that message and the body of an earlier message in that message, and provides identifying information for the earlier messages in the conversation. The identifying information may include at least one of: a sender of a message, the date on which the message was sent, the number of earlier messages or read messages, etc. In essence, the server treats the repeated text and body of any earlier message in a particular message as extraneous text, and strips them away before transmitting the particular message to the client device. The stripped away text in earlier messages are not transmitted, but in some embodiments, information about the earlier messages is included as part of the modified conversation. The information about the earlier messages can be displayed as message headers associated with the conversation. The message headers can provide different types of information in different embodiments. One use of the message headers is to provide basic information about the earlier messages and to allow the earlier messages to be recovered from the server, if desired by a user of the client device. In other embodiments, the message headers can include information that is a collective representation of one or more of the earlier included messages.

The modified conversation is often transmitted wirelessly from the server to the client device. In some embodiments, the client device is a mobile device configured with a wireless communication interface. The communication network may be a cellular network, a WiFi network, or any wireless network. In other embodiments, the client device can also receive the modified conversations from the server through a wired connection, including but not limited to, a LAN, an ethernet connection, and a broadband connection etc.

As described earlier, modified conversations are simply stripped down versions of threads or conversations stored permanently on the server. Each of the threads or conversations contains messages, and each message contains a body of text including both new text in a respective message, and old text from one or more earlier messages. In the modified conversation, generally, a most recently received message and/or an unread message in the threaded conversation is transmitted to the client device. The new text in the message is therefore text composed by sender of the message in the most recently received message, or unread text in an unread message. In some embodiments, the new text excludes a signature of the sender of the respective message. The extraneous text is repeated text, appearing in one or more earlier messages in the most recent message, or in the unread message, and is removed before transmission. In some embodiments, the extraneous or repeated text includes text from a plurality of earlier messages. Furthermore, in some embodiments, the modified conversation includes identifying information for each of the plurality of earlier messages. Therefore, not only are the earlier messages, collectively represented, information for each of the plurality of earlier messages is also included in the modified conversation. In some embodiments, information for each of the plurality of earlier messages, as alluded to earlier, includes but are not limited to, sender of the respective message, date when the respective message is sent, time when the respective message is sent, other recipients of the respective message etc.

When a modified conversation is viewed on the client device, the most recent and/or unread message(s) including text are represented as cards. Each card has a frame to clearly distinguish a boundary of the text body in each message and separating the text of the message from other information on the screen. A unified header in the modified conversation is displayed including identifying information for at least a portion of the other messages in the threaded conversation, except the respective message. In some embodiments, there is one most recent message opened and a unified header including identifying information for all messages. In other embodiments, there is a most recent message opened and another earlier unread message open. In some embodiments, information about messages earlier than the unread message are represented by a unified header at a location indicating their precedence before the unread message, while information about messages received in the threaded conversation between the unread message and the most recent message are represented by another unified header at a location indicating their temporal reception position between the unread message and the most recent message. Each unified header in a modified conversation includes identifying information for messages in the threaded conversation except the message(s) being displayed. In some embodiments, earlier messages whose text has been stripped out of the conversation can also be represented by individual cards at a location indicating their temporal reception position.

A user can expand a unified header including identifying information for a collection of messages in the threaded conversation by selecting and expanding the unified header in the threaded conversation. In some embodiments, the unified header in the modified conversation may appear as collapsed card. A result of expanding the unified header is having a series of headers or collapsed cards, each header or collapsed cards representing one of the earlier messages in the threaded conversation. Displayed in each of these collapsed cards is identifying information associated with the respective earlier message.

Figure 20B:
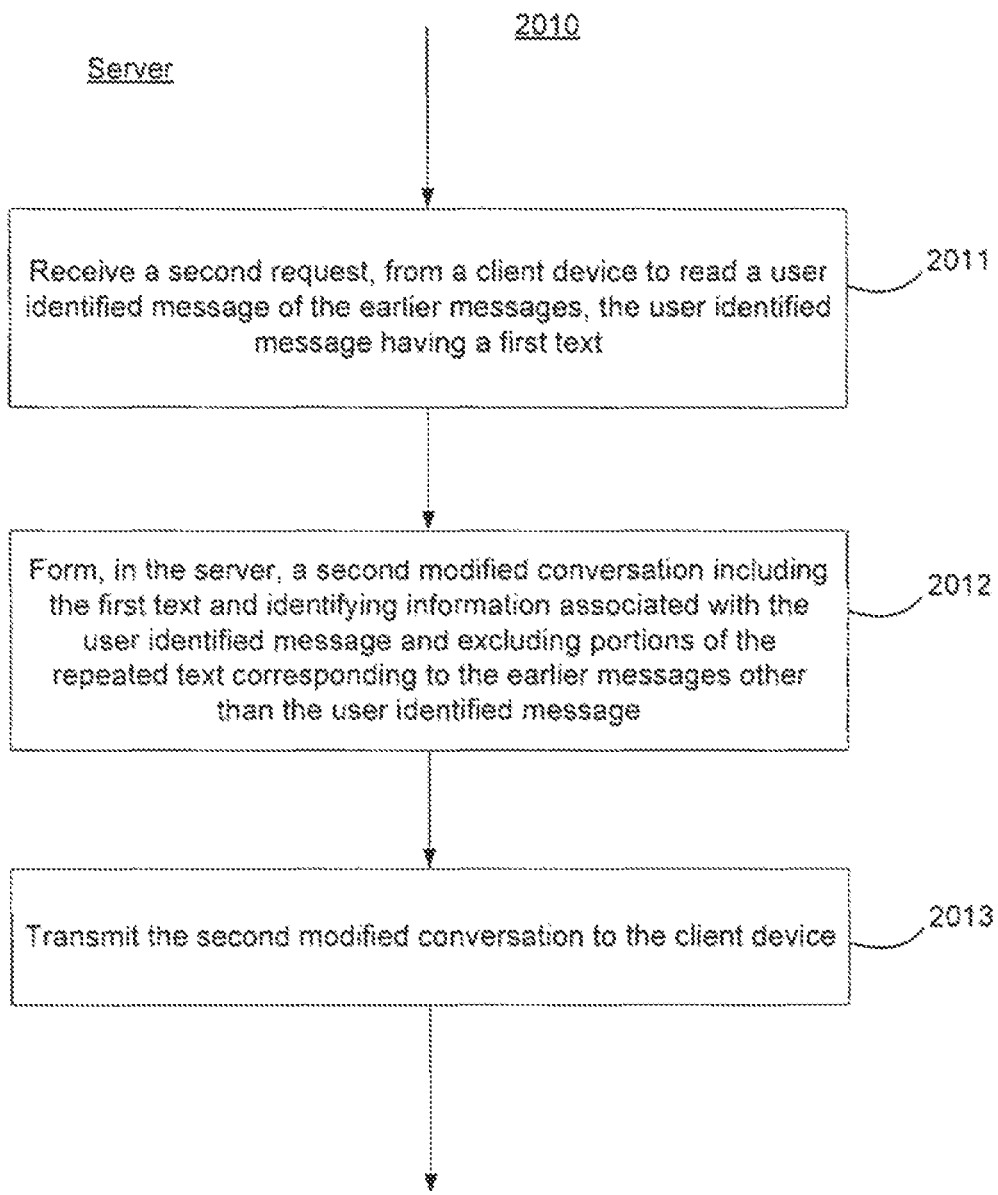
FIG. 20B is a flow diagram illustrating exemplary operations in a server forming a modified conversation containing a portion of text in a particular message in a conversation in response to a request from a client device to read a particular earlier message in the threaded conversation in accordance with some embodiments of the present invention.

FIG. 20B is a flow diagram illustrating exemplary operations of a server associated with forming a modified conversation containing a portion of text in a particular message in a conversation in response to a request from a client device to read a particular earlier message in the threaded conversation in accordance with some embodiments of the present invention. Flow chart 2010 may be seen as an extension or continuation of flow chart 2000 in FIG. 20A. Flow chart 2010 illustrates operations of a server retrieving text to form another modified conversation in response to a user's request to view an earlier message. In some embodiments, the server receives a second request from the client device to read a user identified message that is one of the earlier messages, as shown in block 2011. This second request may be triggered by a user command, at the client device, to expand the user identified message. For example, a user's request can be initiated as the result of a user selecting one of the collapsed cards corresponding to a respective message and expanding the collapsed card. The user identified message represented by a collapsed card corresponds to an earlier message whose text was not sent to the client device as part of a more recent message. In response to such a request, the server retrieves the text of this earlier message, and performs a similar task of stripping away old text, extraneous text, or repeated text in the earlier message. The server forms a second modified conversation, including the particular new text or non-extraneous text and identifying information associated with the user identified message, and excluding portions of the repeated text corresponding to the earlier messages other than the user identified message, as shown in block 2012. The server then transmits the second modified conversation to the client device, as shown in block 2013. In other embodiments, the server retrieves the user identified message, strips away the extraneous and repeated text appearing in earlier messages other than the user identified message, and send only the new text and identifying information of the user identified message to the client device.

It should be appreciated that the card based threaded data transmission where extraneous or repeated text are stripped away before a message is transmitted is different from web-based email systems like Gmail™ where the repeated text and quoted text from previous messages are in fact included in a new message. However, since the repeated text or quoted text from previous messages is collapsed, the user does not have to read through this information unless he or she chooses to. While this is a convenience feature for the user, the quoted text is still sent to the browser. The web-version of Gmail™ thus allows a message to make all the text immediately available to the user if the user chooses to expand the text, which is preferable when data transmission is essentially free with a broadband connection. However, the same cannot be implemented in mobile devices because data transmission is expensive and storage is limited.

Figure 21A:
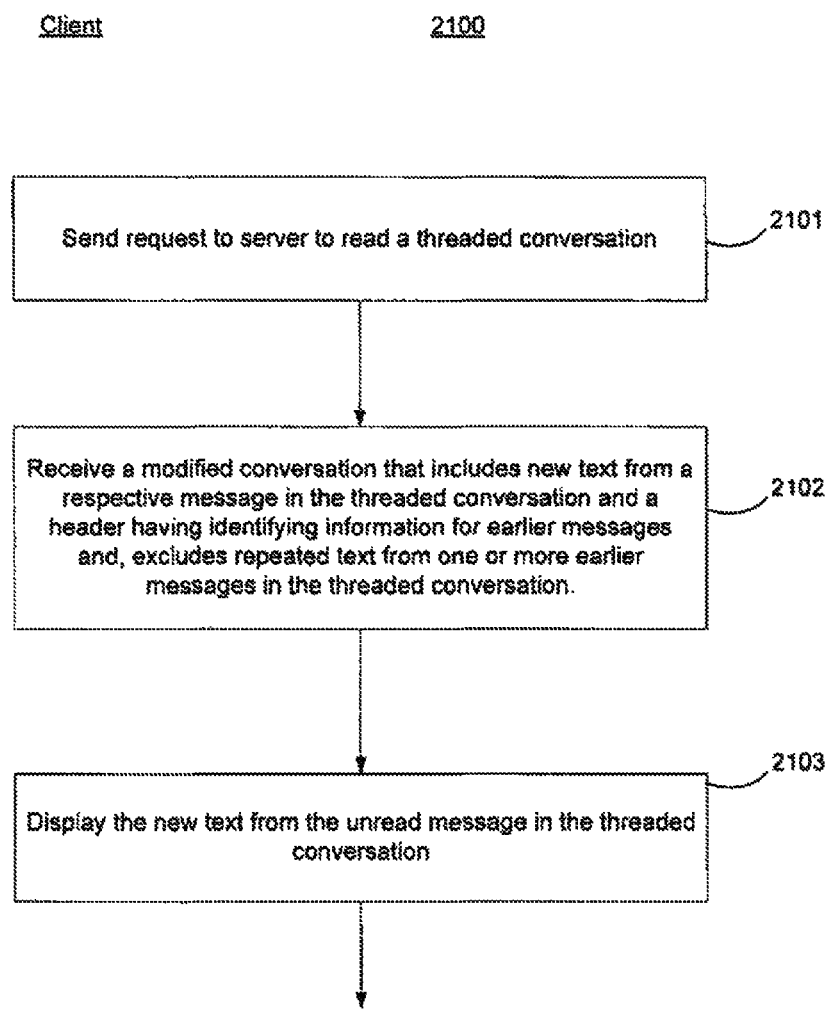
FIG. 21A is a flow diagram illustrating exemplary operations in a client device receiving and displaying next text from an unread message after making a request to a server in accordance to some embodiments of the present invention.

FIG. 21A is a low diagram illustrating exemplary operations in a client device receiving and displaying next text from an unread message after making a request to a server in accordance to some embodiments of the present invention. The flow chart 2100 describes dome embodiments of a method by which a client device displays threaded data. In some embodiments, the client device sends a request to the server to read a threaded conversation, as shown in block 2101. In response to the request, the server transmits a modified conversation to the client device either through a wireless communication interface or a wired communication interface. In block 2102, the client device receives the modified conversation having new text from a respective message in the threaded conversation. The respective message excludes repeated text from one or more earlier messages. The threaded conversation includes a header containing identifying information for the one or more earlier messages, and excludes the repeated text associated with each of the one or more earlier messages. In block 2103, the client device displays the modified conversation that includes new text of the respective message and the header containing identifying information for the one or more earlier messages, but excludes the repeated text from the one or more earlier messages in the respective message and in each of the one or more earlier messages. In some embodiments, the one or more earlier messages are messages that appear earlier in the threaded conversation than the respective message.

As described earlier, the modified conversation is displayed on the client device as a unified header represented by a collapsed card containing information about collective earlier messages in the conversation and an expanded card containing the text of the respective message. The unified header represented by a collapsed card includes identifying information for all messages except the respective message in the threaded conversation. In other embodiments, there may be more than one message displayed. Each of the messages displayed is either an unread message or a most recently received message. Each of the messages displayed contain only the text pertaining to that message and does not contain repeated text in one or earlier messages in the threaded conversation earlier than that message.

Figure 21B:
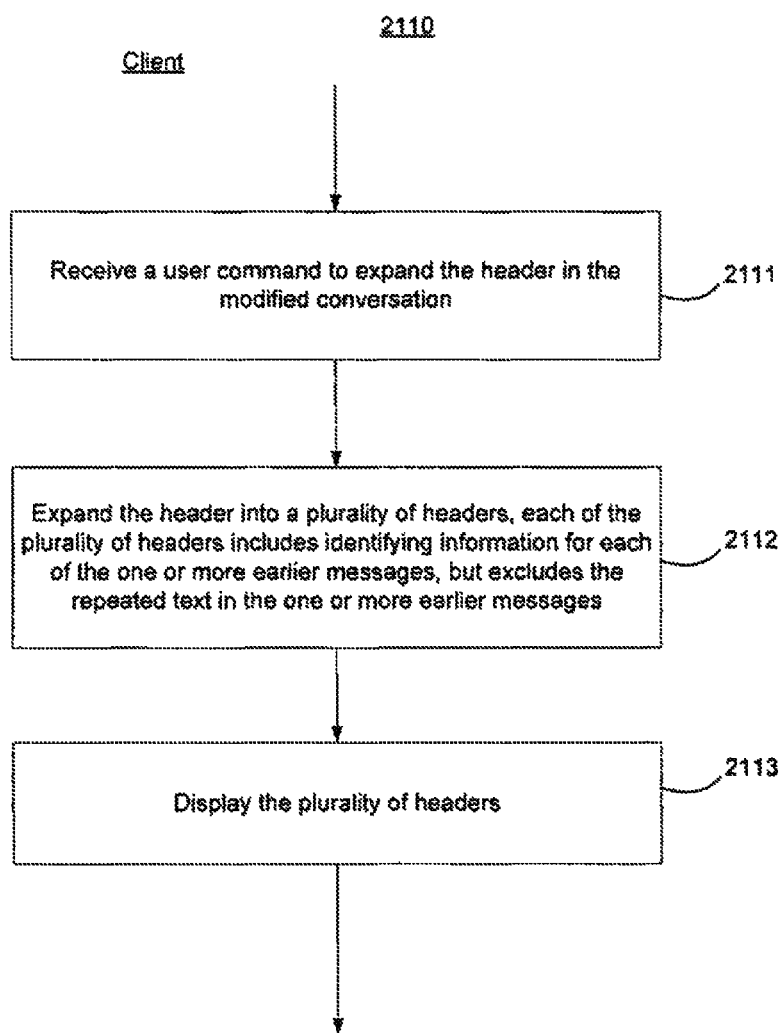
FIG. 21B is a flow diagram illustrating exemplary operations in a client device expanding a header of a modified conversation into a plurality of headers in accordance with some embodiments of the present invention.

FIG. 21B is a flow diagram illustrating exemplary operations in a client device expanding a header of a modified conversation into a plurality of headers in accordance with some embodiments of the present invention. The flow chart 2110 describes the expansion of the unified header in the threaded conversation. In some embodiments, the client device receives a user command to expand the unified header in the modified conversation, as shown in block 2111. The unified header or collapsed card expands into a plurality of headers or a number of collapsed cards, each of the plurality of headers or the number of collapsed cards representing one of the one or earlier messages. Each of the plurality of headers includes identifying information for each of the respective one or earlier messages and excludes the repeated text from the respective one or more earlier messages in the threaded conversation, as shown in block 2112. The client device displays the plurality of headers, each showing the identifying information for a corresponding message, excluding any text associated with that message, as shown in block 2113. Each of the plurality of headers, representing a previously read message, is a collapsed card. Each of the collapsed cards can be expanded, and the text contained in the message corresponding to the collapsed card can be retrieved from the server and displayed on the client device.

Figure 21C:
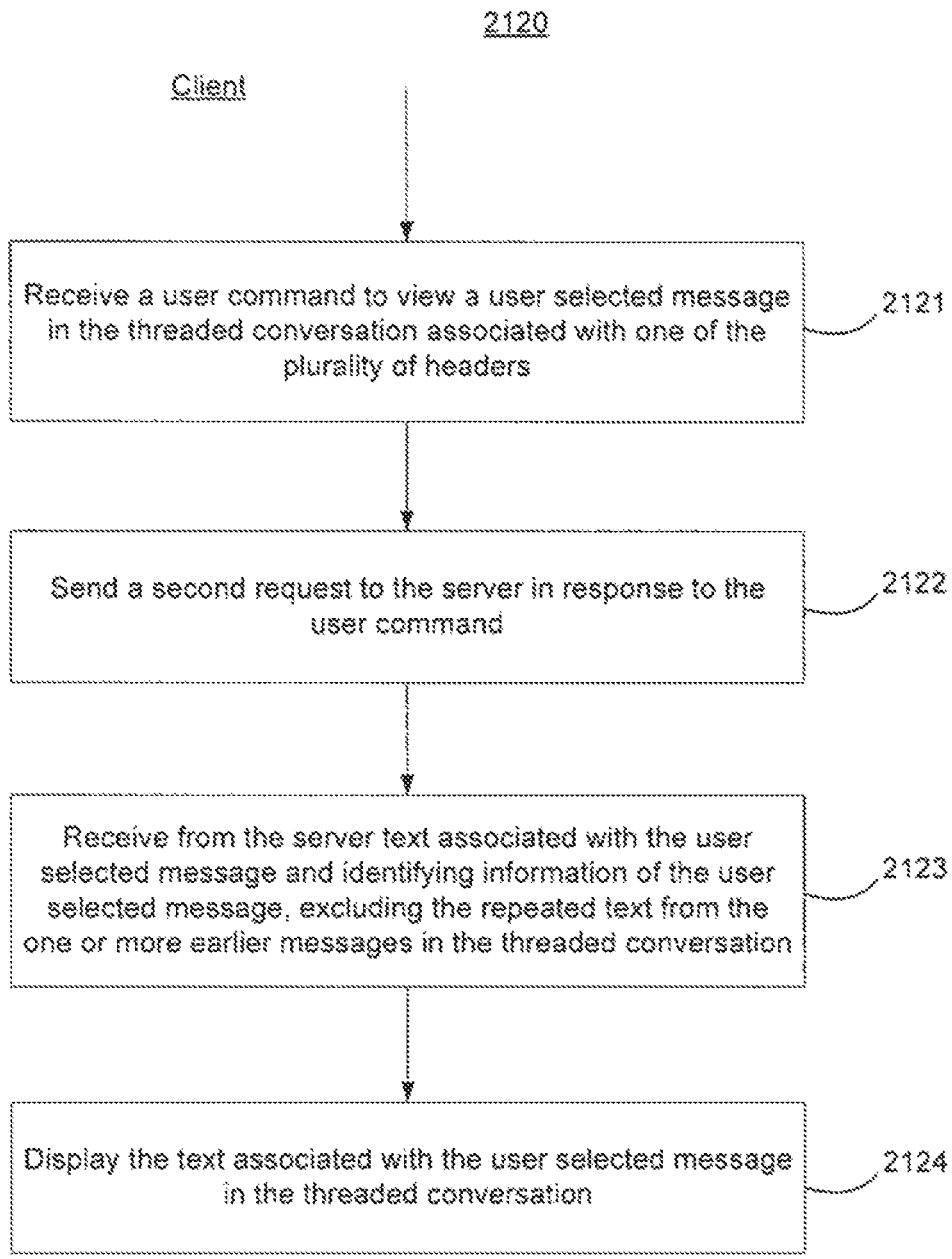
FIG. 21C is a flow diagram illustrating exemplary operations in a client device displaying text associated with a user selected message in accordance to some embodiments of the present invention.

FIG. 21C is a flow diagram illustrating exemplary operations in a client device associated with a method for displaying text associated with a user selected message in accordance with some embodiments of the present invention. The flow diagram 2120 describes one method of displaying of a selected message from a collapsed card in a threaded conversation. In some embodiments, the client device receives a user command to view a user selected message in the threaded conversation associated with one of the plurality of headers, as shown in block 2121. The client device then sends a second request to the server in response to the user command for the text associated with the selected message, as shown in block 2122. The client receives from the server text associated with the user selected message and identifying information of the user selected message. The client device then receives from the server text associated with the user selected message, excluding the repeated text from the one or more earlier messages in the threaded conversation, as shown in block 2123. The server retrieves all text associated with the user selected message after receiving the request, and then strips away all the extraneous or repeated text that appears in one or more messages, earlier than the user selected message, in the threaded conversation. The remaining text, which is the text particular to the user selected message, and the identifying information of that message is then transmitted to the client device. After receiving the text of the user selected message, the client device displays the text associated with the user selected message in an expanded card in the threaded conversation, as shown in block 2124. Thus, viewing of earlier messages is transmitted on demand from the server, as oppose to the text in the most recent message or unread messages that may be transmitted automatically to the client device when the server receives a request to a view a threaded conversation.

In some embodiments of a user interface for displaying the cards, an expanded card has a frame that surrounds the text of the user selected message and distinguishes the content of the message from other information displayed on the screen. The expanded card remains in the same positional order as the collapsed card before it is expanded. Other messages not expanded in the threaded conversation will remain in collapsed cards. The modified conversation is temporarily stored in the memory of the device. In some embodiments, storage of messages and conversations will have a priority scheme and more important messages and conversations may be stored in non-volatile memory for quicker recall on the mobile device. In some embodiments, the priority scheme can have a variety of approaches that can include, but are not limited to, least recently used messages and/or conversations, messages and/or conversations that are FIFO (first in first out), and messages/conversations which best fit/worst-fit one or more predetermined factors, etc. In some embodiments, the features of this card based method for transmitting data is part of an email application adapted for operation in mobile communication devices including, but not limited to, a cellular telephone.

FIG. 22A is a screen shot of an exemplary conversation listing view in a client device in accordance to some embodiments of the present invention. FIG. 22A shows a screen shot 2200 of an exemplary inbox of an email application adapted for operating in a mobile communication device. In some embodiments, the inbox has a header 2201 indicating it is an inbox, and any number of unread messages in the inbox. Listed in the inbox are various threads of conversations (2202, 2203, 2204, 2205). For example, in the illustrated embodiment, a threaded conversation where all messages have been read (2202, 2204) by the user of the mobile communication device has text with normal sized line widths and an icon of an opened envelope associated with each of these read threaded conversations. A threaded conversation containing at least one unread message (2203, 2205) has text with thicker line widths and an icon of a closed envelope associated with each of the conversation. In this conversation listing in the inbox, associated with each conversation is a number of total messages contained in a respective conversation.

For a user to view a conversation, the user selects one of the conversations in the conversation listing view and expands the selected conversation. For example, when a user selects a conversation with all read messages 2203, the listing of that conversation is highlighted and a user can expand that conversation to view the messages forming the thread.

FIG. 22B is a screen shot of an exemplary view of a modified conversation in a client device received from a server in accordance to some embodiments of the present invention. FIG. 22B shows a screen shot 2210 of a modified conversation transmitted from the server after the server received a request from the client device to view the selected conversation as shown in FIG. 22A. As described earlier, the modified conversation has an expanded card 2214 and a unified header 2213 representing a series of collapsed cards. Inside the expanded card is the original text composed by the sender (Liz) 2216 of the message 2217, while information 2218, such as the number of earlier messages that has been read, is shown in the unified header 2213 representing a series of collapsed cards. Further, the subject 2212 of the conversation is shown above the unified header 2213 representing the series of collapsed cards and the expanded card on the screen. The main header 2211 of the screen indicates to the reader the order of the selected message in the thread. In this example, the most recent message listed in the expanded card 2214 is selected, and it is the seventh (7) message of the seven (7) messages in the thread, so the header displays "Message 7 of 7". It should also be appreciated that in some embodiments the border frame 2215 of the expanded card is highlighted or bolded to clearly separate the content or message body from other information on the screen. In other embodiments, the border frame 2215 is displayed in a different manner (with a distinctive color or shape, for example) to distinguish the content or message body from other displayed information.

FIG. 22C is a screen shot of an exemplary pull down menu in a client device with an "expand" command for expanding the unified header in the modified conversation in accordance with the present invention. Different methods for expanding a unified header can be provided in different embodiments; for example, by issuing a series of mouse clicks, key entries, or hovering a cursor over a particular header and pressing an enter key, a user can issue commands to expand a header. FIG. 22C shows a screen shot 2220 that illustrates in mid-operation expansion by a user of a unified header 2223 representing a series of collapsed cards in a modified conversation as shown in FIG. 22B. To expand the unified header 2223, a user first selects the unified header 2223, which in some embodiments, is highlighted when selected. In some embodiments, a user can simply hit an 'enter' key to activate the expansion action, or, in other embodiments, as shown in FIG. 22C, activate a pull down menu containing a list of different actions, and then selectively picking and activating the 'expand' 2225-F command. It should be appreciated that the actions list in a pull down menu in an application may contain more or less, same or different commands as illustrated. The illustration should be viewed as exemplary but not restrictive in nature.

FIG. 22D is a screen shot of an exemplary view of an expanded modified conversation in a client device received from a server in accordance with some embodiments of the present invention. FIG. 22D shows a screen shot of the modified conversation in FIGS. 22B-22C with the unified header 2223 expanded into a series of collapsed cards (2232-A to 2232-F). In the header of each of the series of collapsed cards is information about that message. The information, for example, includes a sender of the message and the date in which the message is sent. While the expanded card containing the most recent message of the thread is still open, it is no longer selected. This is reflected by the non-thickened border frame 2235 surrounding the expanded card. After the unified header has been expanded, the first message represented by the first collapsed card 2232-A is selected, which is reflected in FIG. 22D by the information displayed in the main header 2231 shown 'Message 1 of 7'.

Figures 22E, 22F:
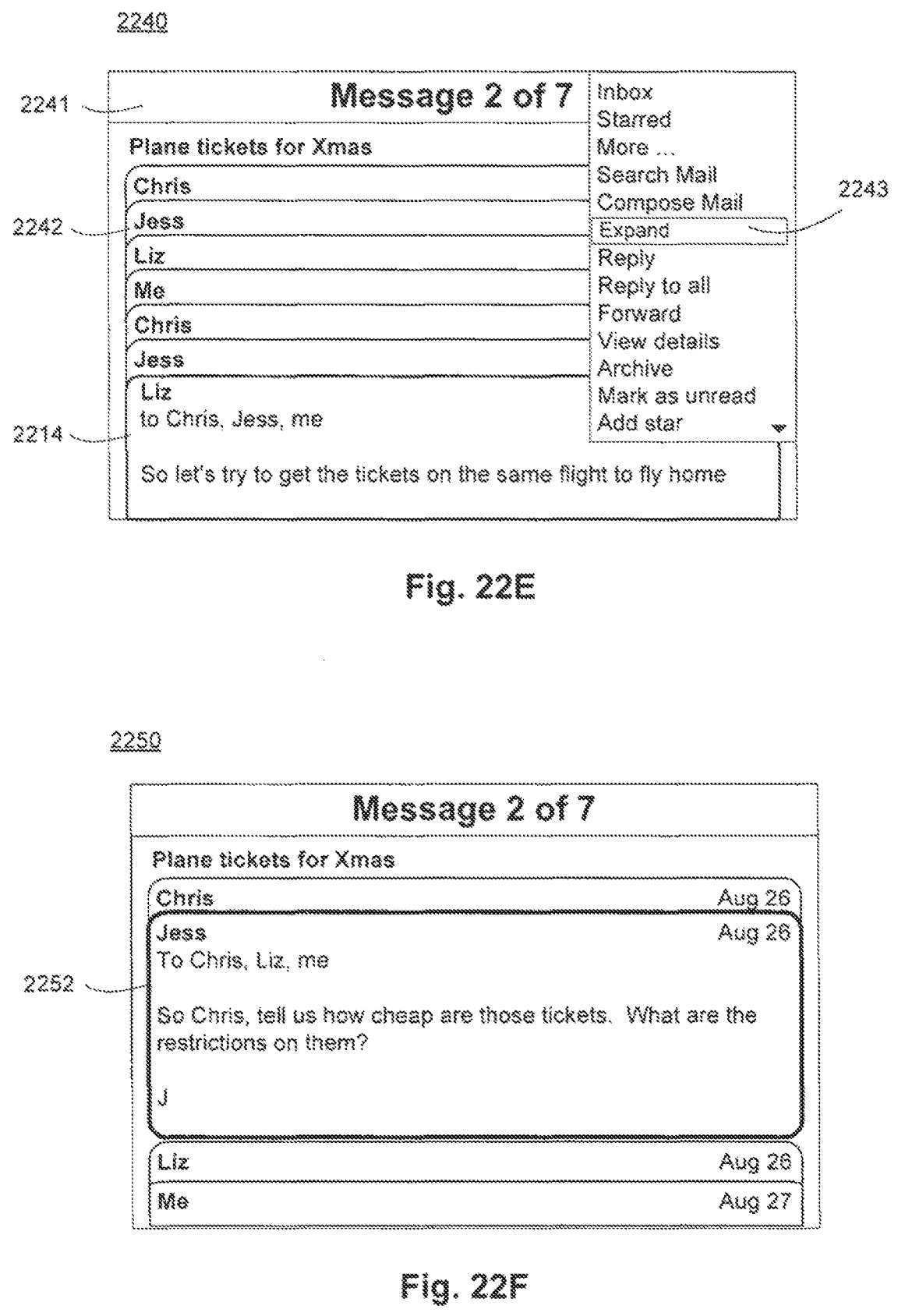

FIG. 22E is a screen shot of an exemplary view of a pull down menu with an "expand" command for expanding a message in an expanded modified conversation, in a client device, in accordance with some embodiments of the present invention. FIG. 22E is an illustration showing how a user can view one of the earlier messages represented by one of the collapsed cards. For example, a user likes to view a message 2242 sent by 'Jess' in the thread. The user selects the message 2242. Once the message is selected, information of the selected message, 'Message 2 of 7', is displayed in the main header 2241 of the screen. Similar to expansion of the unified header shown earlier, the user has at least two options to expand this selected collapsed card 2242. In some embodiments, the user can simply hit the 'enter' key in the input device to activate or expand the message selected. In other embodiments, the user can activate a pull down menu containing a list of actions or commands, and then selects the appropriate command or action, such as 'expand' 2243, to expand the collapsed card and view the message contained within. Again, this illustration should be viewed as exemplary but not restrictive in nature. In some embodiments, a list of commands in a menu includes any arbitrary number (e.g. six) of the following: expand, collapse, reply, reply to all, forward, view details, archive, search, compose, delete, exit, mark as unread, return to inbox. Each of the commands may have an opposite action associated with the action listed (for example, selecting "expand" for an already expanded menu can cause that menu to be collapsed). The menu may be displayed in response to a user input, when any collapsed card (e.g. any one of the series of collapsed cards) or when any expanded card is selected.

FIG. 22F is a screen shot of an exemplary view of an earlier message expanded in the modified conversation in accordance with some of the embodiments of the present invention. FIG. 22F shows a screen shot 2250 of a modified conversation shown in FIG. 22E with an expanded card 2252 containing text original to one of the earlier messages. Once a selected collapsed card has been expanded, the now expanded card contains original text by the sender for the message, excluding any extraneous or repeated text from one or more earlier messages in the message. Identification and stripping of the extraneous or repeated text is performed by the server. Stripping is performed before the original text for the message is sent to the client device, as explained earlier in the disclosure. The expanded card of the selected earlier message, similar to an illustration of the expanded card containing the most recent message in FIGS. 22B and 22C, has a thickened border frame to indicate to the user that it is selected. Similarly, the main header reminds the user that this message, 'Message 2 of 7', is currently selected.

Figure 23:
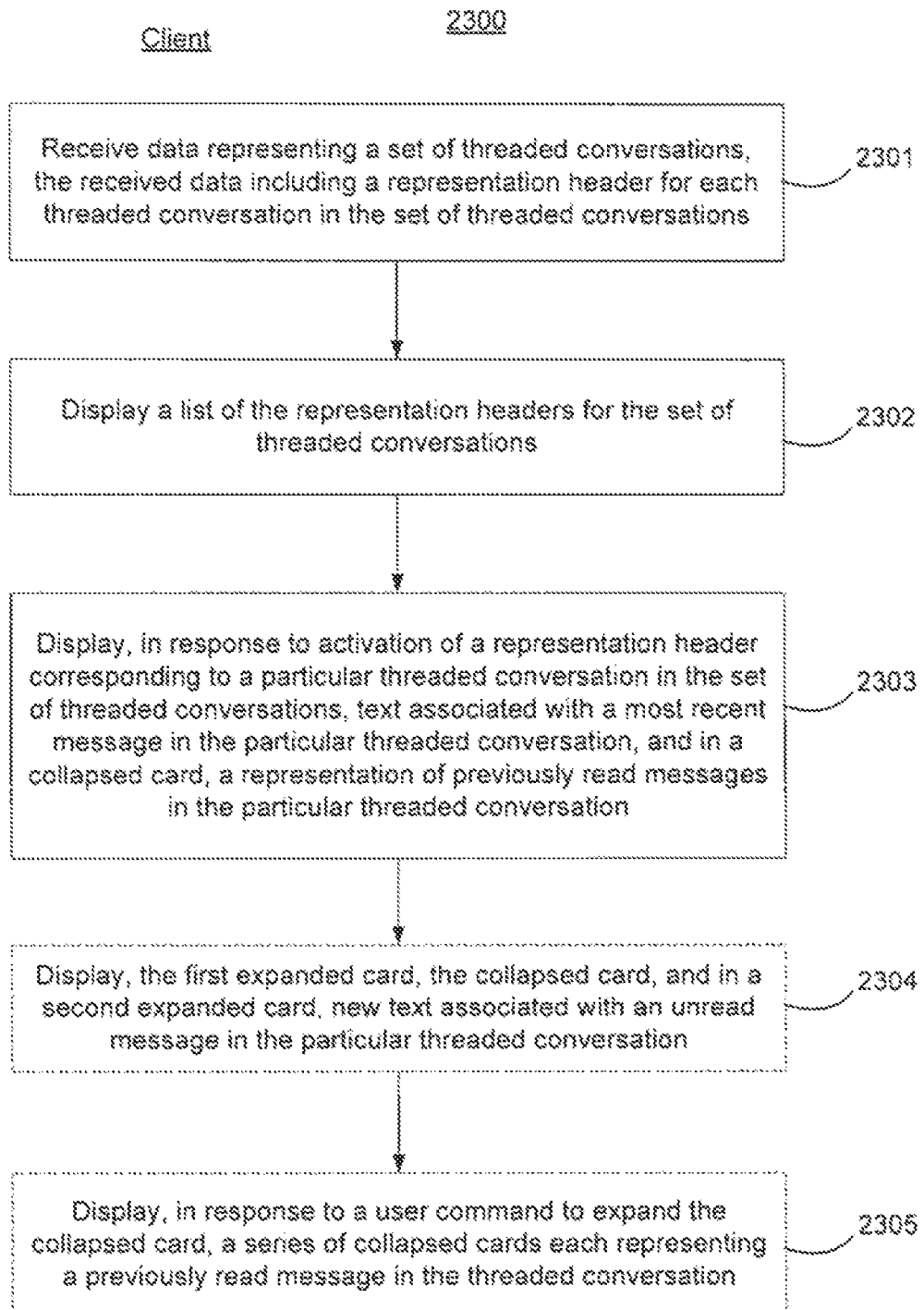
FIG. 23 is a flow diagram illustrating exemplary user interface operations in a client device generating different displays in response to user inputs in accordance with some of the embodiments of the present invention.

FIG. 23 is a flow diagram illustrating exemplary user interface operations in a client device generating different displays in response to user inputs in accordance with some of the embodiments of the present invention. In some embodiments, in response to activation of an application, a client device receives data, from the server, representing a set of threaded conversations. The received data includes a representation header for each threaded conversation in the set of threaded conversations, as shown in block 2301. After the data is received, the client device displays a list of the representation headers in the graphical user interface for the set of threaded conversations, as shown in block 2302. In some embodiments, the representation header for each threaded conversation is the same as entry information for each conversation in a conversation listing view of an inbox of an email application.

When a representation header corresponding to a particular threaded conversation in the set of threaded conversations is selectively activated, the client device simultaneously displays a first expanded card and a unified header or a collapsed card, as shown in block 2303. The first expanded card associates with at least one of a most recent message and an unread message in the particular threaded conversation. The unified header or collapsed card contains a representation of previously read messages in the particular threaded conversation. Information about the collection of previously read messages, such as the number of previously read messages, is also fond in the unified header.

In some embodiments, the graphical user interface may be described in an alternate manner. A server can group all related messages into a single conversation so the client can request entire conversations or single messages. The user can be given an option of looking at a list of conversations in the inbox, or a folder/label etc. After the user picks a conversation, each message is displayed via a card user interface. Moreover, different commands (e.g. collapse/expand a card, delete a conversation, reply to a message etc.) are provided to the user to act on single cards or the entire conversation. Each card user interface has at least one of four distinguishing features. The distinguishing features include: Cards that correspond to individual messages and can be expanded or collapsed; when expanded, each card contains most or all of the original text by a sender of the message; when collapsed, each card shows only just the header, usually one line. A frame drawn around an expanded card to give user visual feedback about the extent of the card and to separate it from others. Arranging cards according to the thread information in the conversation, such that for example, text in a reply message does not contain text from the original message. Display only text specific to each card so that the text in a reply message does not contain text from an original message.

In some embodiments, there is an unread message in addition to a most recent message in a particular thread or conversation. Once the representation of the conversation is selectively activated and expanded, the user interface will simultaneously display the first expanded card representing the most recent message, the unified header or collapsed card representing previously read messages in the particular thread, and a second card representing the unread message. Containing in the second card is new text associated with the unread message in the particular threaded conversation. Extraneous or repeated old text in the body of the unread message that also appears in messages in the thread sent earlier than the unread message is excluded. In some embodiments, one of the differences between an expanded card and a collapsed card is that the bordered display region of the expanded card contains multiple lines of text, whereas the bordered display region of each collapsed card displays only one line of text and/or characters.

Furthermore, a user can view one of the earlier messages that is part of the unified header. The client device will display, in response to a user command to expand the unified header or the collapsed card representing earlier read messages, a series of collapsed cards, each representing one of a series of earlier messages. Moreover, when one of the collapsed cards representing a particular earlier message is selectively activated, the user interface will display text associated with the particular read message. The text contained in the read message includes only text particular to the message by the sender and excludes extraneous or repeated old text in the body of the read message that also appears in messages of the thread that were sent earlier than the read message. In other words, in each card of the series of collapsed cards, text authored by a sender of a corresponding message may be displayed. For example, the collapsed card may show a snippet of text from the corresponding message, where the snippet does not include repeated text from earlier messages. In some embodiments, each of the expanded cards has a border or frame around the body of the message to visually separate and emphasize the text of the message from other elements displayed. In some embodiments, the header on each of the series of collapsed cards contains information specific to the corresponding earlier message. The information may include at least one of: name of sender of the corresponding message. In some embodiments, the series of collapsed cards and expanded cards are arranged according to message information in the thread or conversation. For example, this includes ordering the series of collapsed card and expanded cards in accordance with information associated with each message such as: date and time, sender, or a combination thereof.

In some embodiments, the user interfaced described above is adapted to the limitations of a mobile device and optimized to manage all the messages in a conversation to preserve the conversation's context. While the description above is illustrated based on an email application operating on a mobile device, the same concepts, including, but not limited to stripping out signatures or other extraneous data for messages, using the user interface may also be used for reading other thread or conversation based information, and ordering display of information by time and sender etc., may similarly apply in a user interface for reading other thread-based data such as message board comments, newsgroup posts, instant messaging, chats, SMS messages etc. Moreover, the same functionality may similarly be applied in non-mobile devices with bandwidth-constrained environments such as users with dial-up access.

Pre-Fetching Relevant Messages for Responsive Mobile Email Applications

Mobile devices are generally slow in sending and receiving data due to inherent limitations in areas such as memory, processing capability, data transmission rate etc. Consequent to this latency in data transmission, the user interface for a mobile application suffers when the application has data stored (primarily) on a server. Moreover, data transmission for mobile devices is expensive. One manner to improve responsiveness in a user interface is to intelligently pre-fetch relevant data from the server without the need for sending too much data. A system and method for pre-fetching relevant data is described in detail below.

Figure 24A:
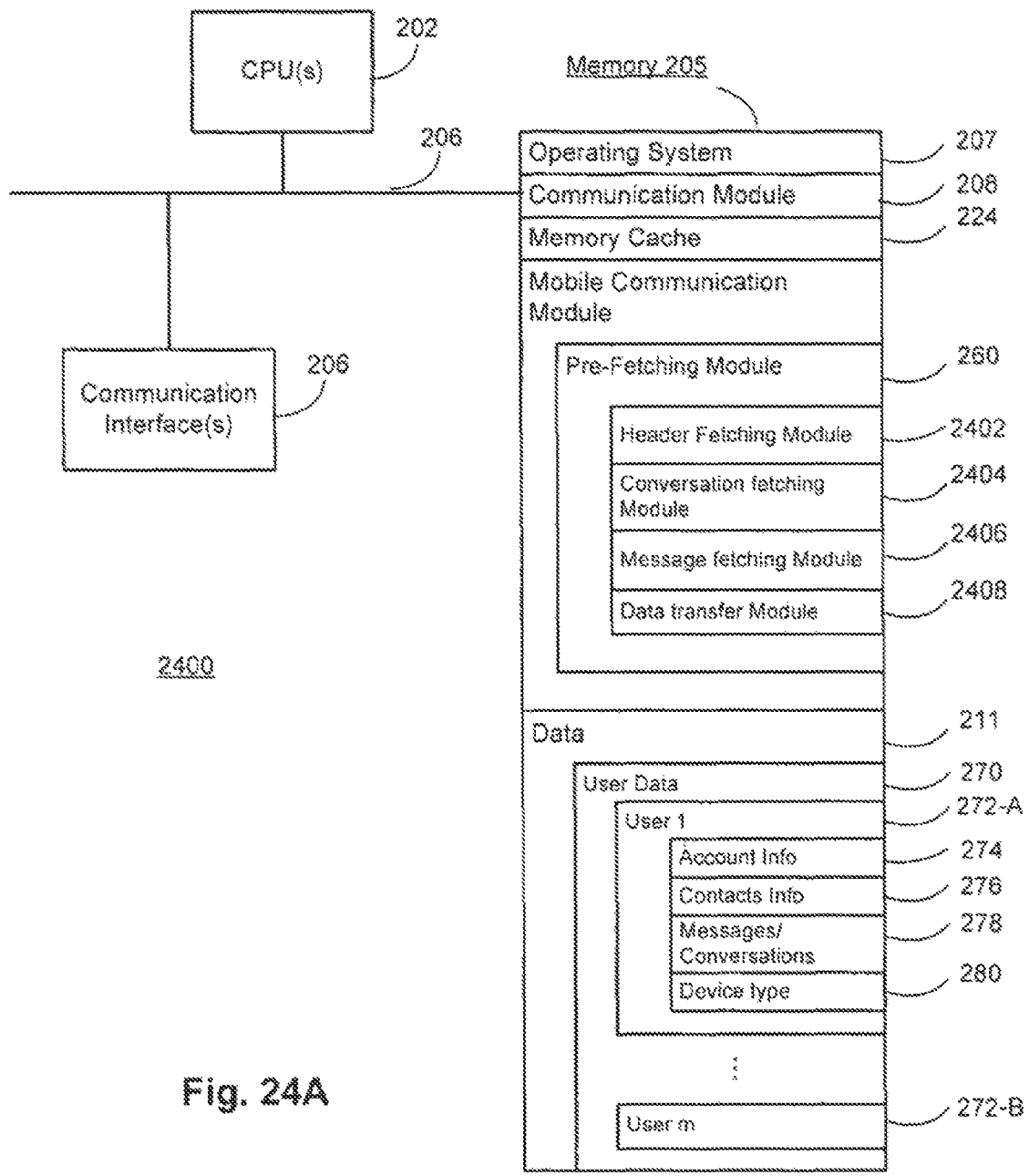
FIG. 24A is a block diagram of an exemplary server having components for carrying out functions of pre-fetching module in accordance with some embodiments of the present invention.

FIG. 24A is a block diagram of an exemplary server having components for carrying out functions of pre-fetching module in accordance with some embodiments of the present invention. In some embodiments, the feature pre-fetching relevant messages is implemented in a client-driven email application operating in a client device such as a mobile communication device. In other embodiments, the application can be a server driven email application operating on a client device such as a personal computer or a wireless mobile device like a cellular telephone.

The server structure 2400 in FIG. 24A, similar to the server 200 described in FIG. 2, includes one or more processing units (CPU's) 202, one or more network or other communication interfaces 206, memory 205, and one or more communication buses 204 for interconnecting these components. Memory 205, similar to the server 200 described in FIG. 2, also stores programs, modules and data structures, or a subset thereof, includes an operating system 207, a communication module 108, a data module 211 containing similar user data 270 for individual users that may range from user 1 272-A to user m 272-B as previously described in FIG. 2, and a mobile communication module 210.

The mobile communication module 210 may include a pre-fetching module 260 that controls the prefetching of relevant information in the server prior to transmission to a client device. The pre-fetching module further includes at least one of: header fetching module 2402, conversation fetching module 2404, message fetching module 2406 and data transfer module 2408.

The header fetching module 2402 fetches the relevant header information of conversations and messages in respective threaded conversations, from a server, in response to an initiation of an email application on the client device.

The conversation fetching module 2404 fetches the relevant conversations in a server, for transmitting to a client device, in response to initiation of an email application on the client device. The conversations are fetched in accordance with the perceived relevance to a user of the client device. The relevance is based on at least one of a set of criteria. The relevant conversations will then be sent to the client device during start up of the application.

The message fetching module 2406 fetches the relevant messages in each of a set of relevant conversations, for transmitting to a client device, in response to initiation of an email application on the client device. The messages are fetched in accordance with their perceived relevance to the conversation and to the user of the device. The relevance is based on at least one of a set of criteria. The relevant messages will then be sent along with the relevant conversations and the header information to the client device during start up of the application.

The data transfer module 2408 controls the transfer of data such as header information, conversations, and headers to the client device. This module controls transmission of data to the client device requested by the client device.

Figure 24B:
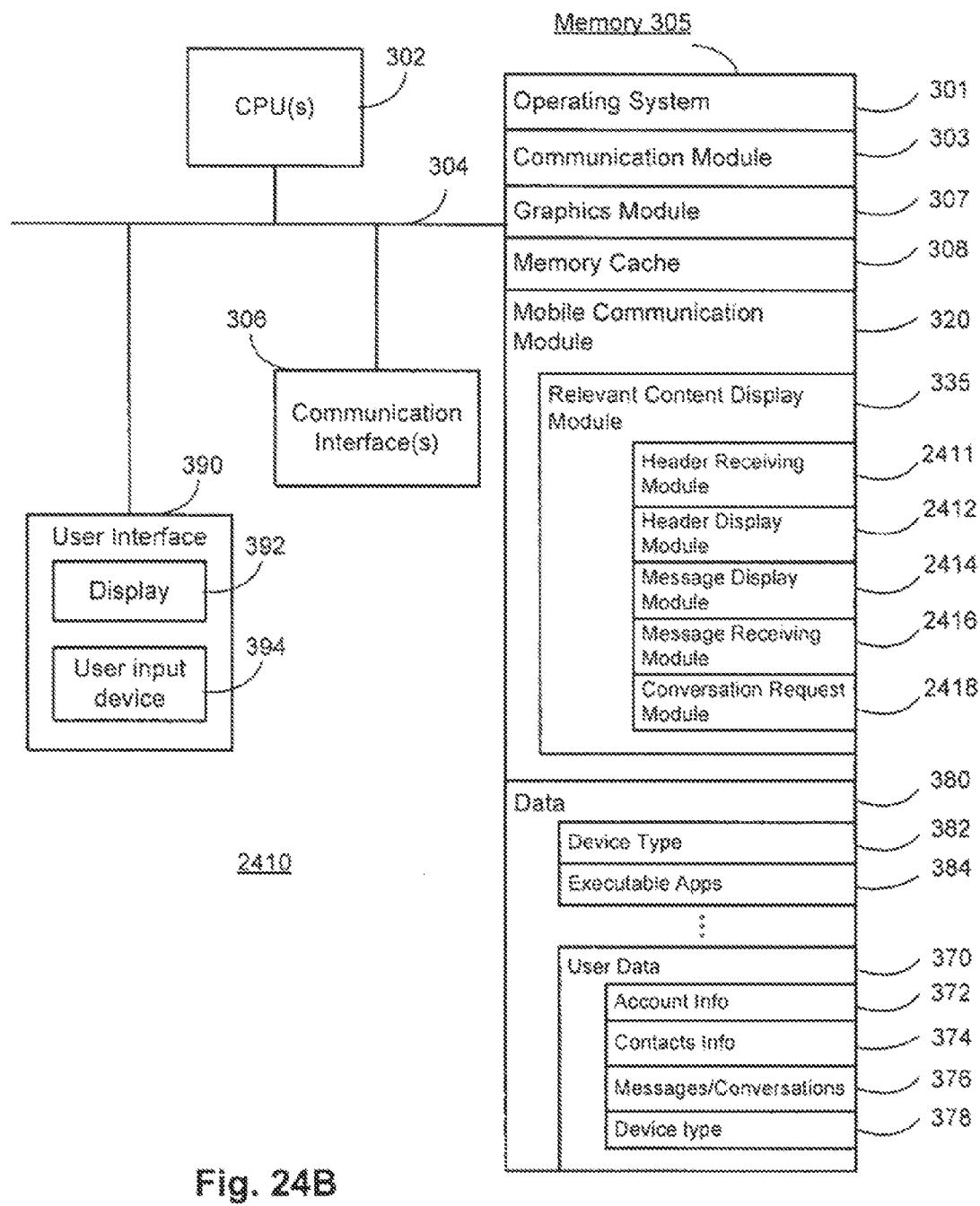
FIG. 24B is a block diagram of an exemplary client device having components for carrying out functions of a relevant content display module in accordance with some embodiments of the present invention.

FIG. 24B is a block diagram of an exemplary client device having components for carrying out functions of a relevant content display module in accordance with some embodiments of the present invention. The client device 2410 in FIG. 19B, similar to the client device 300 described in FIG. 3, includes one or more processing units (CPU's) 302, one or more network or other communications interfaces 306, memory 305, and one or more communication buses 304 for interconnecting these components. The client device 1910 also includes a user interface 390 having a 392 and a user input device 394. Memory 205 similarly includes an operating system 301, a communication module 303, a graphics module 307, memory cache 308, a data module 380 containing information about device type 382, executable applications 384, and user data 370, and a mobile communication module 320.

The mobile communication module 320 may include a relevant content display module 335, which further includes at least one of a header receiving module 2411, a header display module 2412, a message receiving module 2416, a message displaying module 2414, and a conversation request module 2418.

The header receiving module 2411 receives the relevant header information sent from the server to the client device. The relevant header information may include at lest one of conversations and one or more messages in one or more threads or conversations.

The header display module 2412 displays the relevant header information downloaded onto the client device from the server. This module controls the information that is displayed, for example, in a conversation listing view showing a list of conversations, or in a message view when a single conversation is being viewed.

The message receiving module 2416 receives the relevant messages associated with particular threaded conversations from the server. Not all messages from each threaded conversation are sent from the server. Therefore, the message receiving module receives the relevant messages associated with one or more threaded conversations and organize these relevant messages according to the conversations for display.

The message displaying module 2414 displays the relevant messages that are downloaded onto the client device when the associated relevant conversations are selectively expanded. In other words, when a relevant conversation is selected and expanded, any relevant message(s) that is a part of the thread, if considered by the server to be relevant, will be present on the client device, and thus displayed.

The conversation request module 2418 requests conversations from the server to be transmitted onto the client device 2410. The requests are made under at least one of two circumstances: first, when an email application initiates, a request for conversations is made to the server from the client device; and second, when a user specifically requests a particular threaded conversation which is not transmitted to the client device during initiation of the email application. This latter situation could result when the particular conversation is found to be not relevant based on the determining factor(s) in the server, or some other reason.

Figure 25A:
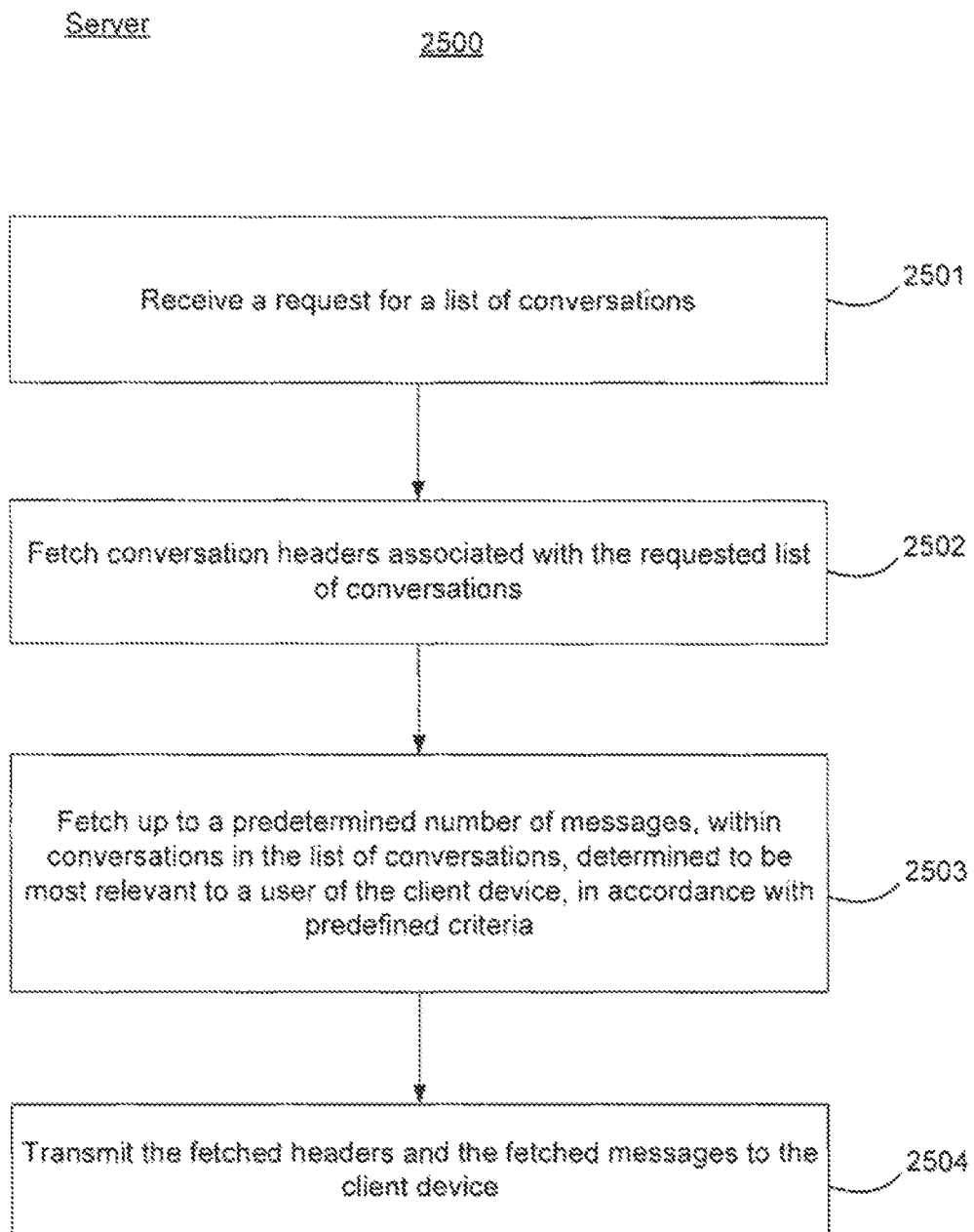
FIG. 25A is a flow diagram illustrating exemplary operations in a server to fetch conversation headers and messages in response to a request from a client device for a list of conversations in accordance with some embodiments of the present invention.

FIG. 25A is a flow diagram illustrating exemplary operations in a server to fetch conversation headers and messages in response to a request from a client device for a list of conversations in accordance with some embodiments of the present invention. The flow chart 2500 describes operations by which a server prefetches relevant content in response to a request from a client device. In some embodiments, the server receives a request from a client device for a list of conversations, as shown in block 2501. The request may also ask for, but not limited to, relevant messages, relevant conversations, relevant header information for messages and conversations, information about messages and information about conversations. Information about messages includes at least one of sender, date and any information like labels and stars associated with the messages. Information about conversations includes at least one of total number of messages in a conversation, which messages are read, and which messages are unread.

The server proceeds to fetch conversation headers associated with the requested list of conversations as shown in block 2502. Each conversation header represents a different conversation in the list of conversations and each conversation contains at least one message. The server also fetches up to a predetermined number of messages, within conversations in the list of conversations, determined to be most relevant to the user of the client device in accordance with predefined criteria, as shown in block 2503. The fetched headers and fetched messages determined to be relevant are transmitted from the server to the client device as shown in block 2504.

In some embodiments, the server first fetches conversations it determines to be relevant to a user before fetching messages within the selected relevant conversations. In some embodiments, the one or more factors used by the server to determine if a conversation is relevant includes, but are not limited to, a predetermined number of conversations most recently received by the user, all conversations received by the user within a predetermined duration or period, the frequency of interactions among senders of messages in a conversation, and the number of messages within a conversation. Therefore, in some embodiments, the messages are first preselected based on relevancy of conversation before the relevancy of the messages itself. In other embodiments, the one or more factors used to determine relevancy of messages are independent of the relevancy of the conversations. In these embodiments, the relevant messages are first selected and then the conversations containing these relevant messages are automatically selected as well. Still, in other embodiments, the relevancy of conversations and messages is determined independently, and all the relevant conversations and the relevant messages are prefetched and transmitted to the client device.

In some embodiments, there is at least one factor for determining the relevance of messages. The messages determined to be most relevant to the user of the client device include, but are not limited to, a plurality of messages selected from unread messages, messages most recently received, messages from conversations determined to be most active among the conversations associated with the list of conversation headers, messages from senders in a same domain as the user of the client device, and messages from contacts listed in the user's address book.

In other embodiments, there are other factors or criteria that can be used to determine relevancy of messages. For example, relevant messages may be return messages containing specific test (e.g. RSVP, URGENT, etc.) or text based regular expression that matches important messages. Furthermore, relevant messages may be messages that are starred or messages with a priority scheme where messages are ordered by priority. Moreover, relevant messages may be messages that have already been replied to and are the ones that are being read and has to be dealt with. Other relevant messages may be based on auto-responses. For example, the server can determined that for a message with a large number of users or recipients, if a certain number of users or recipients have read it, it suggest that the message may be relevant and important, and therefore this message will be automatically pre-fetched. Lastly, the server may pre-fetch messages that can be rendered on the mobile device display. For instance, messages with super large fonts, lines of pictures, or attachments only, may not be selected for prefetching.

In some embodiments, the predetermined number of messages is determined based on at least one of memory available on the client device, cumulative size of the messages determined to be most relevant to the user, or a combination thereof. The predetermined number of messages is used as a limit for prefetching the messages to facilitate user interface responsiveness when the user interacts with the email application. In other embodiments, no messages are prefetched during email application initiation due to one or more reasons. The reasons may include, but are not limited to, data cost restrictions, network latency, and memory constraint on the client device. For example, if the cost for data transmission is high, a user may choose to select messages for downloading rather than having the server prefetch messages. Also, if a network has a fast transmission rate, a user may not need messages to be prefetched to have a responsive user interface. On the contrary, if the network has an extremely slow transmission rate, prefetching even a small number of messages may slow down the user interface tremendously. In some embodiments, a user has to initiate a request to reduce the prefetched messages if the response of the client-server interaction is unknown. This may also be an option provided to a user in the application in addition to the default of prefetching messages and conversations. In other embodiments, the email application may provide an option to the user of the client device to instruct the server to stop the fetching of messages determined by the server to be most relevant to the user. Instead, each message transmitted to the client device is sent in response to a direct request by the client device for that message.

In some embodiments, the fetched headers and the fetched messages are wirelessly transmitted to the client device which is a mobile communication device. Message headers that are fetched and transmitted to the client devices are associated with the list of conversations.

Figure 25B:
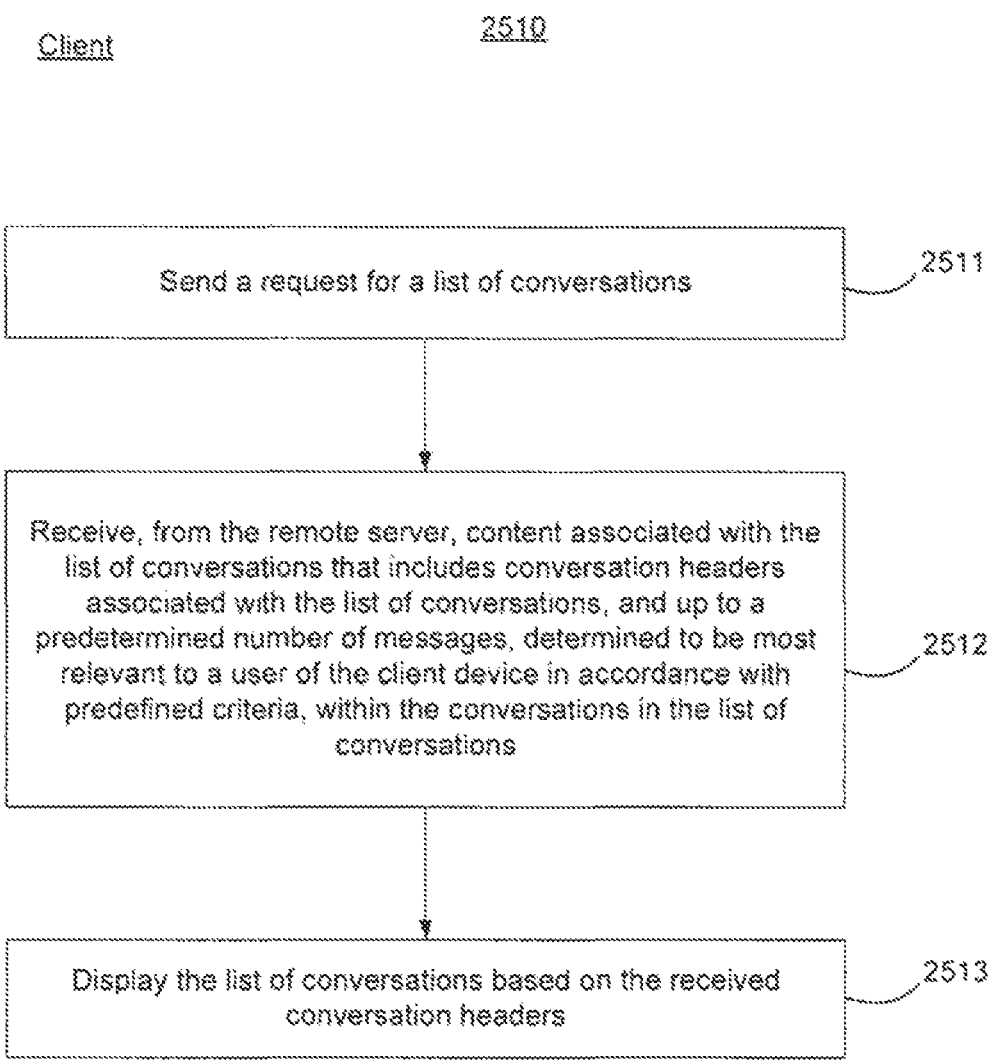
FIG. 25B is a flow diagram illustrating exemplary operations in a client device requesting, receiving and displaying a list of conversations from a server in accordance with some embodiments of the present invention.

FIG. 25B is a flow diagram illustrating exemplary operations in a client device requesting, receiving and displaying a list of conversations from a server in accordance with some embodiments of the present invention. The flow chart 2510 describes operations in a client device to receive and display the relevant content that is prefetched and transmitted from the server. In some embodiments, the client device sends a request to the server for a list of conversations as shown in block 2511. The client device, in turn, receives from the server, content associated with the list of conversations. The content includes conversation headers associated with the list of conversations, and up to a predetermined number of messages that are determined to be most relevant to a user of the client device, in accordance with predefined criteria, within the conversations in the list of conversations, as shown in block 2512. The client device displays the list of conversations based on the received conversation headers, as shown in block 2513.

Each of the conversation headers received by the client device represents a different thread or conversation in the list of conversations. The predetermined number of messages determined to be most relevant to a user of the client device are messages that can be found in one or more of the different threaded conversations represented by the conversation headers in the list of conversations. The one or more predefined criteria in which the relevance of the messages is determined may include, but not limited to, data cost restrictions, network latency, memory constraint on the client device, cumulative size of the relevant messages determined to be most relevant to the user and other factors previously described above in reference to prefetching operations in the server.

Some example of relevant messages may include a plurality of messages selected from unread messages, messages most recently received, messages from conversations determined to be most active among the conversations associated with the list of conversation headers, messages from senders in a same domain as the user of the client device, and messages from contacts listed in the user's address book.

In some embodiments, content associated with the list of conversations are stored temporarily in a memory of the client device. Similarly, message headers associated with the list of conversations fetched in the server and transmitted to the client device are also stored temporarily in the client device.

In other embodiments, an email application on the client device gives an option to the user of the client device to instruct the server to stop the fetching of messages determined to be most relevant to the user. Rather, each message transmitted to the client device is sent in response to a direct request by the client device for that message. In some embodiments, the request for a list of conversations and messages is sent from the client device which is a mobile device with a wireless communication interface.

Figure 25C:
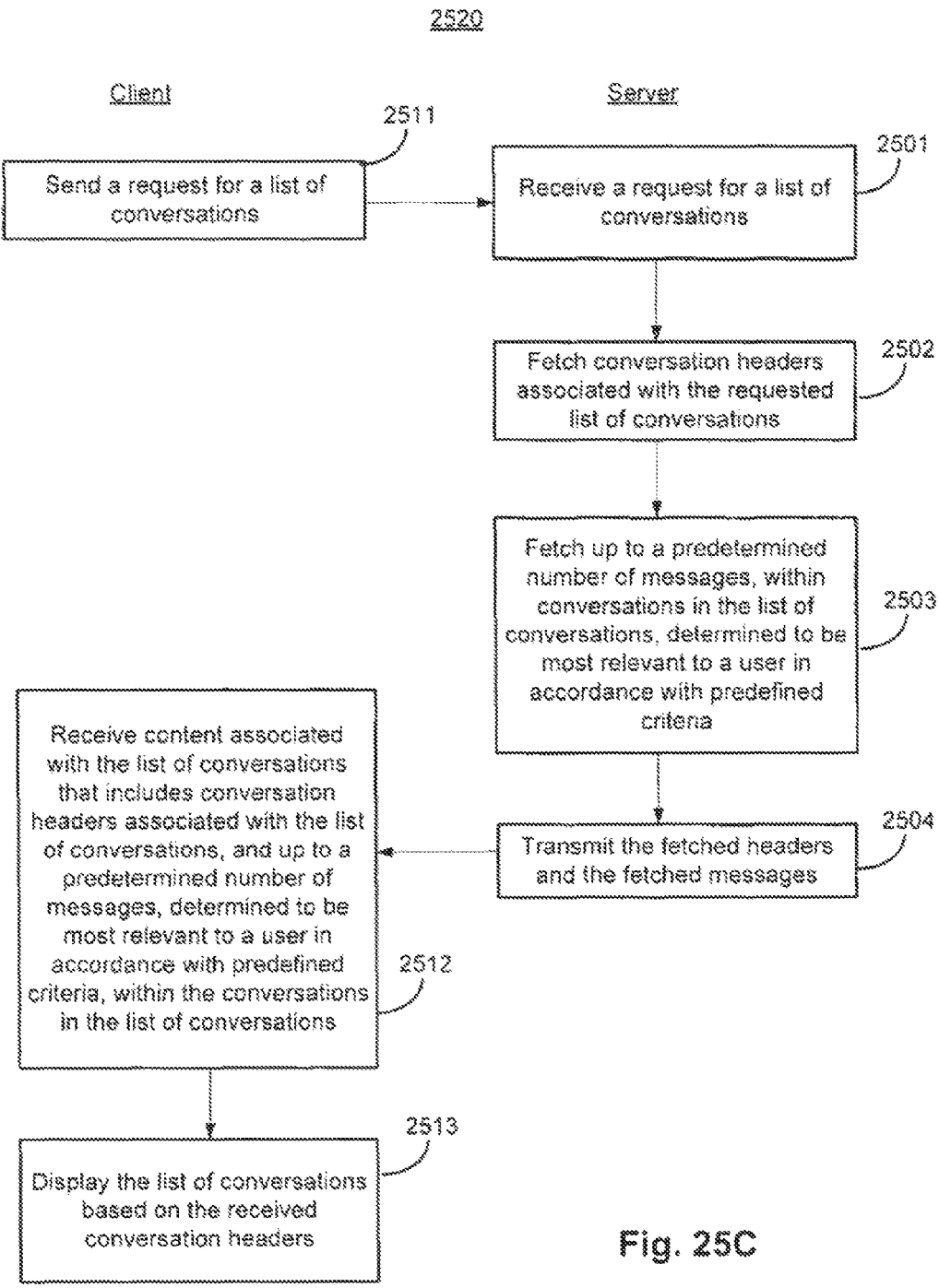
FIG. 25C is a flow diagram illustrating exemplary interactions of a client device and a server in pre-fetching relevant content from a server for display in a client device in accordance with some embodiments of the present invention.

FIG. 25C is a flow diagram illustrating exemplary interactions of a client device and a server in pre-fetching relevant content from a server for display in a client device in accordance with some embodiments of the present invention. The flow diagram 2520 in FIG. 25C shows the interactions between a server and a client device and is similar to the two block diagrams as illustrated in FIGS. 25A and 25B. FIG. 25C illustrates similar operations in the server and client device as shown in FIGS. 25A and 25B but includes how and where the server and the client interacts with each other in the operations of pre-fetching of relevant content in the server and transmitting the pre-fetched relevant content to the client device. In some embodiments, FIG. 25C may be summarized below.

For example, a user requests a list of conversation headers and/or message headers on a client device that, for example, is a mobile device. The mobile device sends a request to the server for the corresponding conversation or message headers. At the server, the relevant headers are fetched. In addition, a certain predetermined number of the "most relevant" message bodies is chosen such that the total size of the response does not exceed some threshold. The "most relevant" can be determined based on a number of factors, such as most recent or unread messages if from a folder/label or an inbox, or the most recent or unread messages if for a search. At the mobile device, all the message headers and the message bodies are read and stored in the memory of the device. When a message body is requested, the email application checks if the message header and/or message body is stored on the mobile device, and if so, to display the message or header. Otherwise, the message or header is requested from the server. In cases where data is costly, the user can be given the option of turning off the prefetching in order to trade data savings for user interface slow downs. Also, the number of items (e.g., messages, conversations, message headers and conversation headers) to prefetch may be chosen based on a hard-coded number of messages, and size based on device capacity etc.

Figure 26A:
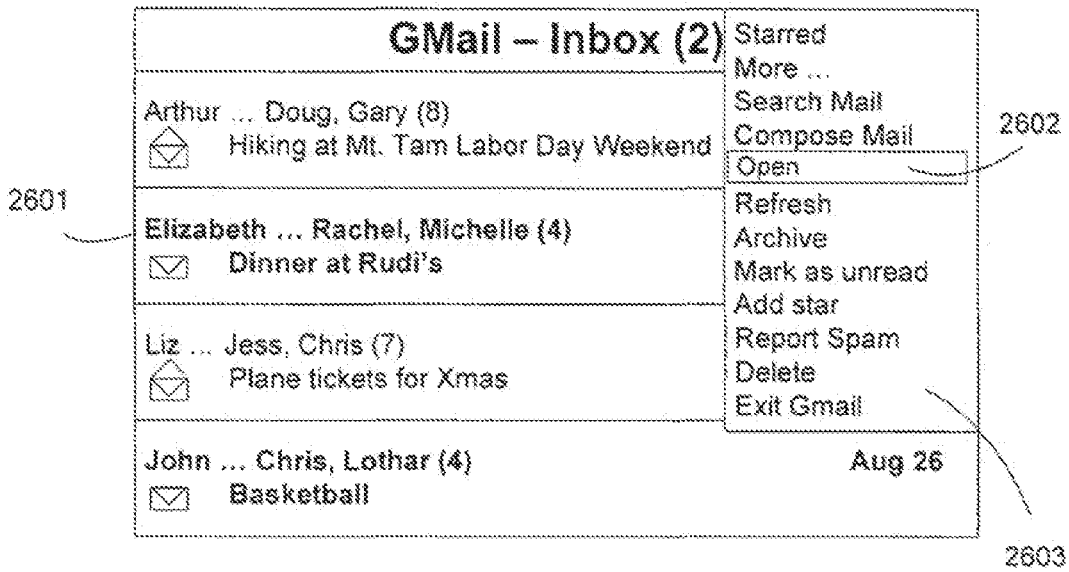
FIG. 26A is a screen shot of an exemplary view of a list of conversations with a pull down menu having an "open" command for opening a selected conversation, in accordance with some embodiments of the present invention.

FIG. 26A is a screen shot of an exemplary view of a list of conversations with a pull down menu having an "open" command for opening a selected conversation, in accordance with some embodiments of the present invention. FIG. 26A shows a screen shot 2600 of an exemplary view of a list of conversations prefetched by a server and transmitted to the client device. There are four conversations displayed on the screen and these four conversations forms a portion of the list of relevant conversations transmitted from the server. Further, the list of relevant conversations may comprise only a portion of the complete list of conversations stored on the server. In some embodiments, the number of relevant conversations prefetched from the server to be transmitted to the client device is predetermined and depends on one or more factors as discussed earlier in this disclosure. Among the four conversations in the display, two conversations show bold text indicating that they contain at least one or more unread messages. For example, an unread conversation 2601 with a subject 'Dinner at Rudi's' is shown to have a total of four messages, but the conversation listing view does not indicate to a user how many of the four messages are unread. To view the messages in the conversation, a user can either select and hit 'enter' to activate or expand the conversation into a message listing view, or use a pull down menu 2603 as shown. A user can select the 'open' 2602 command or action to view the messages contained within the selected conversation.

Figure 26B:
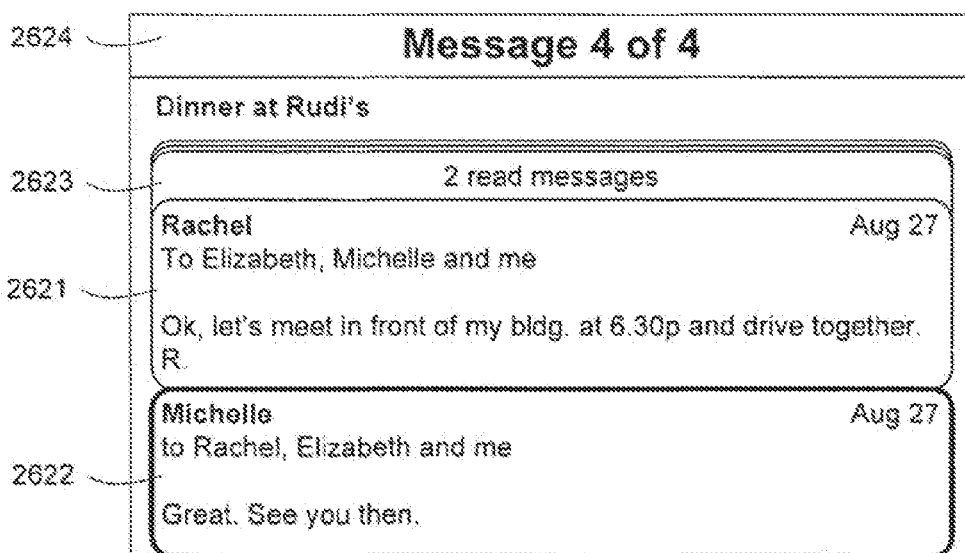
FIG. 26B is a screen shot of an exemplary "opened" threaded conversation in a client device containing a most recent message and an unread message sent before the most recent message in accordance with some embodiments of the present invention.

FIG. 26B is a screen shot of an exemplary "opened" thread or conversation in a client device containing a most recent message and an unread message sent before the most recent message in accordance with some embodiments of the present invention. Screen shot 2620 shows a message view after the selected conversation has been opened. Similar to previous illustrations of a message view of a threaded conversation, the main header 2624 indicates to the reader which of the message is being selected. In this example, the header shows that 'Message 4 of 4', is selected. This correlates to the last message 2622 composed by sender Michelle having a highlighted or bolded border frame for separating the content from the other elements in the display. Another message 2621, or the third message in the thread, is also opened. In some embodiments, the most recent or last message in a threaded conversation is by default prefetched and sent to the client device. In this example, both the third message 2621 and the fourth message 2622 could be unread or only the third message 2621 is unread because the most recent or last message in the thread, the fourth message 2622, will by default prefetched, whether it is read or not. This is based on at least one criterion of prefetching that includes an unread message. In other embodiments, the client device may select an unread message instead of selecting the most recent message in a messages listing view. The read messages are represented as a unified header or collapsed card 2623, and the information about the read messages is displayed in the unified header. In this example, the information about the read messages is that there are two unread messages. In some embodiments, text in read messages is generally not prefetched.

Figure 26C:
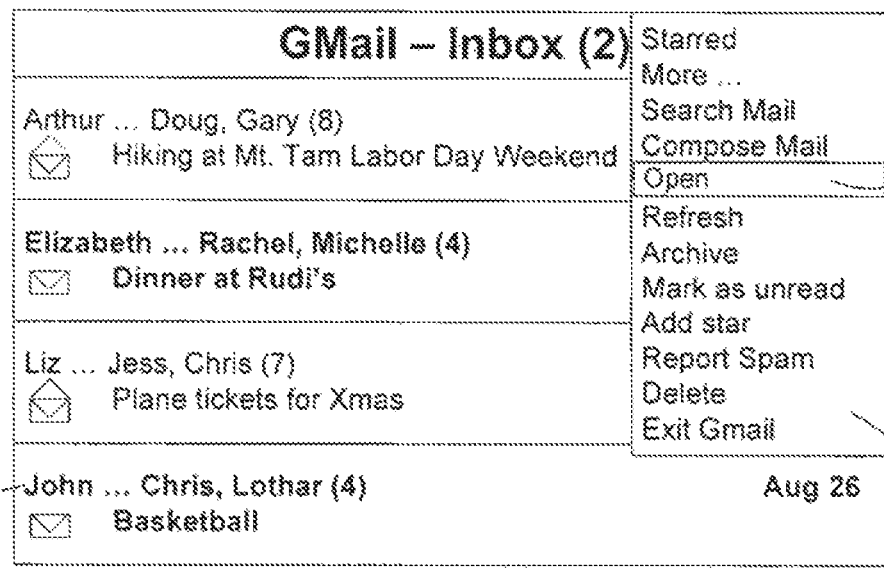
FIG. 26C is a screen shot of an exemplary view of a list of conversations with a pull down menu having an "open" command for opening a different selected conversation, in accordance with some embodiments of the present invention.

FIG. 26C is a screen shot of an exemplary view of a list of conversations with a pull down menu having an "open" command for opening a different selected conversation, in accordance with some embodiments of the present invention. Screen shot 2630 is similar to screen shot 2600 in FIG. 26A, except that the fourth conversation 2631 displayed in the conversation listing view is selected. A user can similarly open the conversation and view the messages contained within the conversation by using an 'enter' key or selecting the 'open' 2632 command in a pull down menu 2633 as illustrated.

Figure 26D:
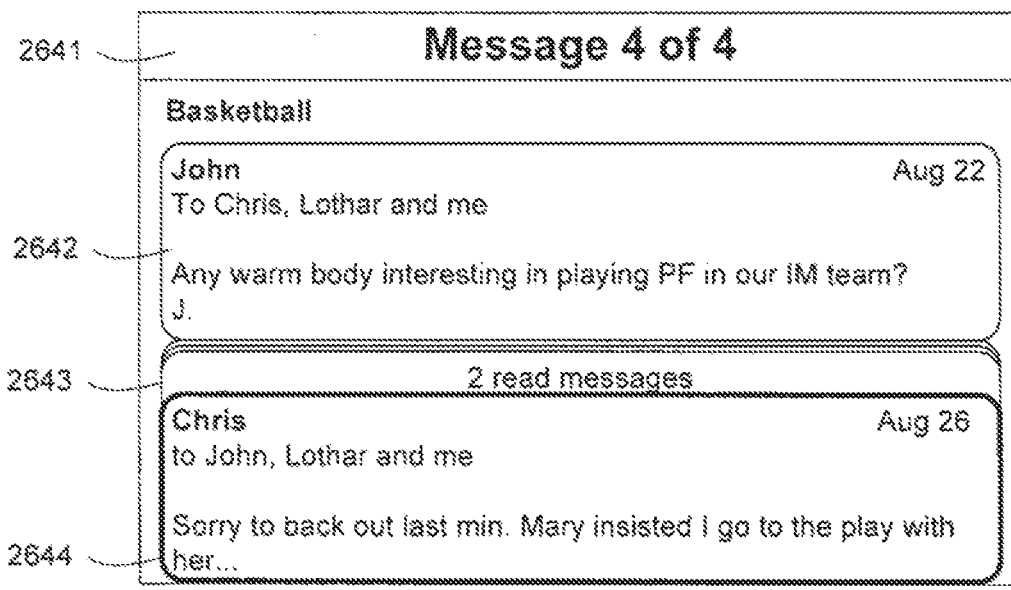
FIG. 26D is a screen shot of another exemplary "opened" threaded conversation in a client device containing a most recent message and an unread message in accordance with some embodiments of the present invention.

FIG. 26D is a screen shot of another exemplary "opened" threaded conversation in a client device containing a most recent message and an unread message in accordance with some embodiments of the present invention. Screen shot 2640 shows a different embodiment compared to screen shot 2620 in FIG. 26B. In this message listing view, the first and the fourth messages are shown in expanded cards. This suggests to the user that the user in the past has read the second and third messages represented by the unified header or collapsed card 2643, but has not read the first message 2642 or he/she has purposely marking the first message 2642 as unread. As described earlier, assuming in this example that all messages are unread, and the most recently received or the last message in a thread is by default prefetched by the server, these messages 2642, 2644 will automatically be displayed when a selected conversation is opened into the message listing view. All of the read messages will not be prefetched, and will have information about the unread messages, such as '2 read messages', shown in the unified header or collapsed card 2643. If a user desires to view any of these read messages, the user need to expand the unified header into a series of collapsed cards and selectively expand the particular collapsed card corresponding to the message of interest, as described earlier in this disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a server system having one or more processors that execute programs stored in memory of the server system:
storing on the server an attachment associated with a communication;
sending to a client device the communication with a representation of the attachment that includes an indication of a native file type of the attachment, wherein the attachment is not sent with the communication;
receiving a request from the client device to view the attachment in the client device;
in response to the request from the client device to view the attachment in the client device:
retrieving the attachment;
truncating a first portion of the attachment according to predetermined criteria, wherein the predetermined criteria include one or more of latency in transmission of data and cost of transmission of data; and
transmitting the truncated attachment to the client device, wherein the truncated attachment does not include the first portion.

2. The method of claim 1, wherein the predetermined criteria further include one or more of memory storage availability of the client device and size of the attachment.

3. The method of claim 1, wherein the transmitting includes wirelessly transmitting the truncated attachment to the client device.

4. The method of claim 1, further comprising providing a user of the client device options to either fetch more of the truncated attachment or fetch the entire attachment.

5. A server system, comprising:
one or more processors, a memory coupled to the one or more processors; and
one or more programs, stored in the memory, configured for execution by the one or more processors, the one or more programs configured to:
store on the system an attachment associated with a communication;
send to a client device the communication with a representation of the attachment type that includes an indication of the attachment's native file type, wherein the attachment is not sent with the communication;
receive a request from a client device to view the attachment in the client device;
in response to the request from the client device to view the attachment in the client device:
retrieve the attachment;
truncate a first portion of the attachment according to predetermined criteria, wherein the predetermined criteria include one or more of latency in transmission of data and cost of transmission of data; and
transmit the truncated portion of the attachment to the client device, wherein the truncated attachment does not include the first portion.

6. The system of claim 5, wherein the predetermined criteria further include one or more of memory storage availability of the client device and size of the attachment.

7. The system of claim 5, wherein the client device is a mobile device with a wireless communication interface to receive the communication from the system.

8. The system of claim 5, wherein options are provided for a user of the client device to either fetch more of the truncated attachment or fetch the entire portion of the attachment.

9. A method comprising:
at a client device having one or more processors that execute programs stored in memory of the client device:
receiving a communication and a representation of an attachment associated with the communication, the representation of the attachment including an indication of a native file type of the attachment, wherein the attachment is not sent with the communication;
sending a request to a server to send the attachment for display on the client device;
in response to sending the request, receiving a truncated portion of the attachment configured for display in the client device, wherein the attachment is truncated according to predetermined criteria, the predetermined criteria including one or more of latency in transmission of data and cost of transmission of data, and wherein the truncated attachment does not include at least a portion of the requested attachment; and
displaying the truncated portion of the attachment.

10. The method of claim 9, wherein the predetermined criteria further include one or more of memory storage availability of the client device and size of the attachment.

11. The method of claim 9, wherein the client device is a mobile device with a wireless communication interface to receive the truncated portion of the attachment from the server.

12. A client device, comprising:
one or more processors, a memory coupled to the one or more processors, a display, an input device; and
one or more programs, stored in the memory, configured for execution by the one or more processors, the one or more programs comprising instruction to:
display a communication and a representation of an attachment associated with the communication, the representation of the attachment that includes a native file type of the attachment, wherein the attachment is not received with the communication;
send a request to a server to retrieve the attachment for display on the client device;
in response to sending the request, receive a truncated portion of the attachment configured for display in the client device, wherein the attachment is truncated according to predetermined criteria, the predetermined criteria include one or more of latency in transmission of data, and cost of transmission of data, and wherein the truncated attachment does not include at least a portion of the requested attachment; and
display the truncated portion of the attachment.

13. The client device of claim 12, wherein the client device is a mobile device with a wireless communication interface to receive the truncated portion of the attachment from the server.

14. The client device of claim 12, wherein the predetermined criteria further include one or more of availability of the client device and size of the attachment.

15. A non-transitory computer readable storage medium storing one or more programs configured to be executed by a processor of a server, the one or more programs comprising instructions for:
storing on the server an attachment associated with a communication;
sending to a client device the communication with a representation of the attachment that includes an indication of a native file type of the attachment, wherein the attachment is not sent with the communication;
receiving a request from the client device to view the attachment in the client device;

in response to the request from the client device to view the attachment in the client device:
   retrieving the attachment;
   truncating a first portion of the attachment according to predetermined criteria, wherein the predetermined criteria include one or more of latency in transmission of data and cost of transmission of data after it has been compressed and resized; and
   transmitting the truncated portion of the attachment to the client device for display, wherein the truncated attachment does not include the first portion.

16. The non-transitory computer readable storage medium of claim 15, wherein the predetermined criteria further include one or more of memory storage availability of the client device and size of the attachment.

17. The non-transitory computer readable storage medium of claim 15, wherein the client device is a mobile device with a wireless communication interface to receive the communication from the system.

18. The non-transitory computer readable storage medium of claim 15, wherein options are provided for a user of the client device to either fetch more of the truncated attachment or fetch the entire portion of the attachment.

19. A non-transitory computer readable storage medium storing one or more programs configured to be executed by a processor of a client device with a display and an input device, the one or more programs comprising instructions for:
   receiving a communication and a representation of an attachment associated with the communication, the representation of the attachment including an indication of a native file type of the attachment, wherein the attachment is not sent with the communication;
   sending a request to a server to send the attachment for display on the client device;
   in response to sending the request, receiving a truncated portion of the attachment configured for display in the client device, wherein the attachment is truncated according to predetermined criteria, the predetermined criteria including one or more of latency in transmission of data and cost of transmission of data, and wherein the truncated attachment does not include at least a portion of the requested attachment; and
   displaying the truncated portion of the attachment.

20. The non-transitory computer readable storage medium of claim 19, wherein the predetermined criteria further include one or more of memory storage in the client device and size of the attachment.

21. The non-transitory computer readable storage medium of claim 19, wherein the client device is a mobile device with a wireless communication interface to receive the truncated portion of the attachment from the server.

* * * * *